United States Patent
Yang et al.

(10) Patent No.: US 10,958,391 B2
(45) Date of Patent: Mar. 23, 2021

(54) TONE PLANS FOR WIRELESS COMMUNICATION NETWORKS

(71) Applicant: QUALCOMM Incorporated, San Diego, CA (US)

(72) Inventors: Lin Yang, San Diego, CA (US); Bin Tian, San Diego, CA (US); Dung Doan, San Diego, CA (US); Jialing Li Chen, San Diego, CA (US); Youhan Kim, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 14/938,794

(22) Filed: Nov. 11, 2015

(65) Prior Publication Data

US 2016/0142187 A1    May 19, 2016

Related U.S. Application Data

(60) Provisional application No. 62/081,527, filed on Nov. 18, 2014, provisional application No. 62/086,078, (Continued)

(51) Int. Cl.
    *H04L 5/00*    (2006.01)
    *H04L 27/26*   (2006.01)

(52) U.S. Cl.
    CPC .......... *H04L 5/0046* (2013.01); *H04L 5/0001* (2013.01); *H04L 5/003* (2013.01); *H04L 5/0091* (2013.01); *H04L 27/2602* (2013.01)

(58) Field of Classification Search
    None
    See application file for complete search history.

(56) References Cited

U.S. PATENT DOCUMENTS

| 8,665,803 B2 | 3/2014 | Sampath et al. |
| 9,571,256 B2 * | 2/2017 | Azizi ............ H04L 5/0058 |

(Continued)

FOREIGN PATENT DOCUMENTS

| JP | 2013509140 A | 3/2013 |
| JP | 2013157816 A | 8/2013 |

(Continued)

OTHER PUBLICATIONS

International Search Report and Written Opinion—PCT/US2015/060916—ISA/EPO—dated Feb. 10, 2016.

*Primary Examiner* — Gregory B Sefcheck
*Assistant Examiner* — Suk Jin Kang
(74) *Attorney, Agent, or Firm* — Paradice and Li LLP; Kevin M. Donnelly

(57) ABSTRACT

Methods and apparatuses for communicating over a wireless communication network are disclosed herein. One example apparatus includes a memory that stores instructions. The apparatus further includes a processor coupled with the memory. The processor and the memory are configured to determine a total bandwidth for a transmission of a message, the total bandwidth including a plurality of tones. The processor is further configured to divide the plurality of tones in the total bandwidth into one or more 26-, 52-, 106-, 242-, or 996-tone blocks. The processor is further configured to determine an indication. The indication assigns one or more of the one or more tone blocks to a first wireless communication device. The apparatus further includes a transmitter configured to transmit the indication to at least the first wireless communication device or a second device.

28 Claims, 35 Drawing Sheets

Related U.S. Application Data filed on Dec. 1, 2014, provisional application No. 62/101,342, filed on Jan. 8, 2015, provisional application No. 62/112,618, filed on Feb. 5, 2015, provisional application No. 62/116,343, filed on Feb. 13, 2015, provisional application No. 62/154,632, filed on Apr. 29, 2015, provisional application No. 62/157,409, filed on May 5, 2015, provisional application No. 62/181,171, filed on Jun. 17, 2015.

(56) References Cited

U.S. PATENT DOCUMENTS

| | | | |
|---|---|---|---|
| 2004/0166886 A1* | 8/2004 | Laroia | H04B 7/0491 455/522 |
| 2006/0013338 A1* | 1/2006 | Gore | H04L 5/005 375/324 |
| 2011/0009137 A1* | 1/2011 | Chung | H04L 5/0048 455/501 |
| 2011/0243268 A1* | 10/2011 | Mashino | H04J 11/0066 375/285 |
| 2011/0255620 A1* | 10/2011 | Jones, IV | H04L 5/0046 375/260 |
| 2012/0014476 A1* | 1/2012 | Kuchi | H04B 7/024 375/296 |
| 2012/0039406 A1* | 2/2012 | Srinivasa | H04L 1/0693 375/260 |
| 2012/0300652 A1* | 11/2012 | Kishiyama | H04J 11/0026 370/252 |
| 2013/0034007 A1* | 2/2013 | Zhang | H04L 5/0085 370/252 |
| 2014/0169202 A1* | 6/2014 | Chung | H04L 5/0048 370/252 |
| 2015/0085945 A1* | 3/2015 | Zhang | H04L 65/1066 375/267 |
| 2015/0215063 A1* | 7/2015 | Kuchi | H04J 11/005 370/329 |
| 2015/0223246 A1* | 8/2015 | Yang | H04W 4/12 370/329 |
| 2015/0349995 A1* | 12/2015 | Zhang | H04L 5/0048 375/295 |
| 2015/0365263 A1* | 12/2015 | Zhang | H04L 1/0057 375/295 |
| 2015/0365266 A1* | 12/2015 | Zhang | H04L 1/0057 370/330 |
| 2015/0381330 A1* | 12/2015 | Chen | H04L 5/0046 370/329 |
| 2016/0029239 A1* | 1/2016 | Sadeghi | H04W 24/10 370/252 |
| 2016/0029397 A1* | 1/2016 | Chen | H04L 1/0057 370/329 |
| 2016/0044675 A1* | 2/2016 | Chen | H03M 13/1102 370/329 |
| 2016/0088628 A1* | 3/2016 | Zhang | H04L 5/0041 370/329 |
| 2016/0100408 A1* | 4/2016 | Hedayat | H04L 65/4076 370/329 |
| 2016/0105271 A1* | 4/2016 | Shahrnaz | H04L 5/0058 370/329 |
| 2016/0183224 A1* | 6/2016 | Rebeiz | H04W 72/042 370/329 |
| 2016/0218844 A1* | 7/2016 | Suh | H04L 5/0007 |
| 2016/0226638 A1* | 8/2016 | Azizi | H04L 5/0048 |
| 2016/0233998 A1* | 8/2016 | Sun | H04L 5/0051 |
| 2016/0241375 A1* | 8/2016 | Lindoff | H04L 1/0026 |
| 2016/0278084 A1* | 9/2016 | Zhang | H04L 5/0096 |
| 2016/0278085 A1* | 9/2016 | Zhang | H04L 5/0096 |
| 2016/0345321 A1* | 11/2016 | Chen | H04L 5/0048 |
| 2017/0012747 A1* | 1/2017 | Chung | H04L 5/0048 |
| 2017/0019281 A1* | 1/2017 | Zhang | H04L 1/0057 |
| 2017/0180174 A1* | 6/2017 | Park | H04L 27/26 |
| 2017/0223705 A1* | 8/2017 | Zhang | H04L 5/0085 |
| 2017/0257795 A1* | 9/2017 | Stacey | H04L 69/04 |
| 2017/0288846 A1* | 10/2017 | Park | H04L 1/0072 |
| 2017/0288995 A1* | 10/2017 | Chung | H04L 5/0048 |
| 2017/0303242 A1* | 10/2017 | Choi | H04W 72/04 |
| 2017/0310424 A1* | 10/2017 | Chun | H04L 1/16 |
| 2017/0311292 A1* | 10/2017 | Choi | H04L 5/0053 |
| 2017/0325233 A1* | 11/2017 | Zhang | H04L 5/0041 |
| 2017/0338910 A1* | 11/2017 | Chun | H04L 1/00 |
| 2017/0339673 A1* | 11/2017 | Choi | H04W 72/04 |
| 2017/0339701 A1* | 11/2017 | Choi | H04W 72/0486 |
| 2018/0006781 A1* | 1/2018 | Choi | H04L 5/0041 |
| 2018/0062899 A1* | 3/2018 | Zhang | H04L 27/2602 |
| 2018/0146463 A1* | 5/2018 | Dinan | H04L 27/2649 |

FOREIGN PATENT DOCUMENTS

| | | |
|---|---|---|
| JP | 2013535932 A | 9/2013 |
| JP | 2013211732 A | 10/2013 |
| JP | 2013541302 A | 11/2013 |
| WO | WO-2010014649 A2 | 2/2010 |
| WO | WO-2014172201 A1 | 10/2014 |

* cited by examiner

| Bandwidth | 20MHz | | 40MHz | | 80MHz | |
|---|---|---|---|---|---|---|
| FFT Size | 256 | | 512 | | 1024 | |
| # of TAUs x Tones/TAU | 9x26 | 1x242 | 19x26 | 2x242 | 38x26 | 4x242 |
| | | | | | 36x26 | |
| # of tones for allocation | 234 | 242 | 494 | 484 | 988 | 968 |
| | | | | | 936 | |
| # of DC+guard+leftover | 22 | 14 | 18 | 28 | 36 | 56 |
| | | | | | 88 | |

FIG. 4

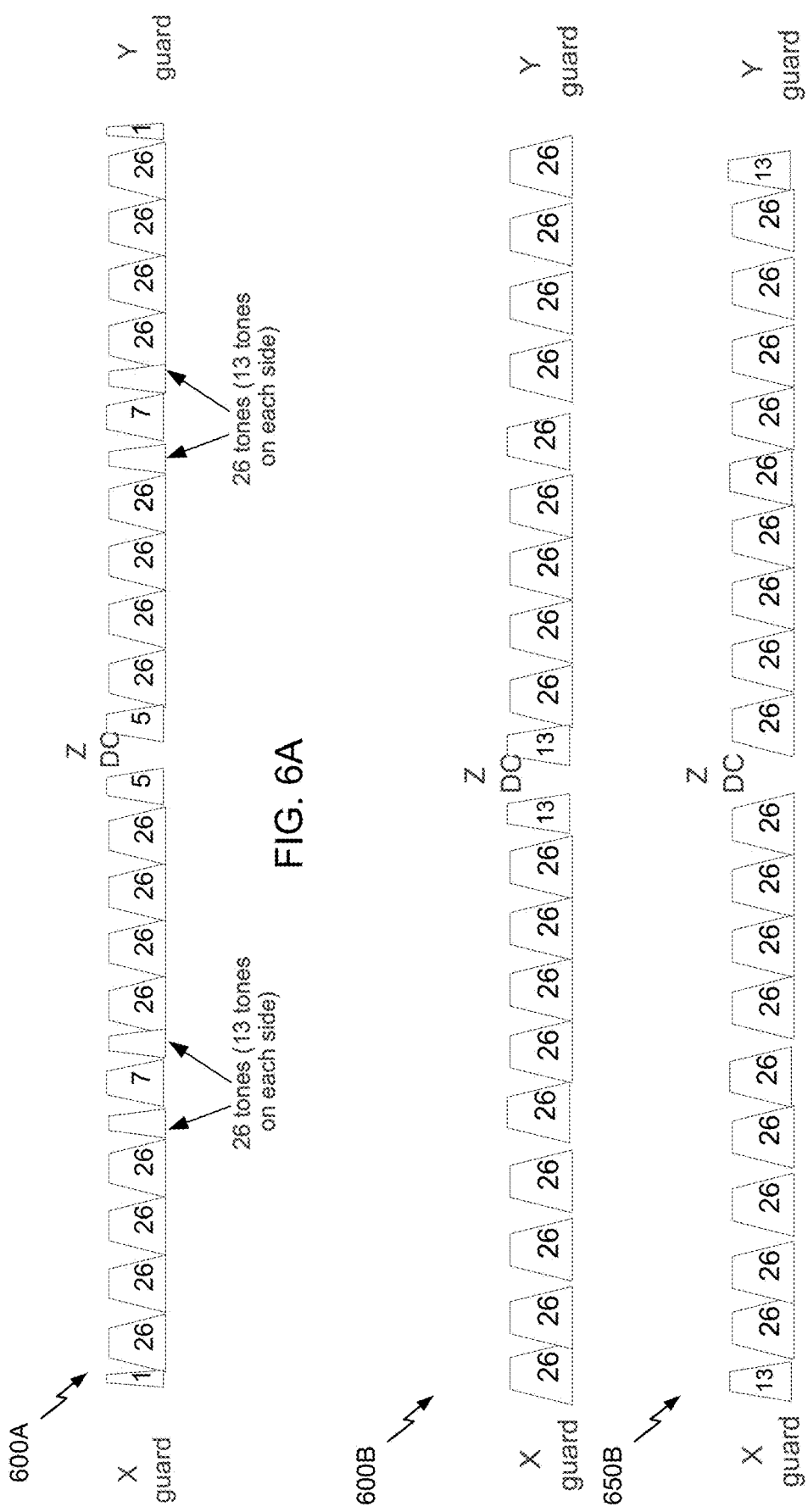

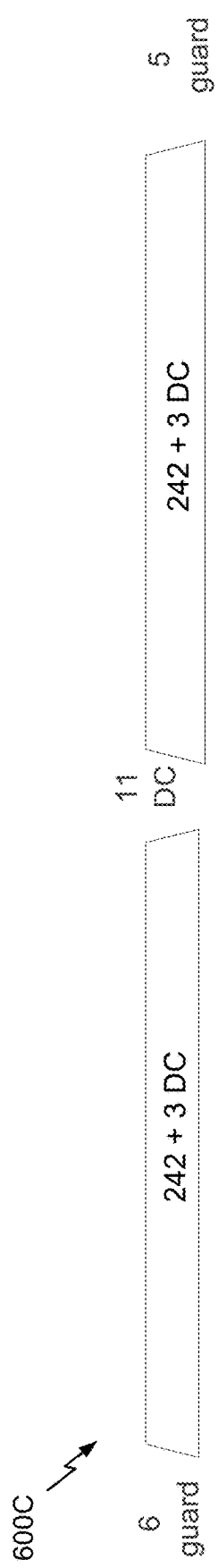
FIG. 6C
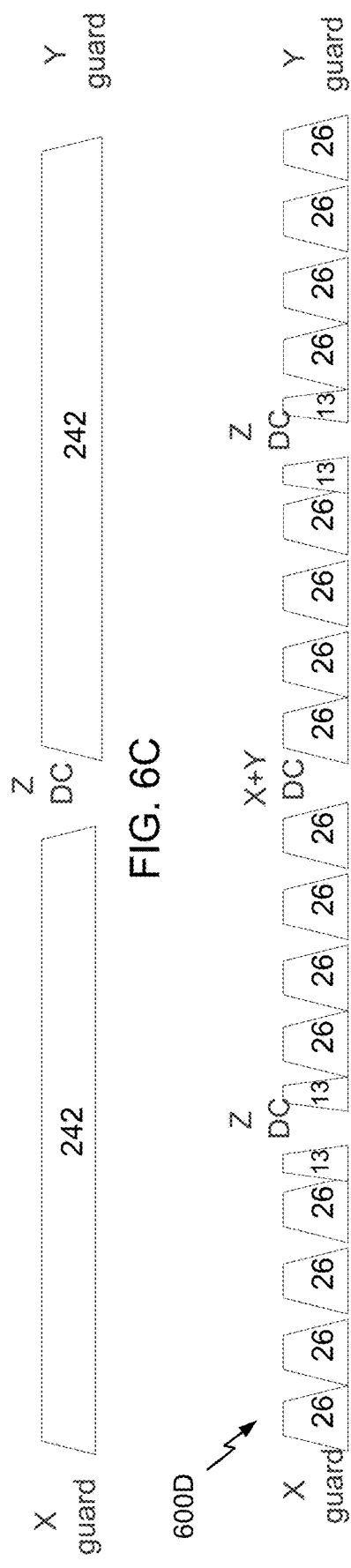
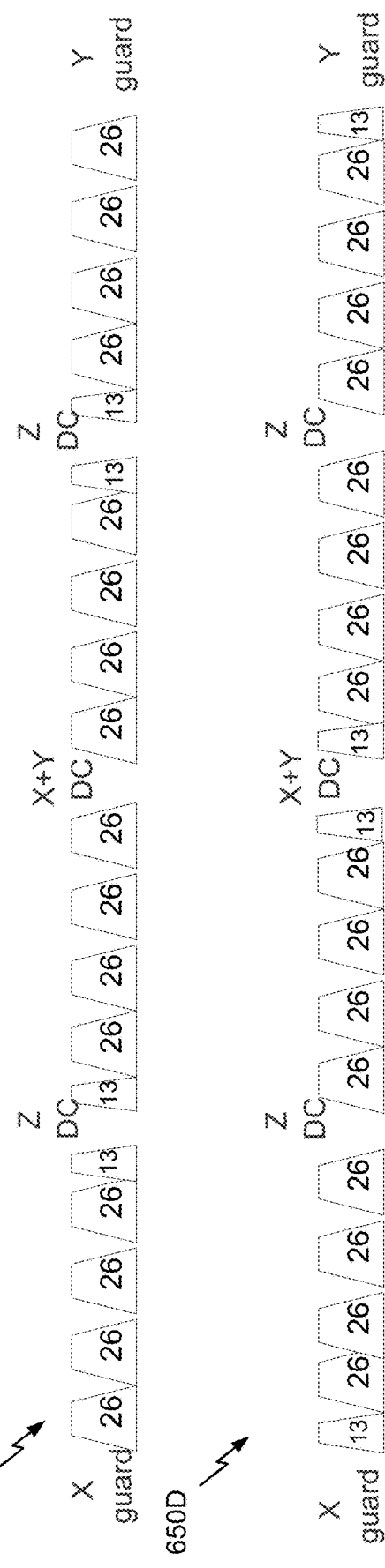
FIG. 6D

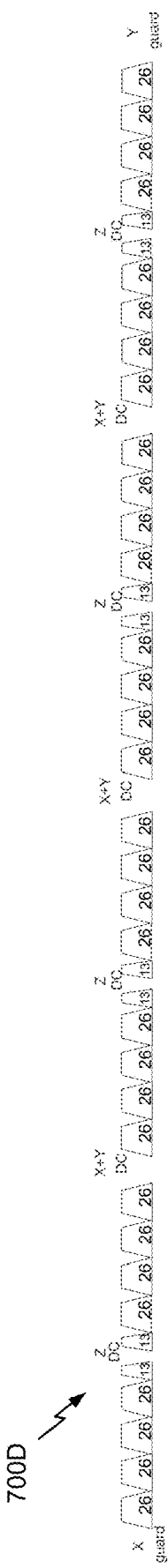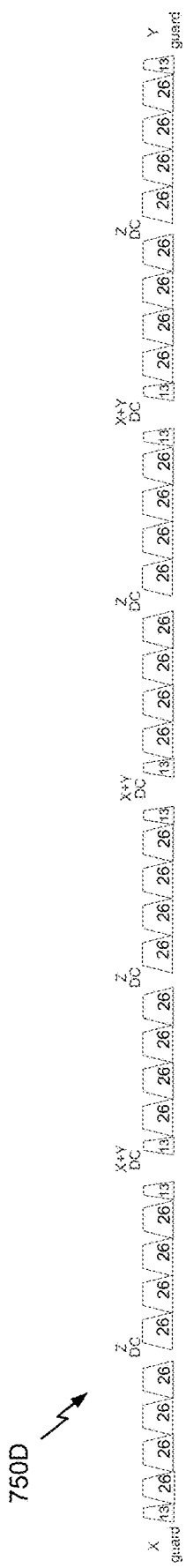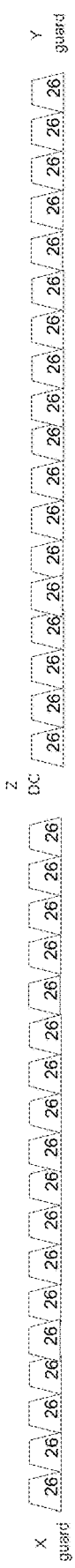
FIG. 7D
FIG. 7E

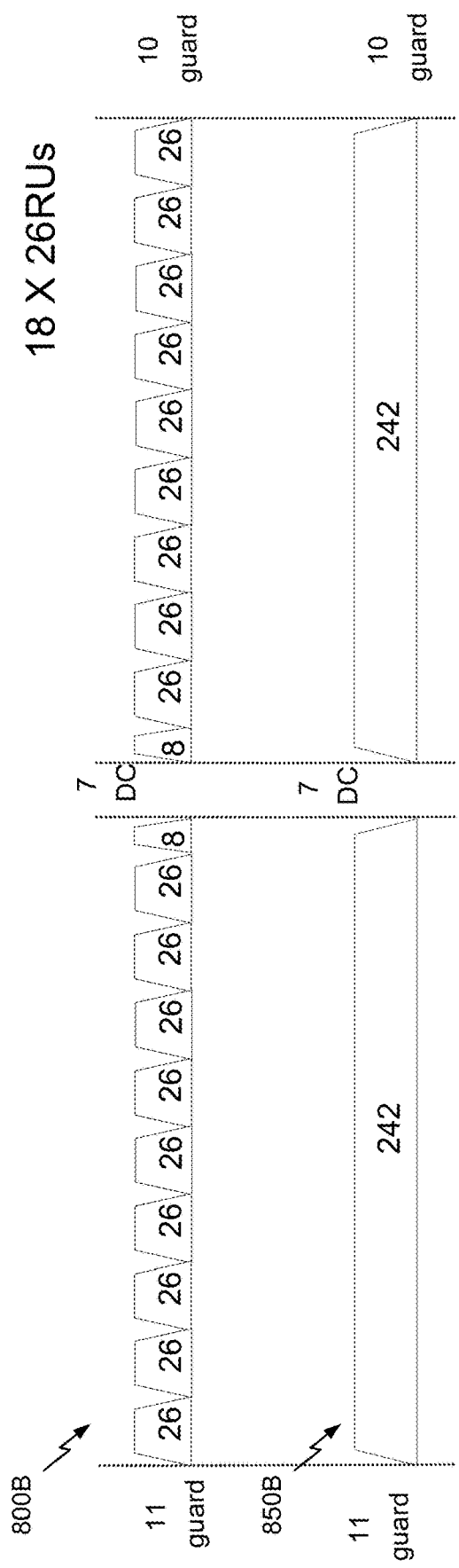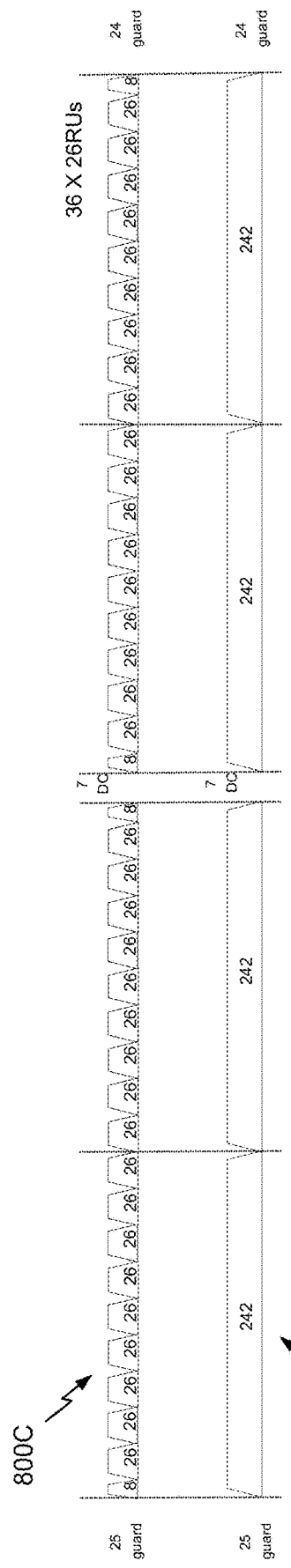
FIG. 8B
FIG. 8C

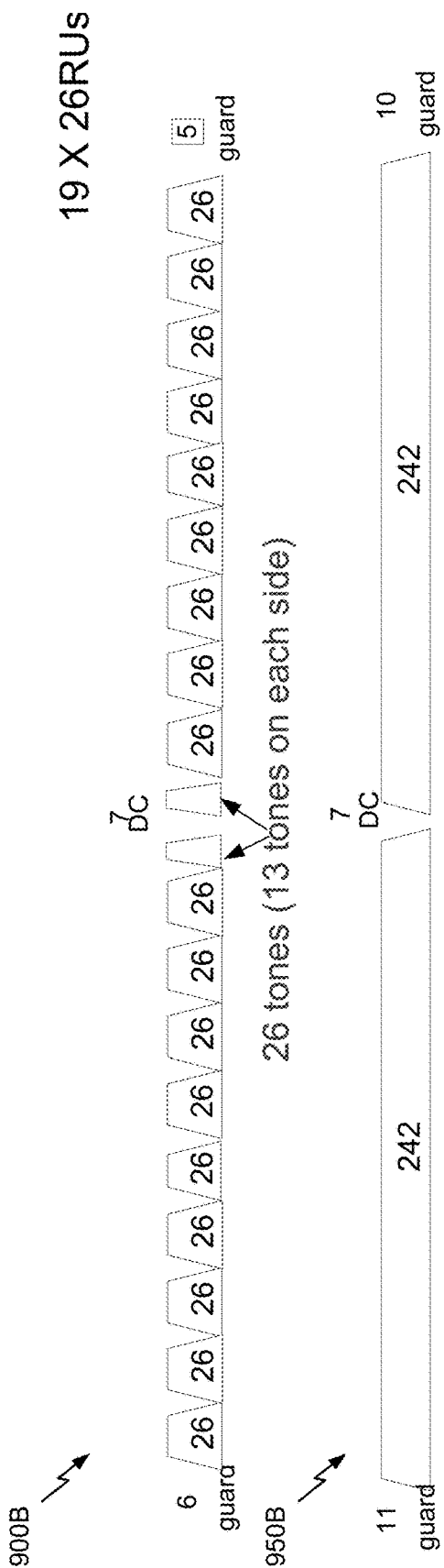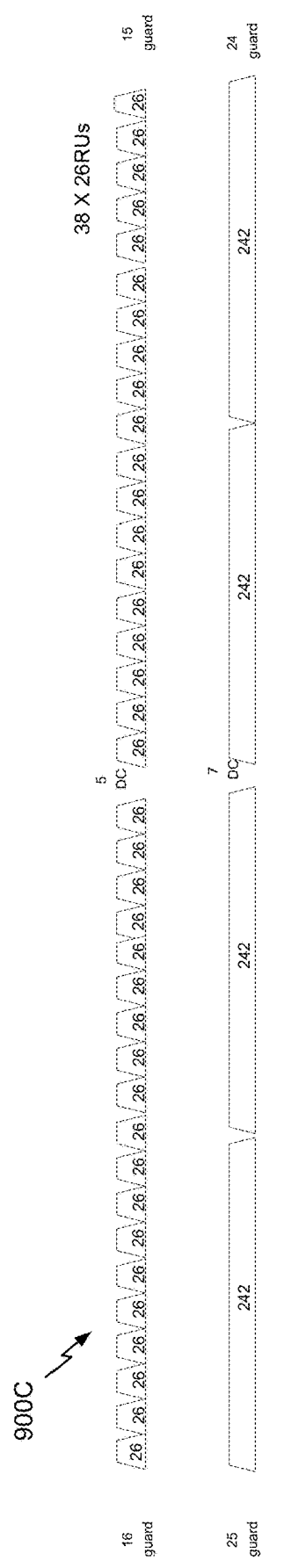
FIG. 9B
FIG. 9C

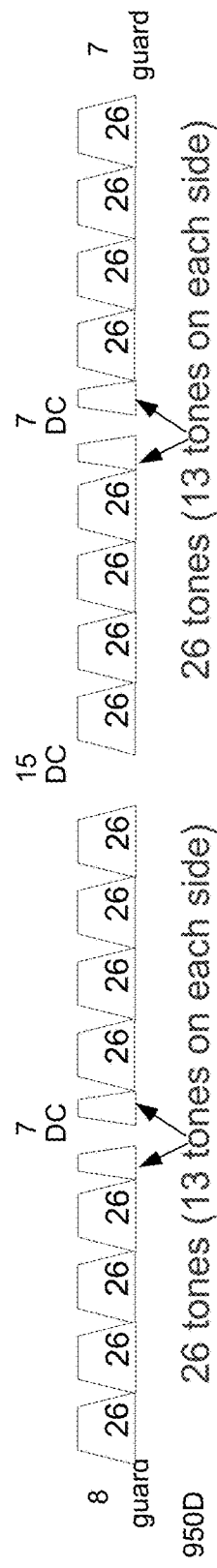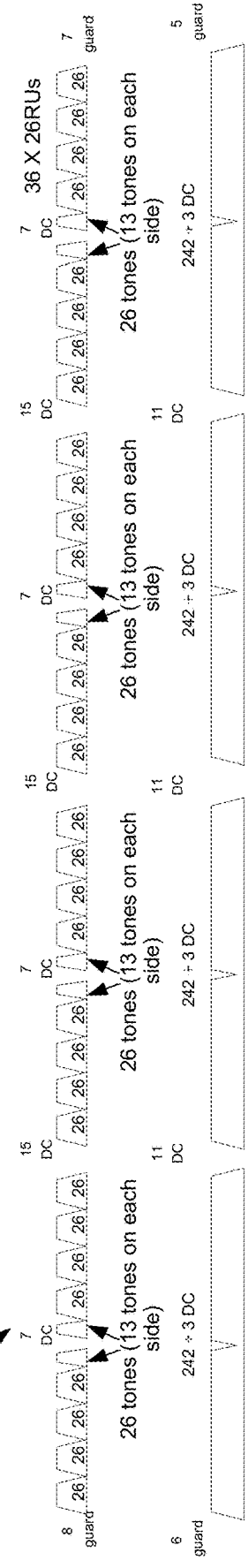
FIG. 9D
FIG. 9E

| BW | | Embodiment A | | Embodiment 1 | | Embodiment 2 | | | Embodiment B |
|---|---|---|---|---|---|---|---|---|---|
| | | No virtual allocation | With virtual allocation | Only TAUs, no STAU (guard+DC =11+7) | TAUs & STAU (guard+DC=1 1+7) | 2a: 26 tone TAU, no 20 MHz boundary) | 2a: 26 tone TAU, with 20 MHz boundary) Basic Mode | 2b: modified 2a with 20 MHz boundary) Large Allocation Mode | Option 2 30 Tone Block (5DC +11 Edge) Block Size 30/60/120/240 /496/1008 |
| 20MHz (256- 3DC- 11 Guard= 242 tones) | # useable tones | 242 | 242 | 224 | 238 | 234 | 234 | 242 | 240 |
| | # data tones | 224 | 224 | 210 | 222 | 216 | 216 | 234 | 224 |
| | # pilot tones | 18 | 18 | 14 | 16 | 18 | 18 | 8 | 16 |
| 40MHz | # useable tones | 484 | 484 | 480 | 494 | 494 | 468 | 484 | 496 |
| | # data tones | 448 | 468 | 450 | 462 | 456 | 432 | 468 | 448 |
| | # pilot tones | 36 | 16 | 30 | 32 | 38 | 36 | 16 | 32 |
| 80MHz | # useable tones | 994 | 994 | 992 | 1006 | 988 | 936 | 968 | 1008 |
| | # data tones | 920 | 960 | 930 | 942 | 912 | 864 | 936 | 896 |
| | # pilot tones | 74 | 34 | 62 | 64 | 76 | 72 | 32 | 64 |

FIG. 13

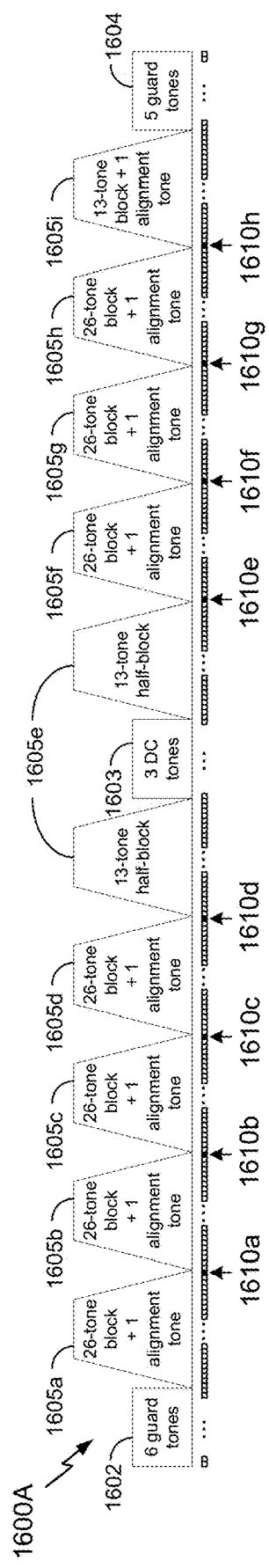
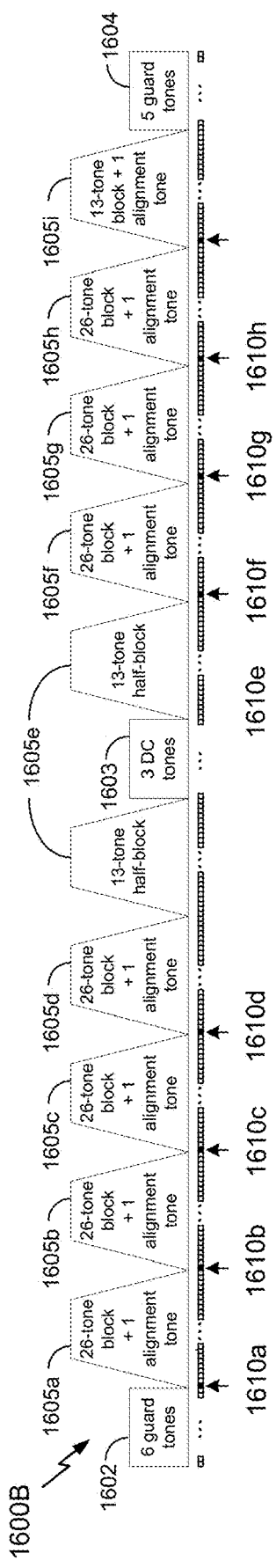
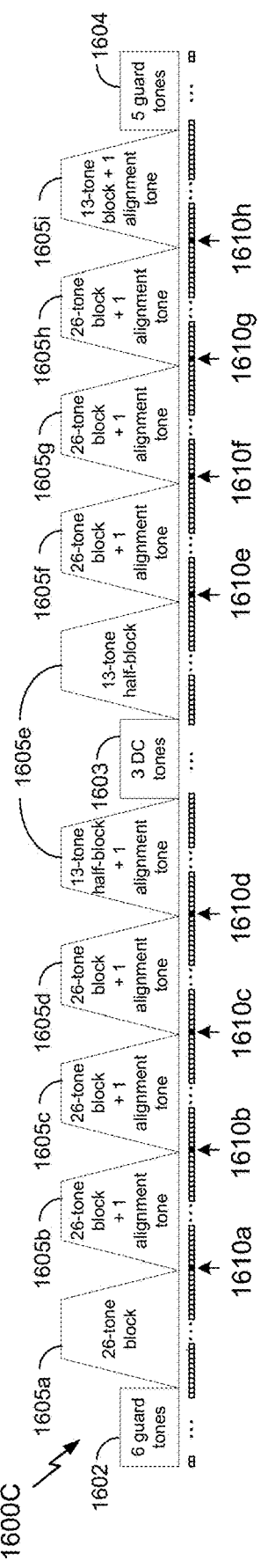
FIG. 16A
FIG. 16B
FIG. 16C

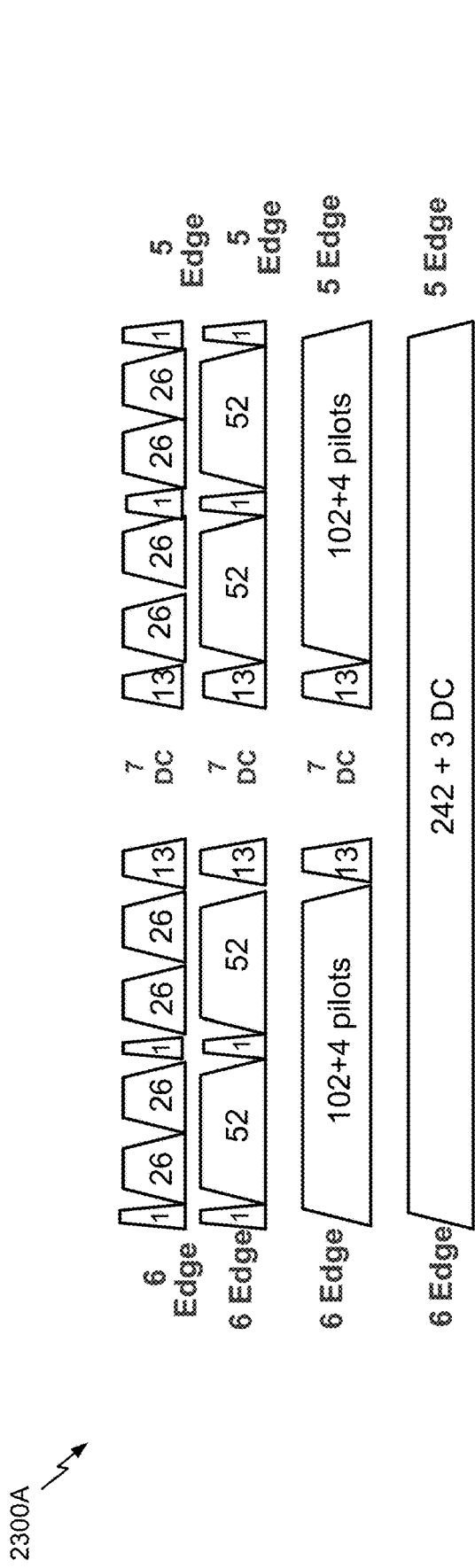
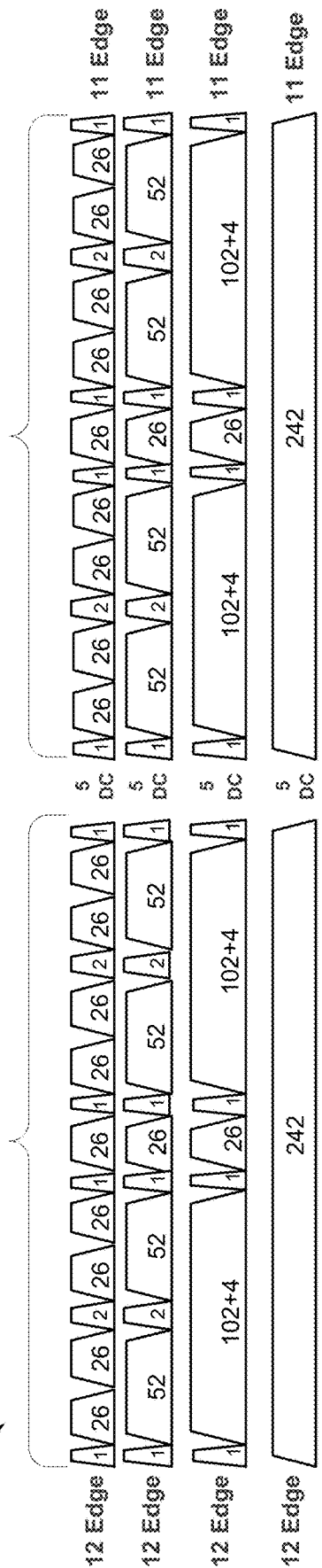
FIG. 23A
FIG. 23B

TONE PLANS FOR WIRELESS COMMUNICATION NETWORKS

PRIORITY CLAIM

This application claims the benefit of U.S. Provisional Application No. 62/081,527, filed Nov. 18, 2014; U.S. Provisional Application No. 62/086,078, filed Dec. 1, 2014; U.S. Provisional Application No. 62/101,342, filed Jan. 8, 2015; U.S. Provisional Application No. 62/112,618, filed Feb. 5, 2015; U.S. Provisional Application No. 62/116,343, filed Feb. 13, 2015; U.S. Provisional Application No. 62/154,632, filed Apr. 29, 2015; U.S. Provisional Application No. 62/157,409, filed May 5, 2015; and U.S. Provisional Application No. 62/181,171, filed Jun. 17, 2015, each of which is hereby incorporated herein by reference in its entirety.

FIELD

Certain aspects of the present disclosure generally relate to wireless communications, and more particularly, to methods and apparatuses for providing messages according to various tone plans.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

The devices in a wireless network can transmit/receive information between each other. Device transmissions can interfere with each other, and certain transmissions can selectively block other transmissions. Where many devices share a communication network, congestion and inefficient link usage can result. As such, systems, methods, and non-transitory computer-readable media are needed for improving communication efficiency in wireless networks.

SUMMARY

Various implementations of systems, methods and devices within the scope of the appended claims each have several aspects, no single one of which is solely responsible for the desirable attributes described herein. Without limiting the scope of the appended claims, some features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides an apparatus for wireless communication. The apparatus includes a memory that stores instructions. The apparatus further includes a processor coupled with the memory. The processor and the memory are configured to determine a total bandwidth for a transmission of a message, the total bandwidth including a plurality of tones. The processor is further configured to divide the plurality of tones in the total bandwidth into one or more 26-, 52-, 106-, 242-, or 996-tone blocks. The processor is further configured to determine an indication. The indication assigns one or more of the one or more tone blocks to a first wireless communication device. The apparatus further includes a transmitter configured to transmit the indication to at least the first wireless communication device or a second device.

BRIEF DESCRIPTION OF THE DRAWINGS

FIG. 4 is an illustration of a 20 MHz, a 40 MHz, and an 80 MHz transmission.

FIGS. 6A-6E illustrate 40 MHz transmissions according to various implementations.

FIGS. 7A-7E illustrate 80 MHz transmissions according to various implementations.

FIGS. 8A-8C show example 20 MHz, 40 MHz, and 80 MHz transmissions using 26-tone allocations that are aligned with 242-tone allocations, according to an embodiment.

FIGS. 9A-9E show example 20 MHz, 40 MHz, and 80 MHz transmissions using 26-tone allocations, according to some embodiments.

FIG. 13 is a chart summarizing tone plans according to various bandwidths and embodiments.

FIG. 16A shows an example 20 MHz transmission, using 26-tone allocations that are aligned with 242-tone allocations via initial alignment tones used for interference measurement, according to an embodiment.

FIG. 16B shows an example 20 MHz transmission, using 26-tone allocations that are aligned with 242-tone allocations via cyclically shifted alignment tones used for interference measurement, according to an embodiment.

FIG. 16C shows an example 20 MHz transmission, using 26-tone allocations that are aligned with 242-tone allocations via cyclically shifted alignment tones used for interference measurement, according to another embodiment.

FIGS. 23A-23C show example 20 MHz, 40 MHz, 80 MHz, and 160 MHz transmissions using 26-, 52-, 106-, 107-, 242-, and/or 996-tone allocations, according to various embodiments.

DETAILED DESCRIPTION

Figure 1:
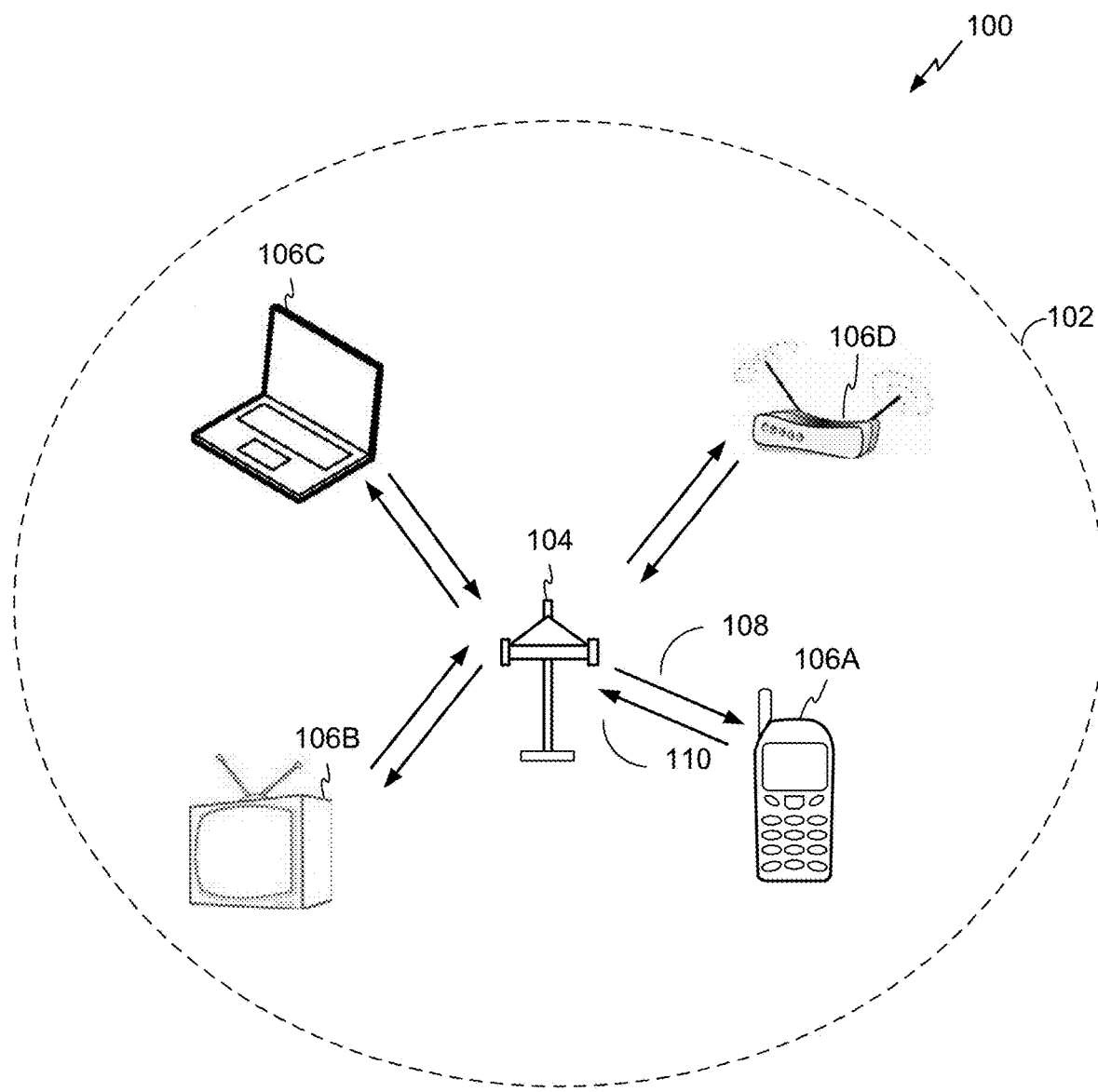
FIG. 1 illustrates an example of a wireless communication system in which aspects of the present disclosure can be employed.

Various aspects of the novel systems, apparatuses, and methods are described more fully hereinafter with reference to the accompanying drawings. The teachings of this disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Implementing Devices

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the IEEE 802.11 family of wireless protocols.

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemes.

In some implementations, a WLAN includes various devices which are the components that access the wireless network. For example, there can be two types of devices: access points ("APs") and clients (also referred to as stations, or "STAs"). In general, an AP serves as a hub or base station for the WLAN and an STA serves as a user of the WLAN. For example, an STA can be a laptop computer, a personal digital assistant (PDA), a mobile phone, etc. In an example, an STA connects to an AP via a Wi-Fi (e.g., IEEE 802.11 protocol such as 802.11ax) compliant wireless link to obtain general connectivity to the Internet or to other wide area networks. In some implementations an STA can also be used as an AP.

The techniques described herein can be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system can utilize sufficiently different directions to concurrently transmit data belonging to multiple user terminals. A TDMA system can allow multiple user terminals to share the same frequency channel by dividing the transmission signal into different time slots, each time slot being assigned to different user terminal. A TDMA system can implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, etc. With OFDM, each sub-carrier can be independently modulated with data. An OFDM system can implement IEEE 802.11 or some other standards known in the art. An SC-FDMA system can utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal.

An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed. The wireless communication system 100 can operate pursuant to a wireless standard, for example the 802.11ax standard. The wireless communication system 100 can include an AP 104, which communicates with STAs 106.

A variety of processes and methods can be used for transmissions in the wireless communication system 100 between the AP 104 and the STAs 106. For example, signals can be transmitted and received between the AP 104 and the STAs 106 in accordance with OFDM/OFDMA techniques. If this is the case, the wireless communication system 100 can be referred to as an OFDM/OFDMA system. Alternatively, signals can be transmitted and received between the AP 104 and the STAs 106 in accordance with CDMA techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

Figure 2:
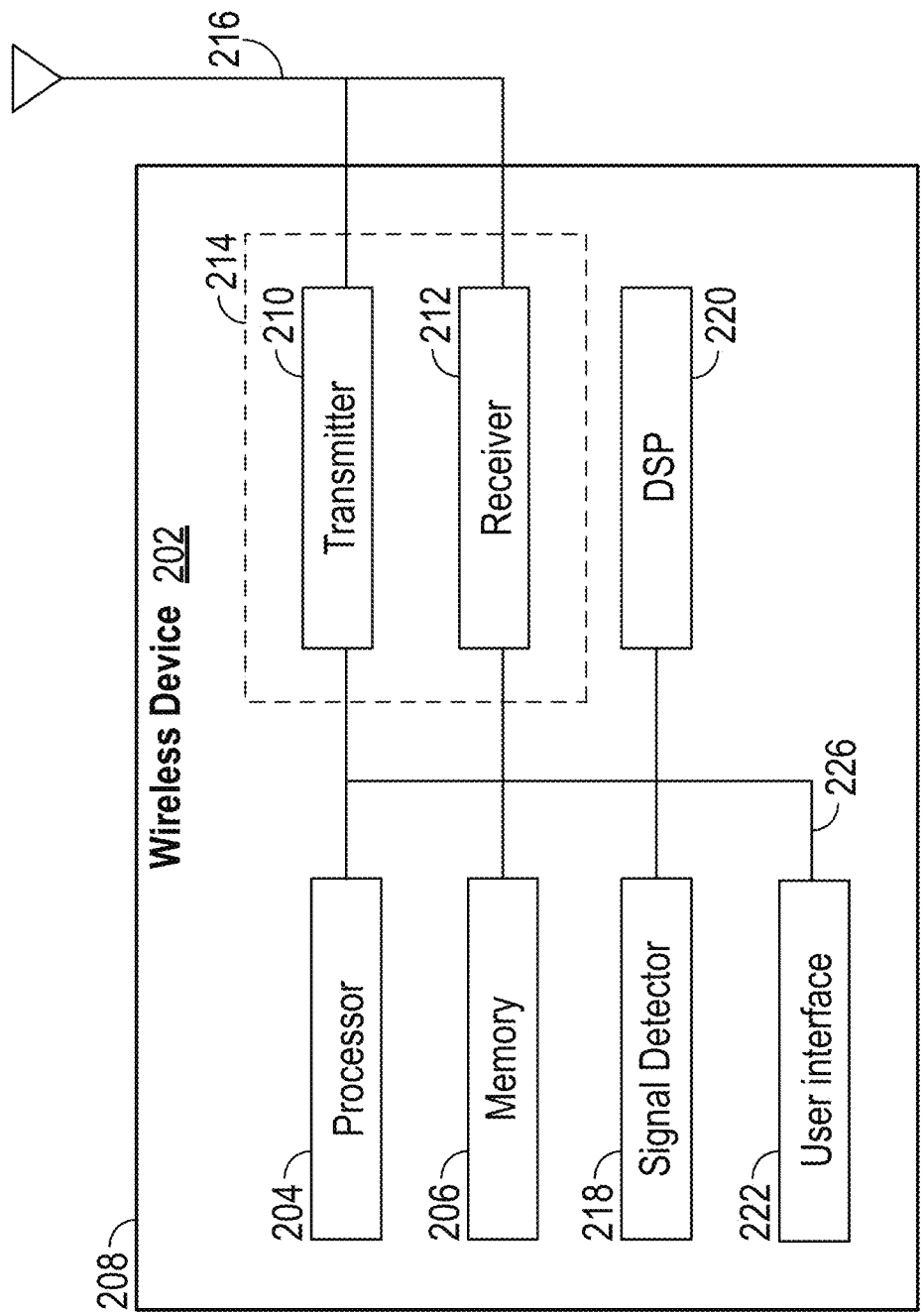
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can comprise the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during MIMO communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can comprise a physical layer data unit (PPDU). In some aspects, the PPDU is referred to as a packet.

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can comprise an AP 104 or an STA 106, and can be used to transmit and/or receive communications. The communications exchanged between devices in a wireless network can include data units which can comprise packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Certain aspects of the present disclosure support allowing APs 104 to allocate STAs 106 transmissions in optimized ways to improve efficiency. Both high efficiency wireless (HEW) stations, stations utilizing an 802.11 high efficiency protocol (such as 802.11ax), and stations using older or legacy 802.11 protocols (such as 802.11b), can compete or coordinate with each other in accessing a wireless medium. In some embodiments, the high-efficiency 802.11 protocol described herein can allow for HEW and legacy stations to interoperate according to various OFDMA tone plans (which can also be referred to as tone maps). In some embodiments, HEW stations can access the wireless medium in a more efficient manner, such as by using multiple access techniques in OFDMA. Accordingly, in the case of apartment buildings or densely-populated public spaces, APs and/or STAs that use the high-efficiency 802.11 protocol can experience reduced latency and increased network throughput even as the number of active wireless devices increases, thereby improving user experience.

In some embodiments, APs 104 can transmit on a wireless medium according to various DL tone plans for HEW STAs. For example, with respect to FIG. 1, the STAs 106A-106D can be HEW STAs. In some embodiments, the HEW STAs can communicate using a symbol duration four times that of a legacy STA. Accordingly, each symbol which is transmitted may be four times as long in duration. When using a longer symbol duration, each of the individual tones may only require one-quarter as much bandwidth to be transmitted. For example, in various embodiments, a 1× symbol duration can be 3.2 ms and a 4× symbol duration can be 12.8 ms. The AP 104 can transmit messages to the HEW STAs 106A-106D according to one or more tone plans, based on a communication bandwidth. In some aspects, the AP 104 may be configured to transmit to multiple HEW STAs simultaneously, using OFDMA.

Efficient Tone Plan Design for Multicarrier Allocation

Figure 3:
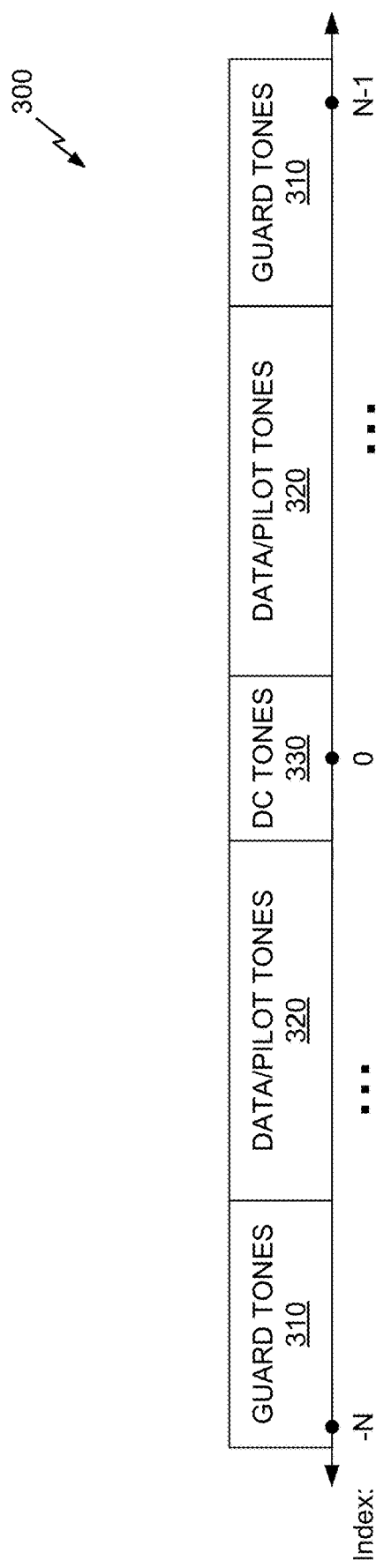
FIG. 3 shows an example 2N-tone plan, according to one embodiment.

FIG. 3 shows an example 2N-tone plan 300, according to one embodiment. In an embodiment, the tone plan 300 corresponds to OFDM tones, in the frequency domain, generated using a 2N-point FFT. The tone plan 300 includes 2N OFDM tones indexed −N to N−1. The tone plan 300 includes two sets of edge tones 310, two sets of data/pilot tones 320, and a set of direct current (DC) tones 330. In various embodiments, the edge tones 310 and DC tones 330 can be null. In various embodiments, the tone plan 300 includes another suitable number of pilot tones and/or includes pilot tones at other suitable tone locations.

In some aspects, OFDMA tone plans may be provided for transmission using a 4× symbol duration, as compared to various IEEE 802.11 protocols. For example, 4× symbol duration may use a number of symbols which are each 12.8 ms in duration (whereas symbols in certain other IEEE 802.11 protocols may be 3.2 ms in duration).

In some aspects, the data/pilot tones 320 of a transmission 300 may be divided among any number of different users. For example, the data/pilot tones 320 may be divided among between one and eight users. In order to divide the data/pilot tones 320, an AP 104 or another device may signal to the various devices, indicating which devices may transmit or receive on which tones (of the data/pilot tones 320) in a particular transmission. Accordingly, systems and methods for dividing the data/pilot tones 320 may be desired, and this division may be based upon a tone plan.

A tone plan may be chosen based on a number of different characteristics. For example, it may be beneficial to have a simple tone plan, which can be consistent across most or all bandwidths. For example, an OFDMA transmission may be transmitted over 20, 40, or 80 MHz, and it may be desirable to use a tone plan that can be used for any of these bandwidths. Further, a tone plan may be simple in that it uses a smaller number of building block sizes. For example, a tone plan may contain a unit which may be referred to as a tone allocation unit (TAU). This unit may be used to assign a particular amount of bandwidth to a particular user. For example, one user may be assigned bandwidth as a number of TAUs, and the data/pilot tones 320 of a transmission may be broken up into a number of TAUs. In some aspects, it may be beneficial to have a single size of TAU. For example, if there were two or more sizes of TAU, it may require more signaling to inform a device of the tones that are allocated to that device. In contrast, if all tones are broken up into TAUs of consistent size, signaling to a device may simply require telling a device a number of TAUs assigned to that device. Accordingly, using a single TAU size may reduce signaling and simplify tone allocation to various devices.

A tone plan may also be chosen based on efficiency. For example, transmissions of different bandwidths (e.g., 20, 40, or 80 MHz) may have different numbers of tones. Thus, it may be beneficial to choose a TAU size that leaves fewer tones leftover after the creation of the TAUs. For example, if a TAU was 100 tones, and if a certain transmission included 199 tones, this may leave 99 tones leftover after creating one TAU. Thus, 99 tones may be considered "leftover" tones, and this may be quite inefficient. Accordingly, reducing the number of leftover tones may be beneficial. It may also be beneficial if a tone plan is used which allows for the same tone plan to be used in both UL and DL OFDMA transmissions. Further, it may be beneficial if a tone plan is configured to preserve 20 and 40 MHz boundaries, when needed. For example, it may be desirable to have a tone plan which allows each 20 or 40 MHz portion to be decoded separately from each other, rather than having allocations which are on the boundary between two different 20 or 40 MHz portions of the bandwidth. For example, it may be beneficial for interference patterns to be aligned with 20 or 40 MHz channels. Further, it may be beneficial to have channel binding, such that when a 20 MHz transmission and a 40 MHz transmission are transmitted, to create a 20 MHz "hole" in the transmission when transmitted over 80 MHz. This may allow, for example, a legacy packet to be transmitted in this unused portion of the bandwidth. Finally, it may also be advantageous to use a tone plan which provides for fixed pilot tone locations in various different transmissions, such as in different bandwidths.

Generally, a number of different implementations are presented. For example, certain implementations have been made which include multiple different building blocks, such as two or more different tone units. For example, there may be a basic tone unit (BTU), and a small tone unit (STU), which is smaller than the basic tone unit. Further, the size of the BTU itself may vary based upon the bandwidth of the transmission. In another implementation, resource blocks are used, rather than tone units. However, in some aspects, it may be beneficial to use a single tone allocation unit TAU for all bandwidths of transmissions in OFDMA.

FIG. 4 is an illustration of a 20 MHz, a 40 MHz, and an 80 MHz transmission. As shown in FIG. 4, each transmission can be formed from a combination of one or more 26-tone TAUs, or one or more 242-tone TAUs. Generally, 26 tones in an IEEE 802.11ax transmission may be transmitted over a bandwidth of 2.03 MHz and 242 tones can be transmitted over a bandwidth of 18.91 MHz. For example, in one implementation, a 20 MHz transmission, having an FFT size of 256, can include 234 allocation tones formed from nine 26-tone TAUs, leaving 22 remaining tones for DC tones, edge tones, and other leftover tones. The 234 allocation tones can be used as data and pilot tones. In another implementation, a 20 MHz transmission, having an FFT size of 256, can include 242 allocation tones formed from one 242-tone TAU, leaving 14 remaining tones for DC tones, edge tones, and other leftover tones. The 242 allocation tones can be used as data and pilot tones.

As another example, in one implementation, a 40 MHz transmission, having an FFT size of 512, can include 494 allocation tones formed from 19 26-tone TAUs, leaving 18 remaining tones for DC tones, edge tones, and other leftover tones. The 494 allocation tones can be used as data and pilot tones. In another implementation, a 40 MHz transmission, having an FFT size of 512, can include 468 allocation tones formed from 18 26-tone TAUs, leaving 44 remaining tones for DC tones, edge tones, and other leftover tones. The 468 allocation tones can be used as data and pilot tones. In another implementation, a 40 MHz transmission, having an FFT size of 512, can include 484 allocation tones formed from two 242-tone TAUs, leaving 28 remaining tones for DC tones, edge tones, and other leftover tones. The 484 allocation tones can be used as data and pilot tones.

As another example, in one implementation, an 80 MHz transmission, having an FFT size of 1024, can include 988 allocation tones formed from 38 26-tone TAUs, leaving 36 remaining tones for DC tones, edge tones, and other leftover tones. The 988 allocation tones can be used as data and pilot tones. In another implementation, an 80 MHz transmission, having an FFT size of 1024, can include 936 allocation tones formed from 36 26-tone TAUs, leaving 88 remaining tones for DC tones, edge tones, and other leftover tones. The 936 allocation tones can be used as data and pilot tones. In another implementation, an 80 MHz transmission, having an FFT size of 1024, can include 968 allocation tones formed from four 242-tone TAUs, leaving 56 remaining tones for DC tones, edge tones, and other leftover tones. The 968 allocation tones can be used as data and pilot tones.

In various embodiments, the location of the 9th 26 tone block for 20 MHz implementations and the $19^{th}$ 26-tone block for 40 MHz implementations, can either cross DC or at the edges. In one embodiment, the last 26-tone block can be distributed around DC when the number of DC+leftover tones is greater than 6. In another embodiment, the last 26-tone block can be distributed at the edges when the number guards tones+leftover tones is greater than 12 20 MHz implementations and greater than 18 for 40 MHz implementations. In an embodiment, the allowed allocation unit size can be limited to reduce the TX mode. In an embodiment, the $19^{th}$ 26-tone RU in 40 MHz can go unused if the allocation unit is 2×26. In an embodiment, the $37^{th}$ and $38^{th}$ 26-tone blocks in 80 MHz implementations can go unused if the allocation unit is 4×26. In some embodiments, 26-tone blocks can be aligned with 242 tone blocks via leftover tones, as will be discussed with respect to FIG. 8. In various embodiments, 242 allocations will not destroy nearby 26-tone block usage. In various embodiments, leftover tones can be used as extra DC tones, guard tones, or as a common or control channel.

As indicated above, a number of tones may be leftover in certain transmissions. These tones can be used for a number of different uses. For example, these tones may be used as additional DC or edge tones. It may be noted here that some illustrated implementations include transmissions having an odd number of TAUs. Because of the odd number of TAUs, one of the TAUs will cross the DC tones (that is, include tones on each side of the DC tones). In other illustrated implementations, an even number of TAUs are present, so no TAU will cross the DC tones.

In some aspects, if a STA is assigned multiple TAUs, encoding may be performed across all the assigned TAUs. For sub-band OFDMA communications, interleaving may be done in two layers. First, all the bits of a device may be distributed evenly across all TAUs assigned to the device. For example, bits 1, 2, 3, . . . N may be assigned to TAUs 1, 2, 3, . . . N, and so on. Accordingly, each individual TAU may be interleaved within the TAU. Thus, only one size of interleaver may be used, that is, the size of a TAU. In a distributed OFDMA system, interleaving may or may not be needed. In some aspects, a TAU may be chosen, at least in part, based on how many pilot tones may be needed for the TAU. For example, a TAU of 26 may be beneficial in implementations where only two pilot tones per TAU are used. In implementations where more pilot tones are used, other TAUs may be used. Generally, when considering the size of a TAU, there is a trade-off between signaling costs, pilot costs, and leftover tones. For example, when smaller TAUs are used, the number of pilot tones needed (compared to the number of data tones) may increase as a proportion of the total number of tones in a TAU. Further, when smaller TAUs are used, signaling may require more data to transmit, since there will be a higher total number of TAUs which must be allocated to various devices in an OFDMA transmission. However, as larger TAUs are used, there are potentially more leftover tones, which may reduce overall throughput for a given bandwidth and be inefficient.

Figure 5A:
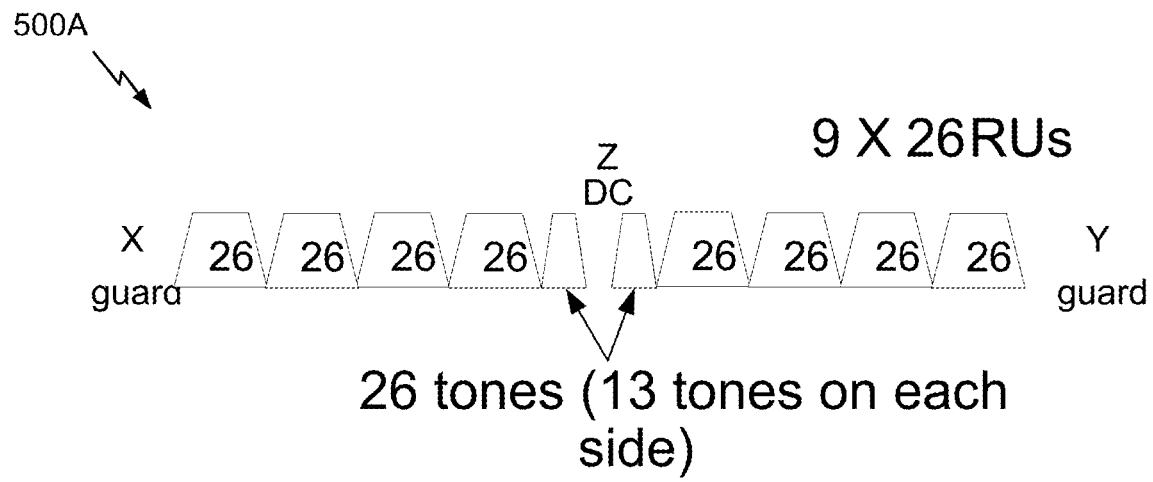
FIGS. 5A-5C illustrate 20 MHz transmissions according to various implementations.
Figure 5B:
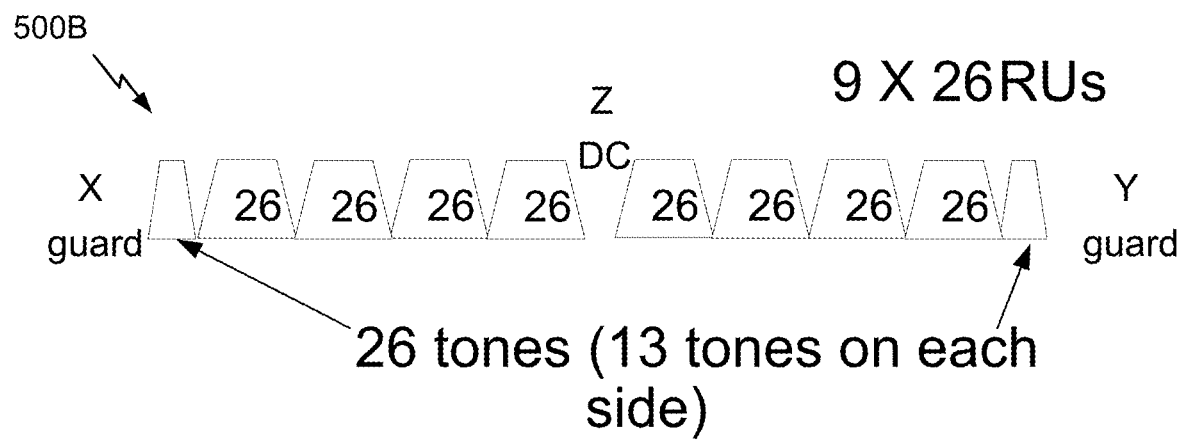
Figure 5C:
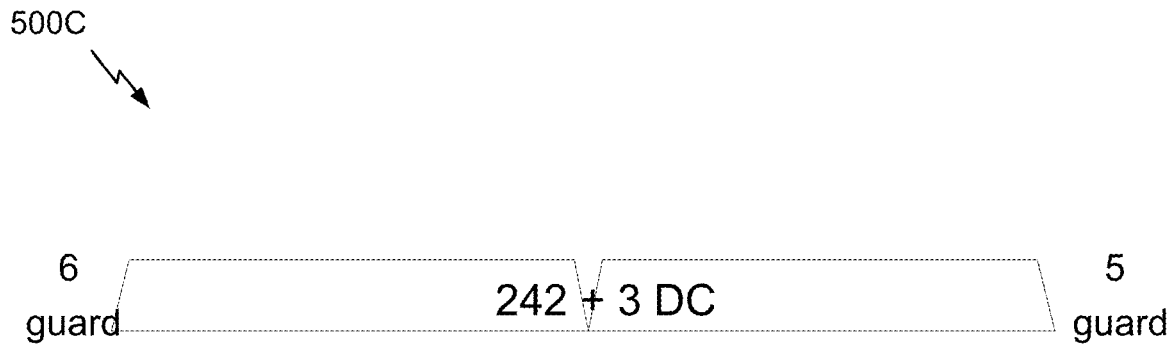

FIGS. 5A-5C illustrate 20 MHz transmissions according to various implementations. In particular, the illustrated 20 MHz transmissions show the embodiments discussed above with respect to FIG. 4. For implementations using 26-tone TAUs, each 20 MHz transmission includes a number of usable tones for OFDMA equal to floor((256−14)/26)*26=234. Accordingly, implementations using 26-tone TAUs have 8 additional leftover tones as compared to implementations having a single 242-tone TAU. In such implementations, the maximum number of DC and edge tones is 256−234=22. In general, each transmission of 26-tone TAUs can distribute these DC and edge tones as X left edge tones, Z DC tones, and Y right guard tones. In some embodiments, the number of right edge tones Y is one less than the number of left edge tones X. Moreover, in some embodiments, the number of DC tones Z is greater or equal to three, and an odd number. Thus, various implementations using 26-tone TAUs can use 11 DC tones and 11 edge tones, 9 DC tones and 13 edge tones, 7 DC tones and 15 edge tones, 5 DC tones and 17 edge tones, or 3 DC tones and 19 edge tones.

FIG. 5A is an illustration of an example 20 MHz transmission 500A using 26-tone allocations. This 20 MHz transmission includes 256 tones in total. The transmission includes X left edge tones and Y right edge tones. Edge tones may be transmitted with no data on them, in order to provide a buffer between the data tones in the transmissions and transmissions which might occur on other portions of the wireless medium. The transmission further includes Z DC tones, which may be positioned in the center of all the tones in the transmission. For example, the transmission may include tones numbered sequentially using index numbers from −128 (on the left) to 127 (on the right). The DC tones may be in the center of the tones. In an embodiment, X+Y+Z=22, and Z is an odd integer greater than or equal to 3.

The transmission 500A may include four contiguous 26-tone allocations on the left side of the DC tones, and four contiguous 26-tone allocations on the right side of the DC tones. Further, the transmission 500A may include 13 additional data tones on each side of the DC tones. These 13 additional data tones on each side may be combined together, in order to form a $9^{th}$ 26-tone allocation. Accordingly, the transmission 500A may include 9 26-tone allocations, each of which may include 24 data tones and 2 pilot tones.

In various embodiments, the $9^{th}$ 26-tone allocation can be located on each side of the DC tones when the transmission 500A has more than 7 DC tones. In another embodiment, the $9^{th}$ 26-tone allocation can be located at the edges of the transmission when the transmission has greater than 13 edge tones, as shown in FIG. 5B below.

FIG. 5B is an illustration of another example 20 MHz transmission 500B using 26-tone allocations. This 20 MHz transmission includes 256 tones in total. The transmission includes X left edge tones and Y right edge tones. Edge tones may be transmitted with no data on them, in order to provide a buffer between the data tones in the transmissions and transmissions which might occur on other portions of the wireless medium. The transmission further includes Z DC tones, which may be positioned in the center of all the tones in the transmission. For example, the transmission may include tones numbered sequentially using index numbers from −128 (on the left) to 127 (on the right). The DC tones may be in the center of the tones.

The transmission 500B may include four contiguous 26-tone allocations on the left side of the DC tones, and four contiguous 26-tone allocations on the right side of the DC tones. Further, the transmission 500B may include 13 additional data tones on each side of the first eight 26-tone allocations. These 13 additional data tones on each side may be combined together, in order to form a $9^{th}$ 26-tone allocation. Accordingly, the transmission 500B may include 9 26-tone allocations, each of which may include 24 data tones and 2 pilot tones.

In various embodiments, the $9^{th}$ 26-tone allocation can be located at the edges of the transmission when the transmission 500B has more than 13 edge tones. In another embodiment, when the transmission has more than 7 DC tones, the $9^{th}$ 26-tone allocation can be located on each side of the DC tones, as shown in FIG. 5A above.

FIG. 5C is an illustration of another example 20 MHz transmission 500C using a 242-tone allocation. As illustrated, a 20 MHz transmission may include a single 242-tone allocation plus 3 DC tones (in the center of the 20 MHz portion). In some aspects, this transmission may include 6 left edge tones and 5 right edge tones, as well as 3 DC tones.

In some embodiments, the 20 MHz transmission 500C can use a tone plan that is based on an IEEE 802.11ac VHT80 (Very High Throughput 80 MHz) transmission. Since this 20 MHz packet may include 4× symbol duration relative to 802.11ac, the packet may have the same number of tones as an 80 MHz transmission in 802.11ac. Thus, the 80 MHz transmission from 802.11ac may be used as a 20 MHz transmission here. One possible issue with this, however, is that such a transmission includes only 3 DC tones. This may be an insufficient number of DC tones for a 4× symbol duration transmission. In a 40 MHz transmission, a new tone plan may be used, or two VHT80 transmissions (VHT80+80 or VHT160) may be used. For example, in 802.11ac, a 160 MHz transmission may be transmitted by using the 80 MHz VHT80 tone plan, duplicated twice. For an 80 MHz transmission, this may use a new tone plan, or may use a duplicated 40 MHz tone plan (that is, four VHT80 transmissions from IEEE 802.11ac). Generally, however, duplicating these transmissions may result in having more pilot tones than may otherwise be necessary, as the number of pilot tones may not grow linearly as the number of data tones grows. That is, in larger transmissions, proportionally fewer pilot tones may be needed. For example, it may be possible to double the number of data tones, while only needing two additional pilot tones, rather than requiring that pilot tones also double It may be noted that each 20 MHz portion of the transmission may use either a VHT80-like tone plan of FIG. 5C (when the 20 MHz portion is assigned to only one device) or the 9 26-tone tone groups described above, such as in FIGS. 5A-5B. It may be observed that, when transmitted to a single device, transmitting using a VHT80-like tone plan may allow for 234 data tones in 20 MHz, while using a 26-tone tone group transmission may allow for only 216 data tones (9 tone groups, each with 24 data tones and 2 pilot tones). Accordingly, it may be more efficient to use the 242 usable tone VHT80-like portions when possible, in order to allow for more data tones to be transmitted in a given bandwidth. It may also be observed that the use of such a 20

MHz portion still allows for each 20 MHz portion of a transmission to includes its own edge tones and DC tones, such that the 20 MHz portion may be received by an 'HE20-mode' device which may be configured to receive only a 20 MHz transmission, and not larger transmissions.

FIGS. 6A-6E illustrate 40 MHz transmissions according to various implementations. In particular, the illustrated 40 MHz transmissions show the embodiments discussed above with respect to FIG. 4. For implementations using 19 26-tone TAUs, each 40 MHz transmission includes a number of usable tones for OFDMA equal to floor ((512−14)/26)*26, 19*26, 494, which is greater than for implementations using two 242-tone TAUs (2*242=484), which is greater than for implementations using 18 26-tone TAUs (18*26=468). In such implementations, the maximum number of DC and edge tones is 18 for implementations using 19 26-tone TAUs, 28 for implementations using two 242-tone TAUs, and 44 for implementations using 18 26-tone TAUs. In general, each transmission can distribute these DC and edge tones as X left edge tones, Z DC tones, and Y right guard tones. In some embodiments, the number of right edge tones Y is one less than the number of left edge tones X. Moreover, in some embodiments, the number of DC tones Z is greater or equal to three, and an odd number. Thus, various implementations using 19 26-tone TAUs can use 3 DC tones and 15 edge tones, 5 DC tones and 13 edge tones, or 7 DC tones and 11 edge tones. Various implementations using two 242-tone TAUs with no sub-allocation DC tones can use 9 DC tones and 19 edge tones, 7 DC tones and 21 edge tones, 5 DC tones and 23 edge tones, or 3 DC tones and 25 edge tones. Various implementations using two 242-tone TAUs with sub-allocation DC tones can use 11 DC tones, 11 edge tones, and two sets of 3 sub-allocation DC tones. Various implementations using 18 26-tone TAUs can use 5 DC tones and 39 edge tones, 7 DC tones and 37 edge tones, and so on with no sub-allocation DC tones. Other implementations using 18 26-tone TAUs can use 3 DC tones and 19 edge tones.

FIG. 6A is an illustration of a 40 MHz transmission that uses certain tones in the 20 MHz-compatible transmission as additional useable tones. For example, in certain aspects, all the STAs that are sending or receiving data in a given transmission may be compatible with 40 MHz transmissions. That is, there may not be any STAs that need a 20 MHz portion that includes its own guard and DC tones in a given transmission. Accordingly, it may be beneficial to provide a mechanism whereby certain tones that were guard or DC tones in transmission 600A may be "grabbed" so that they may become useable tones (pilot or data tones, which can be assigned to a device). Thus, transmission 600A includes each of the 18 26-tone allocations of transmission 500A, in the same tone locations.

However, in addition to this, transmission 600A includes one additional 26-tone allocation which may be assigned to a device. This additional 26-tone allocation is made up of the 14 tones (7 on each side) that would otherwise be DC tones for a 20 MHz portion in transmission 600A. Since no HE20-mode devices are included in transmission 600A, these additional DC tones may not be needed. Accordingly, these 14 tones may be repurposed as usable tones. Further, 5 tones from each side (10 tones in total) of the 15 central DC tones of transmission 600A may be repurposed as usable tones as well. This may result in transmission 600A having only 5 DC tones. Finally, transmission 2950 may also have one tone on each side repurposed from being a guard tone in transmission 600A to being a usable tone.

Thus, transmission 600A may contain each of the tone allocation units of two transmissions 500A. However, transmission 600A may further contain one additional tone allocation unit. This additional tone allocation unit may be made up of tones which were used, in two transmissions 500A, as 2 edge tones, 14 'HE20' DC tones, and 10 DC tones. These 26 tones may be combined together to form one additional tone allocation unit, such that transmission 600A may contain 19 26-tone allocations.

In various embodiments, additional tones discussed herein can also be referred to as extra tones, spare tones, or usable tones. Although various locations for additional tones are shown and discussed herein, additional tones can variously be located near or adjacent to DC tones, near or adjacent to an edge, distributed at both DC and edge, in-between 26-tones RUs, and so forth.

The transmission 600A includes X left edge tones and Y right edge tones. Edge tones may be transmitted with no data on them, in order to provide a buffer between the data tones in the transmissions and transmissions which might occur on other portions of the wireless medium. The transmission 600A further includes Z DC tones, which may be positioned in the center of all the tones in the transmission. For example, the transmission 600A may include tones numbered sequentially using index numbers from −256 (on the left) to 255 (on the right). The DC tones may be in the center of the tones. In an embodiment, $X+Y+Z=18$, and Z is an odd integer greater than or equal to 3. In an embodiment, the transmission 600A does not support HE20.

FIG. 6B is an illustration of example 40 MHz transmissions 600B and 650B using 26-tone allocations. The 40 MHz transmissions 600B and 650B include 512 tones in total. The transmission includes X left edge tones and Y right edge tones. Edge tones may be transmitted with no data on them, in order to provide a buffer between the data tones in the transmissions and transmissions which might occur on other portions of the wireless medium. The transmission further includes Z DC tones, which may be positioned in the center of all the tones in the transmission. For example, the transmission may include tones numbered sequentially using index numbers from −256 (on the left) to 255 (on the right). The DC tones may be in the center of the tones. In an embodiment, $X+Y+Z=18$, and Z is an odd integer greater than or equal to 3.

The transmission 600B may include nine contiguous 26-tone allocations on the left side of the DC tones, and nine contiguous 26-tone allocations on the right side of the DC tones. Further, the transmission 600B may include 13 additional data tones on each side of the DC tones. These 13 additional data tones on each side may be combined together, in order to form a $19^{th}$ 26-tone allocation. Accordingly, the transmission 600B may include 19 26-tone allocations, each of which may include 24 data tones and 2 pilot tones.

In various embodiments, the $19^{th}$ 26-tone allocation can be located on each side of the DC tones when the transmission 600B has more than or equal to 7 DC tones. In another embodiment, when the transmission has more than or equal to 19 edge tones, the $19^{th}$ 26-tone allocation can be located at the edges of the transmission. In an embodiment, the transmission 600B does not support HE20.

The transmission 650C may include nine contiguous 26-tone allocations on the left side of the DC tones, and nine contiguous 26-tone allocations on the right side of the DC tones. Further, the transmission 650C may include 13 additional data tones on each side of the first eighteen 26-tone allocations. These 13 additional data tones on each side may be combined together, in order to form a 19th 26-tone allocation. Accordingly, the transmission 650C may include 19 26-tone allocations, each of which may include 24 data tones and 2 pilot tones.

In various embodiments, the 19th 26-tone allocation can be located at the edges of the transmission when the transmission 650C has more than or equal to 19 edge tones. In another embodiment, when the transmission has more than or equal to 7 DC tones, the 19th 26-tone allocation can be located on each side of the DC tones. In an embodiment, the transmission 650B does not support HE20.

FIG. 6C is an illustration of example 40 MHz transmissions 600C and 650C using 242-tone allocations. As illustrated, a 40 MHz transmission may include two 242-tone allocations, either with 3 DC tones (in the center of the 20 MHz portion, see transmission 600C) or without sub-DC tones (see transmission 650C). In some aspects, this transmission 600C may include 6 left edge tones and 5 right edge tones, as well as 11 DC tones (which, it may be observed, are made up from the left and right edge tones of the two 20 MHz portions). The transmission 650C can include X left edge tones and Y right edge tones. Edge tones may be transmitted with no data on them, in order to provide a buffer between the data tones in the transmissions and transmissions which might occur on other portions of the wireless medium. The transmission 650C further includes Z DC tones, which may be positioned in the center of all the tones in the transmission. The transmission includes X left edge tones and Y right edge tones. In an embodiment, X+Y+Z=28, and Z is an odd integer greater than or equal to 3. In an embodiment, the transmission 600C can support HE20, whereas the transmission 600D does not support HE20.

FIG. 6D is an illustration of example 40 MHz transmissions 600D and 650D using 26-tone allocations. As illustrated, a 40 MHz transmission 600D includes two 20 MHz transmissions 500A, and a 40 MHz transmission 650D includes two 20 MHz transmissions 500B. The transmissions 600D and 650D can include X left edge tones and Y right edge tones. Edge tones may be transmitted with no data on them, in order to provide a buffer between the data tones in the transmissions and transmissions which might occur on other portions of the wireless medium. The transmissions 600D and 650D further include two sets of Z sub-allocation DC tones and X+Y DC tones, which may be positioned in the center of all the tones in the transmission. In an embodiment, X+Y+Z=22, and Z is an odd integer greater than or equal to 3. In an embodiment, the transmissions 600D and 650D can support HE20.

In some embodiments, a common or control channel (together with DC and edge tones) can use the leftover tones. For example, for 20 MHz transmissions, a common/control resource block can be selected to be the leftover tones and/or the 9th 26-tone block. For 40 MHz transmissions, a common/control resource block can be selected to be the leftover tones and/or the 19th 26-tone block. For 40 MHz transmissions, a common/control resource block can be selected to be the leftover tones. In various embodiments, the common/control channel can be used for any of: UL and/or DL, for time/frequency synchronization, sounding, packet detection, collection of a list of neighbors for adaptive CCA, in UL for bystander information about the UL schedule, etc. In some embodiments, the AP 104 is responsible for transmitting on the common/control channel. In other embodiments, STAs or bystanders can transmit on the common/control channel. In some embodiments, bystanders can monitor the UL common/control channel and process messages thereon. In some embodiments, all STAs 106 in a multiuser group can process DL messages on the common/control channel.

Figure 6E:
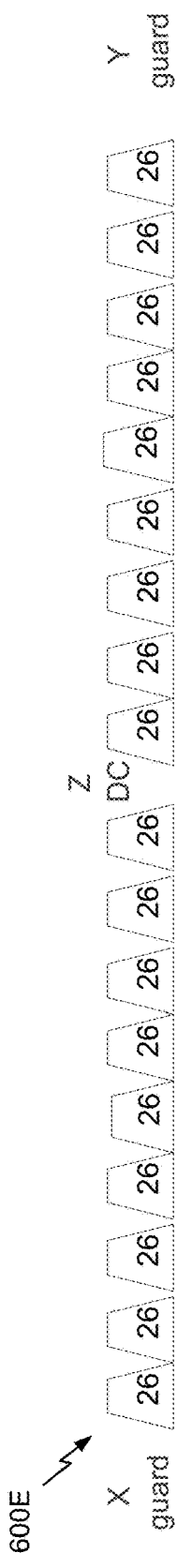

FIG. 6E is an illustration of another example 40 MHz transmission 600E using 26-tone allocations. This 40 MHz transmission includes 512 tones in total. The transmission includes X left edge tones and Y right edge tones. Edge tones may be transmitted with no data on them, in order to provide a buffer between the data tones in the transmissions and transmissions which might occur on other portions of the wireless medium. The transmission further includes Z DC tones, which may be positioned in the center of all the tones in the transmission. For example, the transmission may include tones numbered sequentially using index numbers from −256 (on the left) to 255 (on the right). The DC tones may be in the center of the tones. In an embodiment, X+Y+Z=44, and Z is an odd integer greater than or equal to 3.

The transmission 600E may include nine contiguous 26-tone allocations on the left side of the DC tones, and nine contiguous 26-tone allocations on the right side of the DC tones. Accordingly, the transmission 600E may include 18 26-tone allocations, each of which may include 24 data tones and 2 pilot tones. In an embodiment, the transmission 600E does not support HE20.

FIGS. 7A-7E illustrate 80 MHz transmissions according to various implementations. In particular, the illustrated 80 MHz transmissions show the embodiments discussed above with respect to FIG. 4. For implementations using 38 26-tone TAUs, each 80 MHz transmission includes a number of usable tones for OFDMA equal to floor ((1024−14)/26)*26, 38*26, 988, which is greater than for implementations using four 242-tone TAUs (4*242=968), which is greater than for implementations using 36 26-tone TAUs (36*26=936). In such implementations, the maximum number of DC and edge tones is 36 for implementations using 38 26-tone TAUs, 56 for implementations using four 242-tone TAUs, and 88 for implementations using 36 26-tone TAUs. In general, each transmission can distribute these DC and edge tones as X left edge tones, Z DC tones, and Y right guard tones. In some embodiments, the number of right edge tones Y is one less than the number of left edge tones X. Moreover, in some embodiments, the number of DC tones Z is greater or equal to three, and an odd number. Thus, various implementations using 38 26-tone TAUs can use 3 DC tones and 33 edge tones, 5 DC tones and 31 edge tones, 7 DC tones and 29 edge tones, 9 DC tones and 27 edge tones, 11 DC tones and 25 edge tones, 13 DC tones and 23 edge tones, 15 DC tones and 21 edge tones, 17 DC tones and 19 edge tones, 19 DC tones and 17 edge tones, 21 DC tones and 15 edge tones, 23 DC tones and 13 edge tones, 23 DC tones and 11 edge tones, 11 DC tones and 11 edge tones, plus two sets of 7 sub-DC tones, 13 DC tones and 13 edge tones, plus two sets of 5 sub-DC tones, 11 DC tones and 3 edge tones, plus 22 sub-DC tones, 11 DC tones and 5 edge tones, plus 20 sub-DC tones. Various implementations using four 242-tone TAUs with sub-allocation DC tones can use 11+11+11+11+4*3 tones, and without sub-allocation DC tones can use 3 DC tones and 31 edge tones (with 22 leftover), 5 DC tones and 31 edge tones (with 20 leftover), 3 DC tones and 11 edge tones (with 42 leftover), 5 DC tones and 11 edge tones (with 40 leftover), 7 DC tones and 11 edge tones (with 38 leftover), and so on. Various implementations using 36 26-tone TAUs can use 3 DC tones and 85 edge tones, 5 DC tones and 83 edge tones, 7 DC tones and 81 edge tones, and so on (including 3+31+54, 5+31+52, 7+31+50, 3+11+74, 5+11+72, 7+11+70, etc.).

Figure 7A:
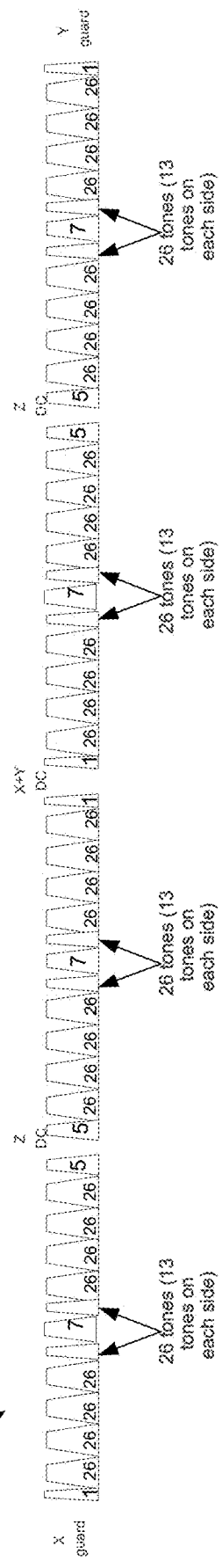

FIG. 7A is an illustration of an 80 MHz transmission 700A that uses certain tones in the 20 MHz-compatible transmission as additional useable tones. The 80 MHz transmission 700A includes 1024 tones in total. For example, the transmission 700A can include two copies of the 40 MHz transmission 600A, which in turn each includes 19 26-tone TAUs. Accordingly, the transmission 700A can include a total of 38 26-tone TAUs. The transmission 700A includes X left edge tones and Y right edge tones. Edge tones may be transmitted with no data on them, in order to provide a buffer between the data tones in the transmissions and transmissions which might occur on other portions of the wireless medium. The transmission 700A further includes Z DC tones, which may be positioned in the center of all the tones in the transmission. For example, the transmission 700A may include tones numbered sequentially using index numbers from −512 (on the left) to 511 (on the right). The DC tones may be in the center of the tones. In an embodiment, X+Y+Z=18, and Z is an odd integer greater than or equal to 3. In an embodiment, the transmission 700A can support inner HE20.

Figure 7B:

FIG. 7B is an illustration of another example 80 MHz transmission 700B using 26-tone allocations. This 80 MHz transmission includes 1024 tones in total. The transmission includes X left edge tones and Y right edge tones. Edge tones may be transmitted with no data on them, in order to provide a buffer between the data tones in the transmissions and transmissions which might occur on other portions of the wireless medium. The transmission further includes Z DC tones, which may be positioned in the center of all the tones in the transmission. For example, the transmission may include tones numbered sequentially using index numbers from −512 (on the left) to 511 (on the right). The DC tones may be in the center of the tones. In an embodiment, X+Y+Z=36, and Z is an odd integer greater than or equal to 3.

The transmission 700B may include 19 contiguous 26-tone allocations on the left side of the DC tones, and 19 contiguous 26-tone allocations on the right side of the DC tones. Accordingly, the transmission 700B may include 38 26-tone allocations, each of which may include 24 data tones and 2 pilot tones. In an embodiment, the transmission 700B can support inner HE20.

Figure 7C:
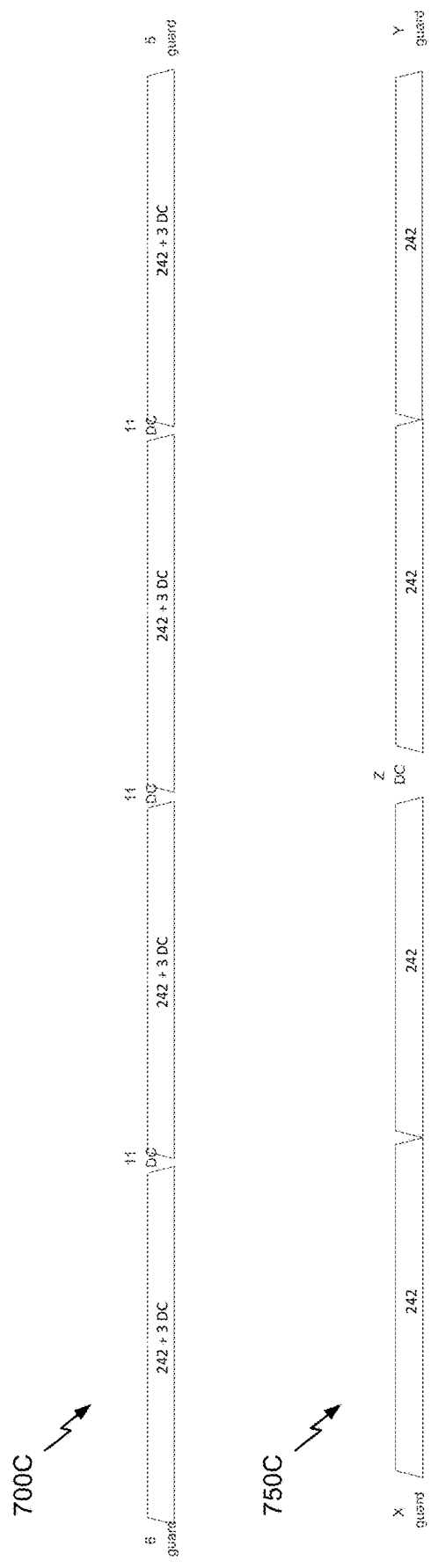

FIG. 7C is an illustration of example 80 MHz transmissions 700C and 750C using 242-tone allocations. As illustrated, an 80 MHz transmission may include two 242-tone allocations, either with 3 DC tones (in the center of each 20 MHz portion, see transmission 700C) or without sub-DC tones (see transmission 750C). In some aspects, this transmission 700C may include 6 left edge tones and 5 right edge tones, as well as three sets of 11 DC tones (which, it may be observed, are made up from the left and right edge tones of the four 20 MHz portions). The transmission 750C can include X left edge tones and Y right edge tones. Edge tones may be transmitted with no data on them, in order to provide a buffer between the data tones in the transmissions and transmissions which might occur on other portions of the wireless medium. The transmission 750C further includes Z DC tones, which may be positioned in the center of all the tones in the transmission. The transmission includes X left edge tones and Y right edge tones. In an embodiment, X+Y+Z=56, and Z is an odd integer greater than or equal to 3. In an embodiment, the transmission 700C can support HE20, whereas the transmission 750C does not support HE20.

FIG. 7D is an illustration of example 80 MHz transmissions 700D and 750D using 26-tone allocations. As illustrated, a 80 MHz transmission 700D includes four 20 MHz transmissions 500A, and a 80 MHz transmission 750D includes four 20 MHz transmissions 500B. The transmissions 700D and 750D can include X left edge tones and Y right edge tones. Edge tones may be transmitted with no data on them, in order to provide a buffer between the data tones in the transmissions and transmissions which might occur on other portions of the wireless medium. The transmissions 700D and 750D further include four sets of Z sub-allocation DC tones and three sets of X+Y DC tones, which may be positioned in the center of all the tones in the transmission. In an embodiment, X+Y+Z=22, and Z is an odd integer greater than or equal to 3. In some embodiments, a common channel (together with DC and edge tones) can use the leftover tones. In an embodiment, the transmissions 700D and 750D can support HE20.

FIG. 7E is an illustration of another example 80 MHz transmission 700E using 26-tone allocations. This 80 MHz transmission includes 1024 tones in total. The transmission includes X left edge tones and Y right edge tones. Edge tones may be transmitted with no data on them, in order to provide a buffer between the data tones in the transmissions and transmissions which might occur on other portions of the wireless medium. The transmission further includes Z DC tones, which may be positioned in the center of all the tones in the transmission. For example, the transmission may include tones numbered sequentially using index numbers from −256 (on the left) to 255 (on the right). The DC tones may be in the center of the tones. In an embodiment, X+Y+Z=88, and Z is an odd integer greater than or equal to 3.

The transmission 700E may include 18 contiguous 26-tone allocations on the left side of the DC tones, and 18 contiguous 26-tone allocations on the right side of the DC tones. Accordingly, the transmission 700E may include 36 26-tone allocations, each of which may include 24 data tones and 2 pilot tones. In an embodiment, the transmission 700E does not support HE20.

As discussed above, in some embodiments, transmissions can omit support for HE20 communications. In some embodiments, 26-tone and 242-tone spectrum can be aligned when there are the same number of guard tones, DC tones, etc. Advantageously, aligned tone plans can allow 26-tone allocations to coexist with adjacent 242-tone allocations without causing detrimental interference. In an embodiment, transmissions can have 3 DC tones for SU/MU MIMO communications and 3 or more DC tones for ODFMA communications. In some embodiments, 20 MHz transmissions can have at least 13 guard tones, 40 MHz transmissions can have at least 19 guard tones, and 80 MHz transmissions can have at least 31 guard tones. Accordingly, on 20 dBr BW, such transmissions can remain within extended bandwidth (EBW), assuming restricted bandwidth (RBW) ~=1% of EBW is used for bandwidth (BW) measurements. In other embodiments, 20 MHz transmissions can have 11 guard tones, 40 MHz transmissions can have at least 11 guard tones.

Figure 8A:
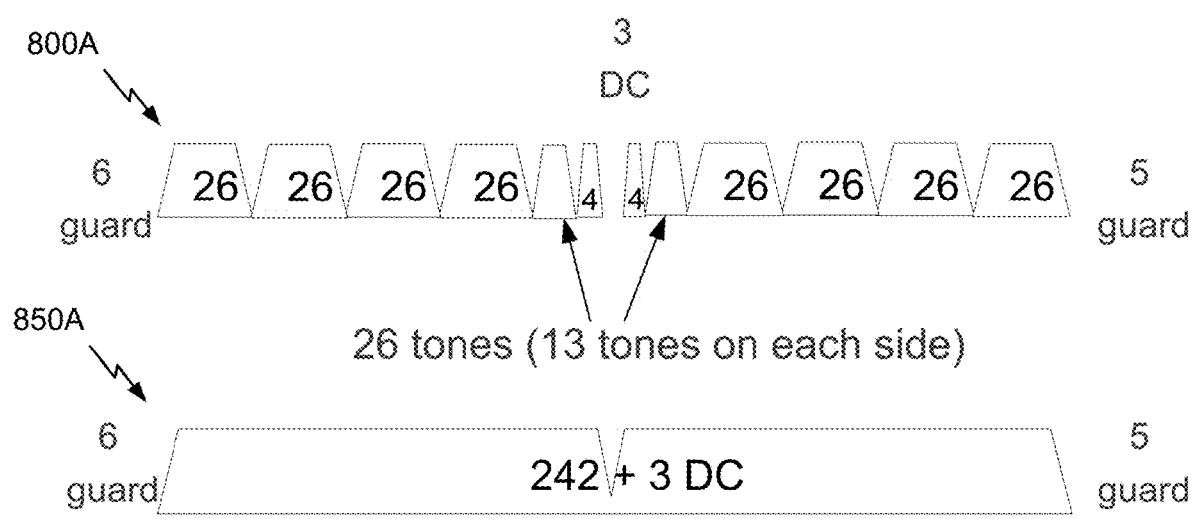

FIGS. 8A-8C show example 20 MHz, 40 MHz, and 80 MHz transmissions 900A-900C using 26-tone allocations that are aligned with 242-tone allocations 950B-950C, according to an embodiment. In particular, FIG. 8A shows an example 20 MHz transmission 800A, which is organized the same as the 20 MHz transmission 500A of FIG. 5A, with the addition of four allocated tones (from eight total additional tones) on each side of the DC tones. In some non-aligned embodiments, the from eight total additional tones can be allocated as two tones on each side of the DC tones, and two tones on each edge of the tone plan. Accordingly, the transmission 800A has 6 left edge tones, 3 DC tones, and 5 right edge tones, and a total of 242 usable tones to match the 242-tone transmission 850A.

FIG. 8B shows an example 40 MHz transmission 800B, which is organized the same as the 40 MHz transmission 600E of FIG. 6E, with the addition of eight allocated tones (sixteen total additional tones) on each side of the DC tones. In some embodiments, the sixteen total additional tones can be allocated as eight tones each edge of the tone plan. Accordingly, the transmission 800B has 11 left edge tones, 7 DC tones, and 10 right edge tones, and a total of 484 usable tones to match the 484-tone transmission 850B. In an embodiment, the transmission 800B does not support HE20.

FIG. 8C shows an example 80 MHz transmission 800C, which is organized the same as the 80 MHz transmission 700E of FIG. 7E, with the addition of eight allocated tones on either side of the DC tones and eight allocated tones on the outer edges (a total of 32 additional allocated tones). In some embodiments, the sixteen total additional tones can be allocated as eight tones on each side of the two middles of each half bandwidth (for example, eight tones after the $9^{th}$ 26-tone allocation, eight tones before the $10^{th}$ 26-tone allocation, eight tones after the $27^{th}$ 26-tone allocation, and eight tones before $28^{th}$ 26-tone allocation). Accordingly, the transmission 800C has 25 left edge tones, 7 DC tones, and 24 right edge tones, and a total of 968 usable tones to match the 968-tone transmission 850C. In an embodiment, the transmission 800C does not support HE20.

Figure 9A:
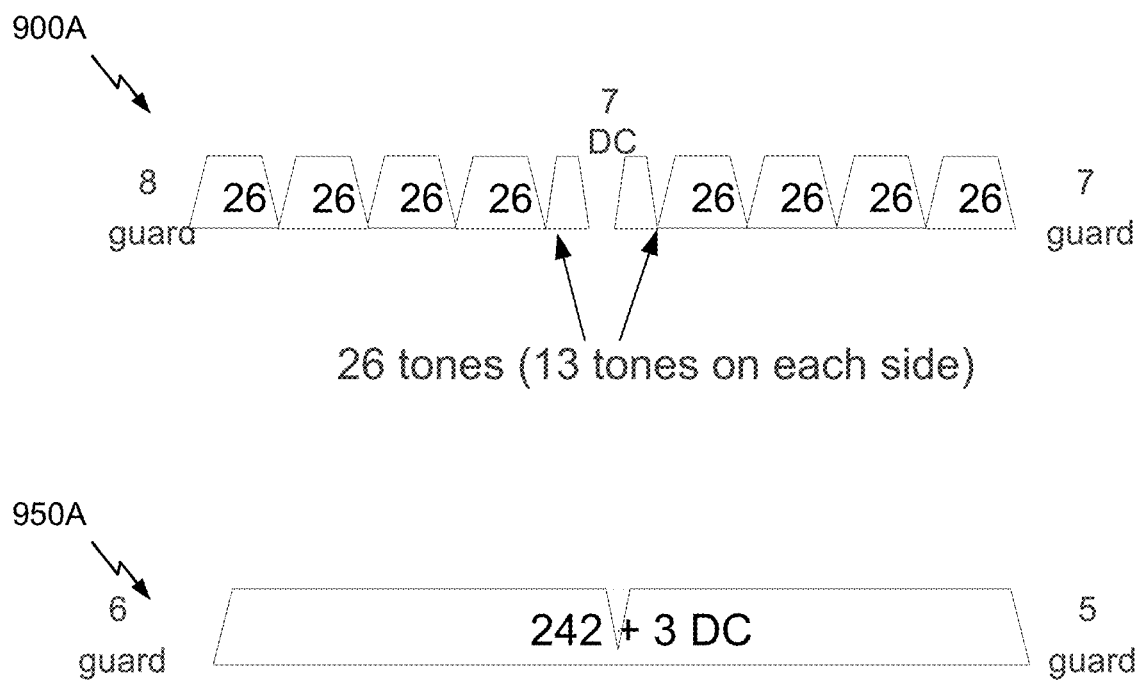

FIGS. 9A-9E show example 20 MHz, 40 MHz, and 80 MHz transmissions using 26-tone allocations, according to some embodiments. In particular, FIG. 9A shows a 20 MHz transmission 900A, which is organized the same as the 20 MHz transmission 500A of FIG. 5A, with the addition of our extra DC tones and four extra edge tones. Accordingly, the transmission 900A has 8 left edge tones, 7 DC tones, and 7 right edge tones. FIG. 9B shows a 40 MHz transmission 900B, which is organized the same as the 40 MHz transmission 600D of FIG. 6D, with the addition of four extra DC tones and four extra edge tones. Accordingly, the transmission 900B has 6 left edge tones, 7 DC tones, and 5 right edge tones. FIG. 9C shows an 80 MHz transmission 900C, which is organized the same as the 80 MHz transmission 700D of FIG. 7d, with the addition of four extra DC tones and four extra edge tones. Accordingly, the transmission 900C has 16 left edge tones, 5 DC tones, and 15 right edge tones. In an embodiment, the transmissions 900B, 950B, 900C, and 950C do not support HE20.

FIG. 9D shows a 40 MHz transmission 900D, which is organized the same as the 40 MHz transmission 600B of FIG. 6B, with the addition of four extra DC tones and four extra edge tones. Accordingly, the transmission 900D has 8 left edge tones, two sets of 7 sub-allocation DC tones, 15 DC tones, and 7 right edge tones. FIG. 9E shows an 80 MHz transmission 900E, which is organized the same as the 80 MHz transmission 700B of FIG. 7B, with the addition of four extra DC tones and four extra edge tones. Accordingly, the transmission 900E has 8 left edge tones, four sets of 7 sub-allocation DC tones, three sets of 15 DC tones, and 7 right edge tones. In an embodiment, the transmissions 900D, 950D, 900E, and 950E can support HE20.

Figure 10:
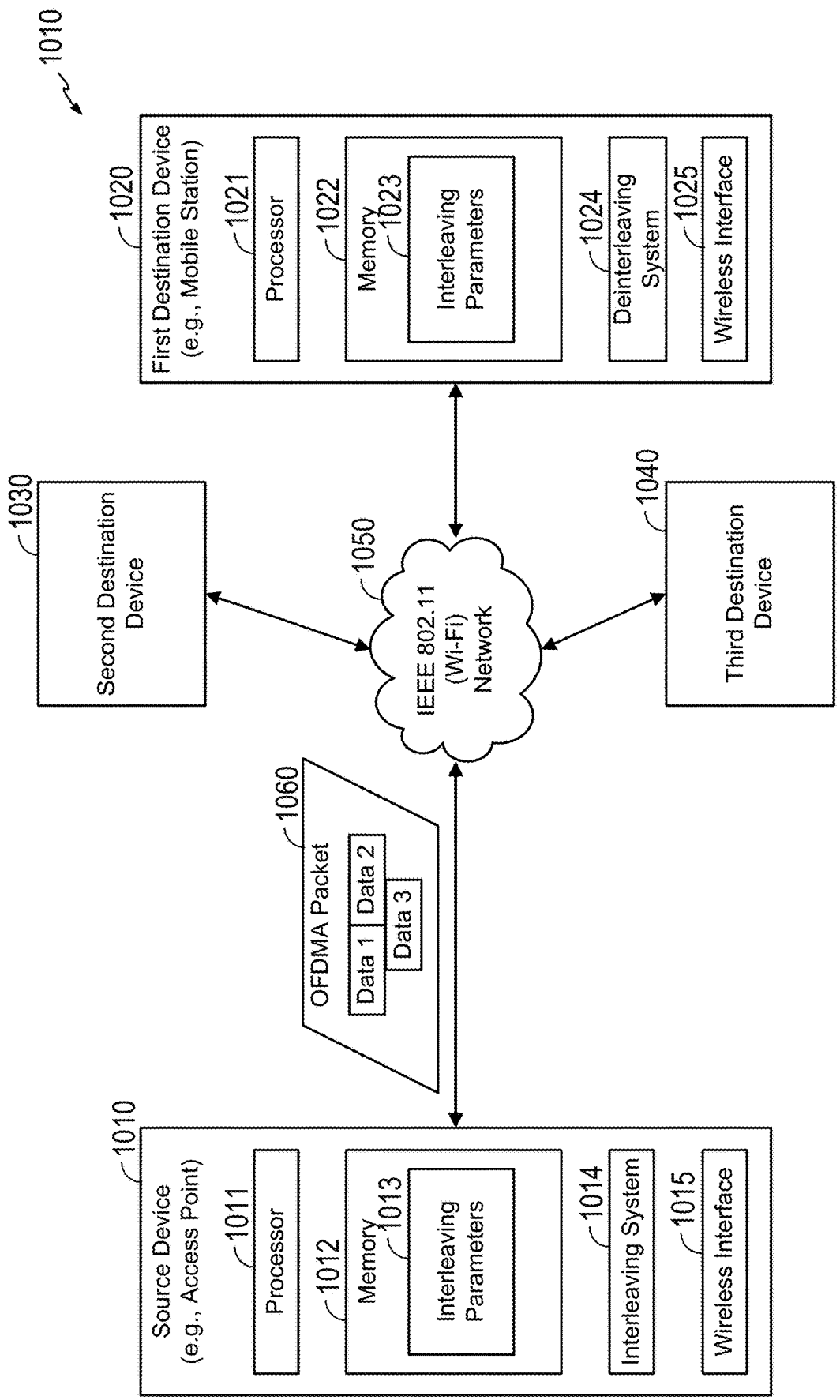
FIG. 10 shows a system that is operable to generate interleaving parameters for orthogonal frequency-division multiple access (OFDMA) tone plans, according to an embodiment.

FIG. 10 shows a system 1000 that is operable to generate interleaving parameters for orthogonal frequency-division multiple access (OFDMA) tone plans, according to an embodiment. The system 1000 includes a first device (e.g., a source device) 1010 configured to wirelessly communicate with a plurality of other devices (e.g., destination devices) 1020, 1030, and 1040 via a wireless network 1050. In alternate embodiments, a different number of source devices destination devices can be present in the system 1000. In various embodiments, the source device 1010 can include the AP 104 (FIG. 1) and the other devices 1020, 1030, and 1040 can include STAs 106 (FIG. 1). The system 1000 can include the system 100 (FIG. 1). In various embodiments, any of the devices 1010, 1020, 1030, and 1040 can include the wireless device 202 (FIG. 2).

In a particular embodiment, the wireless network 1050 is an Institute of Electrical and Electronics Engineers (IEEE) 802.11 wireless network (e.g., a Wi-Fi network). For example, the wireless network 1050 can operate in accordance with an IEEE 802.11 standard. In a particular embodiment, the wireless network 1050 supports multiple access communication. For example, the wireless network 1050 can support communication of a single packet 1060 to each of the destination devices 1020, 1030, and 1040, where the single packet 1060 includes individual data portions directed to each of the destination devices. In one example, the packet 1060 can be an OFDMA packet, as further described herein.

The source device 1010 can be an access point (AP) or other device configured to generate and transmit multiple access packet(s) to multiple destination devices. In a particular embodiment, the source device 1010 includes a processor 1011 (e.g., a central processing unit (CPU), a digital signal processor (DSP), a network processing unit (NPU), etc.), a memory 1012 (e.g., a random access memory (RAM), a read-only memory (ROM), etc.), and a wireless interface 1015 configured to send and receive data via the wireless network 1050. The memory 1012 can store binary convolutional code (BCC) interleaving parameters 1013 used by an interleaving system 1014 to interleave data according to the techniques described with respect to an interleaving system 1014 of FIG. 11.

As used herein, a "tone" can represent a frequency or set of frequencies (e.g., a frequency range) within which data can be communicated. A tone can alternately be referred to as a subcarrier. A "tone" can thus be a frequency domain unit, and a packet can span multiple tones. In contrast to tones, a "symbol" can be a time domain unit, and a packet can span (e.g., include) multiple symbols, each symbol having a particular duration. A wireless packet can thus be visualized as two-dimensional structure that spans a frequency range (e.g., tones) and a time period (e.g., symbols).

As an example, a wireless device can receive a packet via a 20 megahertz (MHz) wireless channel (e.g., a channel having 20 MHz bandwidth). The wireless device can perform a 256-point fast Fourier transform (FFT) to determine 256 tones in the packet. A subset of the tones can be considered "useable" and the remaining tones can be considered "unusable" (e.g., can be guard tones, direct current (DC) tones, etc.). To illustrate, 238 of the 256 tones can be useable, which may include a number of data tones and pilot tones.

In a particular embodiment, the interleaving parameters 1013 can be used by the interleaving system 1014 during generation of the multiple access packet 1060 to determine which data tones of the packet 1060 are assigned to individual destination devices. For example, the packet 1060 can include distinct sets of tones allocated to each individual destination device 1020, 1030, and 1040. To illustrate, the packet 1060 can utilize interleaved tone allocation.

The destination devices 1020, 1030, and 1040 can each include a processor (e.g., a processor 1021), a memory (e.g., a memory 1022), and a wireless interface (e.g., a wireless interface 1025). The destination devices 1020, 1030, and 1040 can also each include a deinterleaving system 1024 configured to deinterleave packets (e.g., single access packets or multiple access packets), as described with reference to a MIMO detector 1118 of FIG. 11. In one example, the memory 1022 can store interleaving parameters 1023 identical to the interleaving parameters 1013.

During operation, the source device 1010 can generate and transmit the packet 1060 to each of the destination devices 1020, 1030, and 1040 via the wireless network 1050. The packet 1060 can include distinct sets of data tones that are allocated to each individual destination device according to an interleaved pattern.

The system 1000 of FIG. 10 can thus provide OFDMA data tone interleaving parameters for use by source devices and destination devices to communicate over an IEEE 802.11 wireless network. For example, the interleaving parameters 1013, 1023 (or portions thereof) can be stored in a memory of the source and destination devices, as shown, can be standardized by a wireless standard (e.g., an IEEE 802.11 standard), etc. It should be noted that various data tone plans described herein can be applicable for both downlink (DL) as well as uplink (UL) OFDMA communication.

For example, the source device 1010 (e.g., an access point) can receive signal(s) via the wireless network 1050. The signal(s) can correspond to an uplink packet. In the packet, distinct sets of tones can be allocated to, and carry uplink data transmitted by, each of the destination devices (e.g., mobile stations) 1020, 1030, and 1040.

Figure 11:
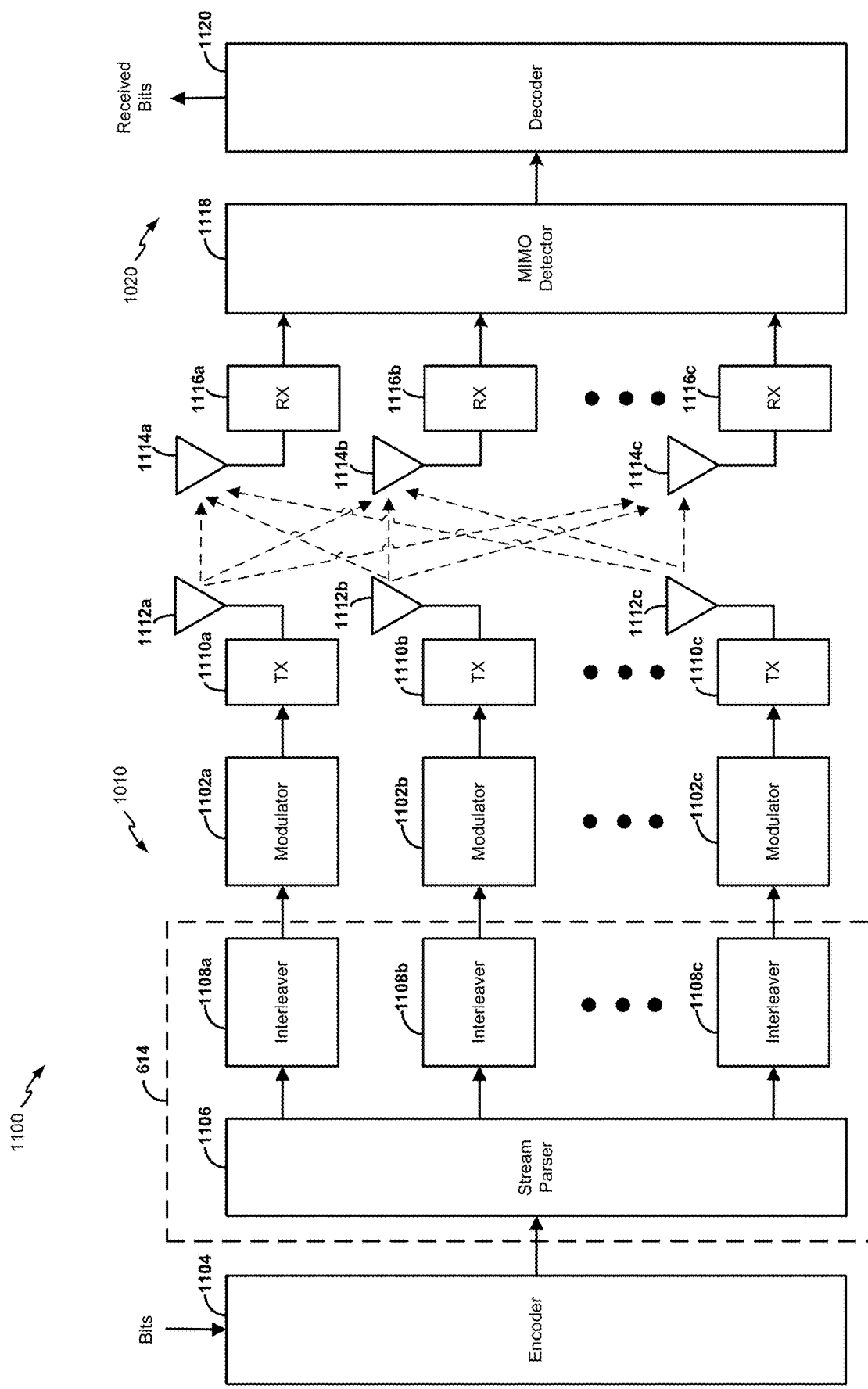
FIG. 11 shows an example multiple-input-multiple-output (MIMO) system that can be implemented in wireless devices, such as the wireless device of FIG. 10, to transmit and receive wireless communications.

FIG. 11 shows an example multiple-input-multiple-output (MIMO) system 1100 that can be implemented in wireless devices, such as the wireless device of FIG. 10, to transmit and receive wireless communications. The system 1100 includes the first device 1010 of FIG. 10 and the destination device 1020 of FIG. 10.

The first device 1010 includes an encoder 1104, the interleaving system 1014, a plurality of modulators 1102a-1102c, a plurality of transmission (TX) circuits 1110a-1110c, and a plurality of antennas 1112a-1112c. The destination device 1020 includes a plurality of antennas 1114a-1114c, a plurality of receive (RX) circuits 1116a-1116c, a MIMO detector 1118, and a decoder 1120.

A bit sequence can be provided to the encoder 1104. The encoder 1104 can be configured to encode the bit sequence. For example, the encoder 1104 can be configured to apply a forward error correcting (FEC) code to the bit sequence. The FEC code can be a block code, a convolutional code (e.g., a binary convolutional code), etc. The encoded bit sequence can be provided to the interleaving system 1014.

The interleaving system 1014 can include a stream parser 1106 and a plurality of spatial stream interleavers 1108a-1108c. The stream parser 1106 can be configured to parse the encoded bit stream from the encoder 1104 to the plurality of spatial stream interleavers 1108a-1108c.

Each interleaver 1108a-1108c can be configured to perform frequency interleaving. For example, the stream parser 1106 can output blocks of coded bits per symbol for each spatial stream. Each block can be interleaved by a corresponding interleaver 1108a-1108c that writes to rows and reads out columns. The number of columns (Ncol), or the interleaver depth, can be based on the number of data tones (Ndata). The number of rows (Nrow) can be a function of the number of columns (Ncol) and the number of data tones (Ndata). For example, the number of rows (Nrow) can be equal to the number of data tones (Ndata) divided by the number of columns (Ncol) (e.g., Nrow=Ndata/Ncol).

Figure 12:
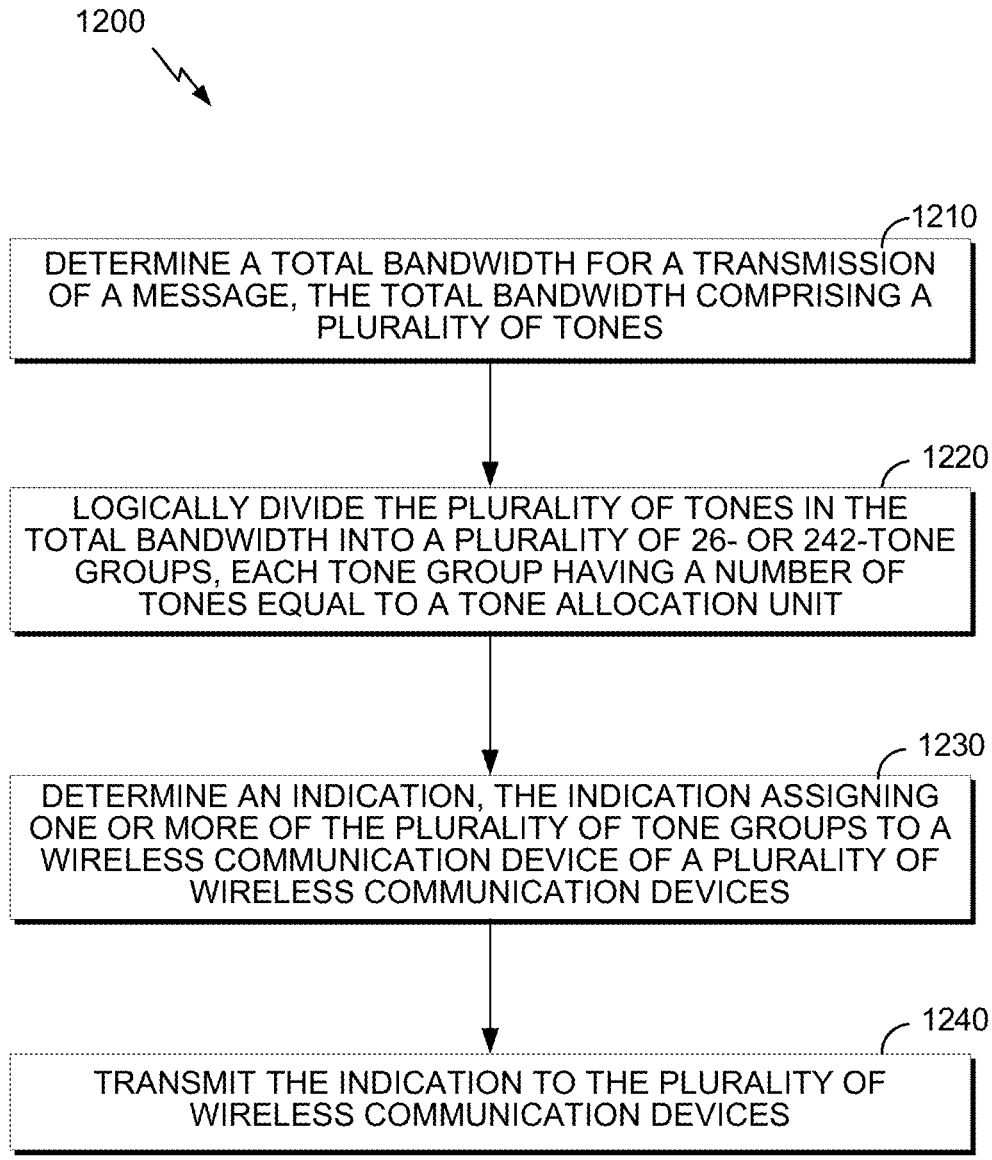
FIG. 12 shows a flowchart for an example method of communicating over a wireless communication network using a tone allocation unit.

FIG. 12 shows a flowchart 1200 for an example method of communicating over a wireless communication network using a tone allocation unit. The method may be used to divide a bandwidth between a number of different devices, in order to allow those devices to transmit or receive an uplink or a downlink OFDMA transmission. The method can be implemented in whole or in part by the devices described herein, such as the wireless device 202 shown in FIG. 2 or the AP 104 shown in FIG. 1. Although the illustrated method is described herein with reference to the wireless communication system 100 discussed above with respect to FIG. 1, and the transmissions 500-900 discussed above with respect to FIGS. 5-9, a person having ordinary skill in the art will appreciate that the illustrated method can be implemented by another device or transmission described herein, or any other suitable device or transmission. Although the illustrated method is described herein with reference to a particular order, in various embodiments, blocks herein can be performed in a different order, or omitted, and additional blocks can be added.

At block 1210, the AP 104 determines a total bandwidth for a transmission of a message, the total bandwidth comprising a plurality of tones. For example, this bandwidth may be one of 20 MHz, 40 MHz, 80 MHz, or 160 MHz. In some aspects, the plurality of tones includes a number of useable tones which may be used as data or pilot tones, and wherein the message further includes guard tones and direct current tones. For example, the plurality of tones may be used to refer only to the useable tones, and may not refer to the guard tones or DC tones which may be found in any message. Accordingly, those tones may not be divided into groups using the TAU size. In some aspects, the means for determining may include a processor.

At block 1220, the AP 104 divides the plurality of tones in the total bandwidth into one or more 26-, 52-, 106-, 107-, 242-, 994-, or 996-tone groups, each tone group having a number of tones equal to the tone allocation unit. In some embodiments, means for dividing can include a processor.

In various embodiments, the tone allocation unit can include 26 tones. In various embodiments, each tone group can include 2 pilot tones and 24 data tones. In various embodiments, dividing the plurality of tones in the total bandwidth into the one or more tone blocks can include one of: dividing 234 tones into 9 tone groups, dividing 468 tones into 18 tone groups, dividing 494 tones into 19 tone groups, dividing 936 tones into 36 tone groups, dividing 988 tones into 38 tone groups, and dividing 1006 tones into 31 tone groups.

In various embodiments, the tone allocation unit can include 242 tones. In various embodiments, each tone group can include 8 pilot tones and 234 data tones. In various embodiments, dividing the plurality of tones in the total bandwidth into the one or more tone blocks can include one of: dividing 242 tones into 1 tone group, dividing 484 tones into 2 tone groups, and dividing 968 tones into 4 tone groups.

In various embodiments, the method can further include setting a number of left edge tones X, a number of right edge tones Y, and a number of direct current (DC) tones Z, for either a full-bandwidth transmission or a 20 MHz sub-transmission, such that X+Y+Z is equal to 22 for 20 MHz transmissions, one of 18, 22, 28, 44 for 40 MHz transmissions, and one of 18, 22, 36, 56, 88 for 80 MHz transmissions, wherein Y=X−1, and Z is an odd integer greater or equal to 3.

In various embodiments, the method can further include assigning one or more unallocated tones, in addition to at least one tone group for 20 MHz and 40 MHz transmissions, to a common or control channel. In various embodiments, the method can further include allocating at least one tone group to the common or control channel for 20 MHz and 40 MHz transmissions.

At block 1230, the AP 104 determines an indication, the indication assigning one or more of the one or more tone blocks to a first wireless communication device. In some aspects, the means for determining may include a processor.

At block 1240, the AP 104 transmits the indication to at least the first wireless communication device or a second device. In some aspects, this indication may be a trigger message which may trigger an UL OFDMA transmission. For example, this message may be transmitted to a number of wireless devices, informing those devices of their allocated tones, and of other information, such as a timing of the UL OFDMA transmission. Accordingly, those devices may be configured to transmit the UL OFDMA transmission based, at least in part, on information found in the indication. In some aspects, this indication may be a packet header of a downlink message. For example, a DL OFDMA message may include a packet header, and the indication may be included as part of that packet header. In some aspects, the means for transmitting may include a transmitter.

In various embodiments, the 26- and 242-tone groups can be aligned. In various embodiments, the method can further include allocating one or more tones for interference measurement in an initial distribution. In various embodiments, the initial distribution can include the tones for interference measurement located in gaps between 26-tone blocks.

In various embodiments, the method can further include changing a location of the tones for interference measurement, for transmission in subsequent symbols, by cyclically incrementing the location of the tones within 27-tone groups, each 27-tone group including a 26-tone group and a single tone for interference measurement. In various embodiments, the method can further include changing a location of the tones for interference measurement, for transmission in subsequent symbols, by cyclically incrementing the location of the tones within an entirety of usable tones.

In various embodiments, the method can further include refraining from transmitting on the tones for interference measurement. A receiver can measure interference and noise received on the tones for interference measurement. In various embodiments, the method can further include transmitting information on the 26-tone groups and refraining from transmitting on the tones for interference measurement.

FIG. 13 is a chart summarizing tone plans according to various bandwidths and embodiments. In particular, FIG. 13 shows the number of usable tones, number of data tones, and number of pilot tones for each bandwidth shown in the left column, and for each implementation shown in the top row.

Figure 14A:
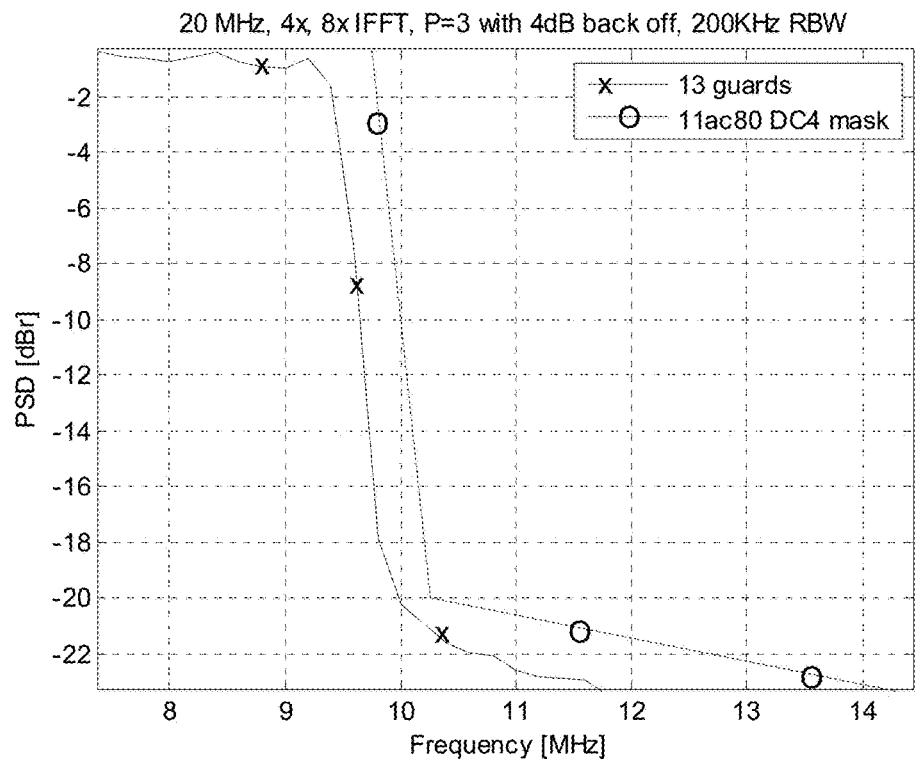
FIG. 14A is a graph showing simulated performance over frequency for an example 20 MHz packet having 13 guard tones.

FIG. 14A is a graph showing simulated performance over frequency for an example 20 MHz packet having 13 guard tones. The graph of FIG. 14A shows simulated power spectral density (PSD) (in dBr) vs. frequency (in MHz) for a 20 MHz packet with 4× symbol duration, and oversampled FFT without filtering. The graph of FIG. 14A assumes that RBW (here, 200 kHz) is equal to 1% of EBW, for example to meet a 20 dBr BW rule.

Figure 14B:
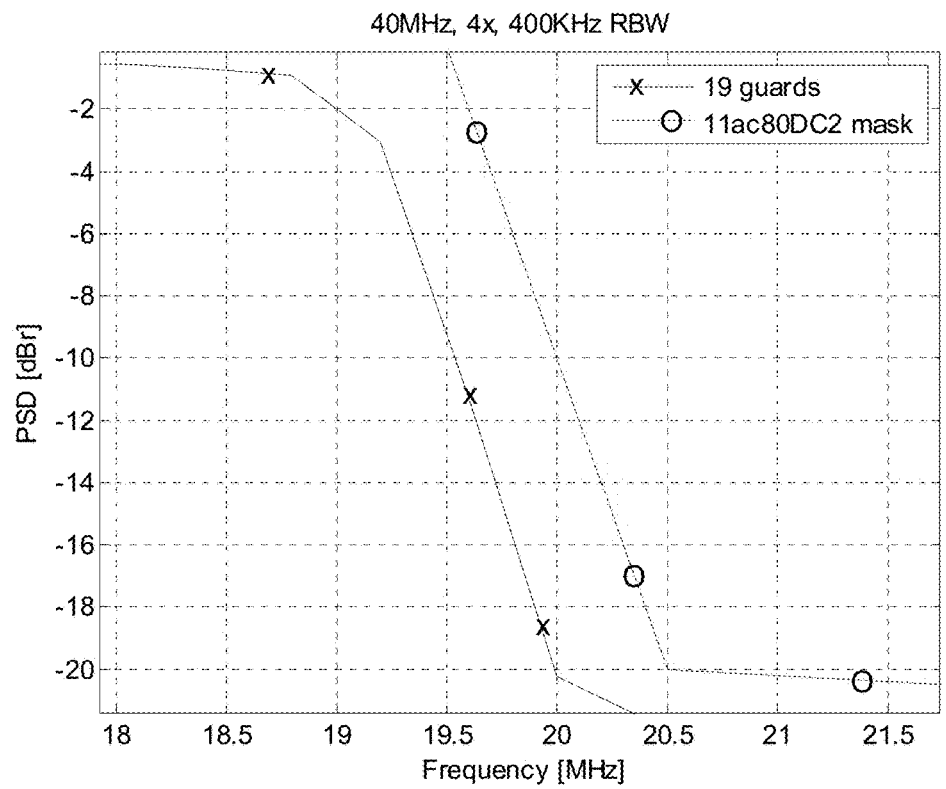
FIG. 14B is a graph showing simulated performance over frequency for example 40 MHz packet having 19 guard tones.

FIG. 14B is a graph showing simulated performance over frequency for example 40 MHz packet having 19 guard tones. The graph of FIG. 14B shows simulated PSD (in dBr) vs. frequency (in MHz) for a 40 MHz packet with 4× symbol duration, and oversampled FFT without filtering. The graph of FIG. 14B assumes that RBW (here, 400 kHz) is equal to 1% of EBW, for example to meet a 20 dBr BW rule.

Figure 14C:
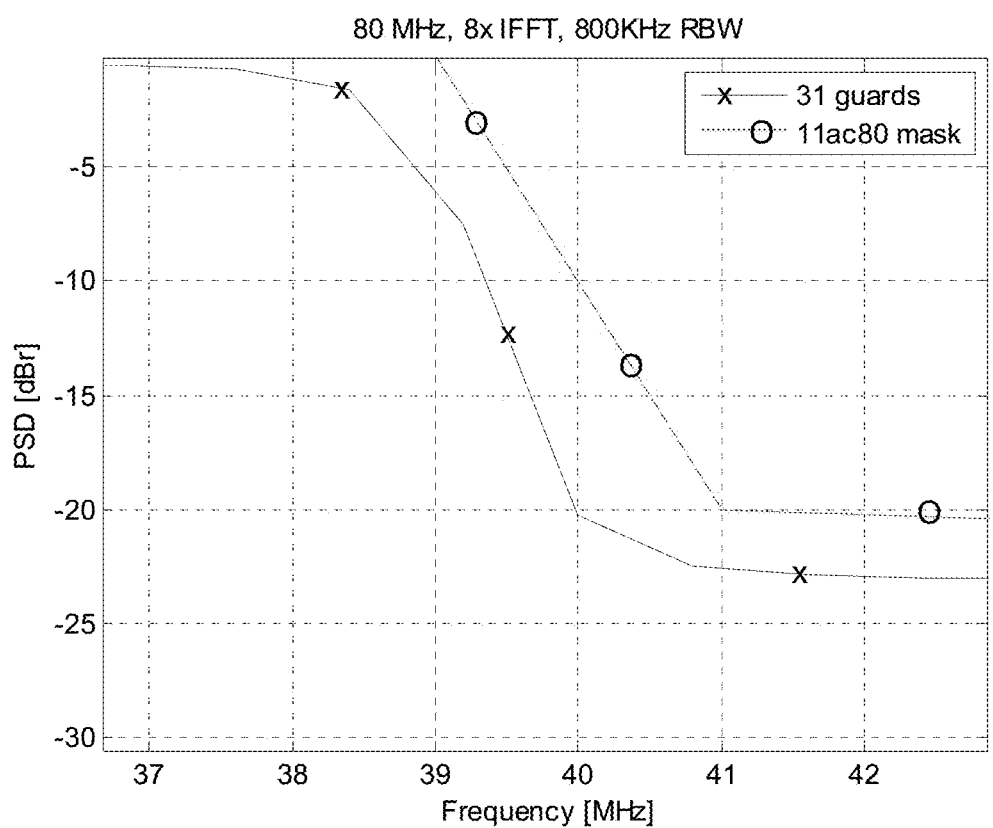
FIG. 14C is a graph showing simulated performance over frequency for example 80 MHz packet having 31 guard tones.

FIG. 14C is a graph showing simulated performance over frequency for example 80 MHz packet having 31 guard tones. The graph of FIG. 14C shows simulated PSD (in dBr) vs. frequency (in MHz) for an 80 MHz packet with 4× symbol duration, and oversampled FFT without filtering. The graph of FIG. 14B assumes that RBW (here, 800 kHz) is equal to 1% of EBW, for example to meet a 20 dBr BW rule.

Figure 15A:
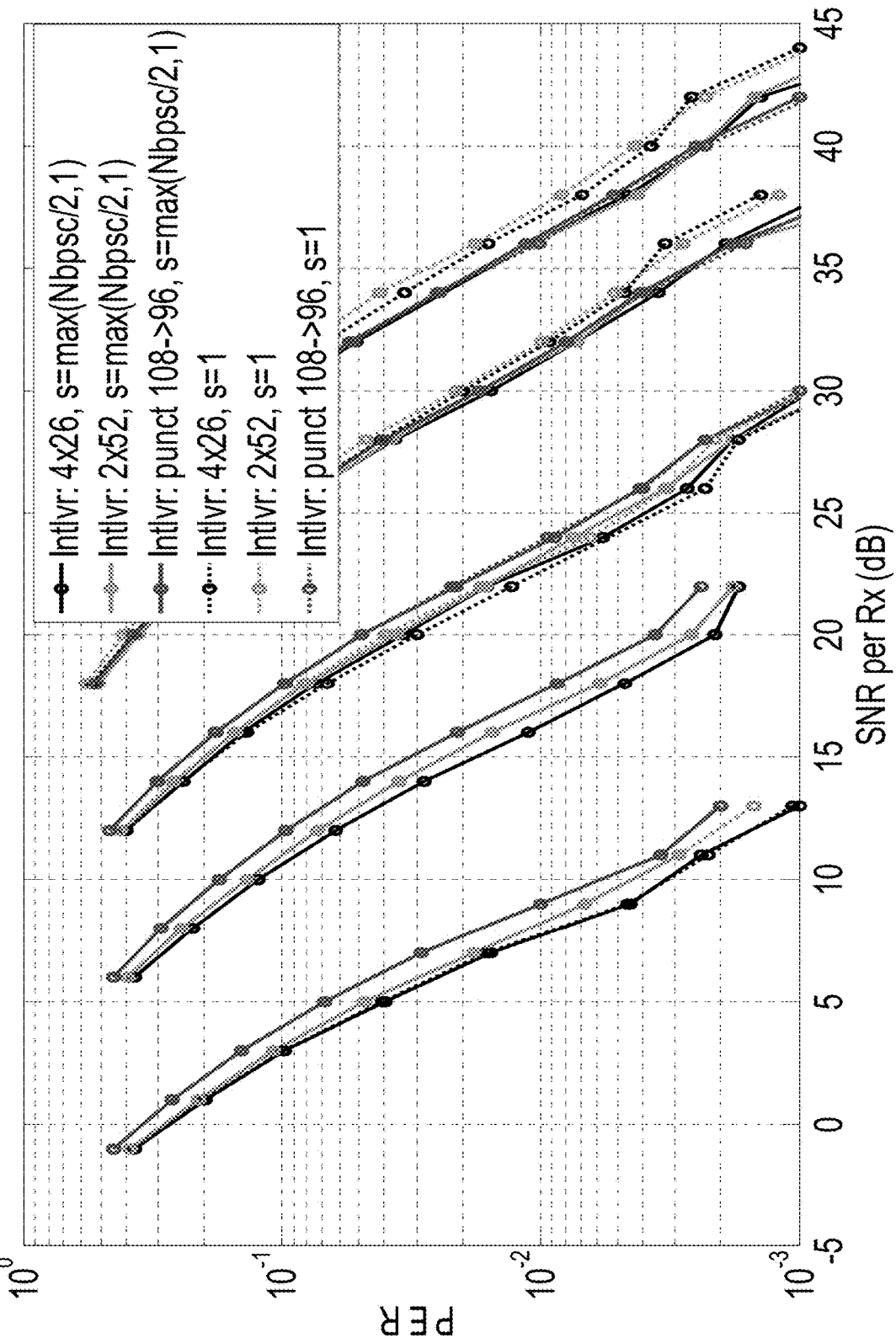
FIGS. 15A-15B are graphs showing simulated performance for various interleaving implementations.
Figure 15B:
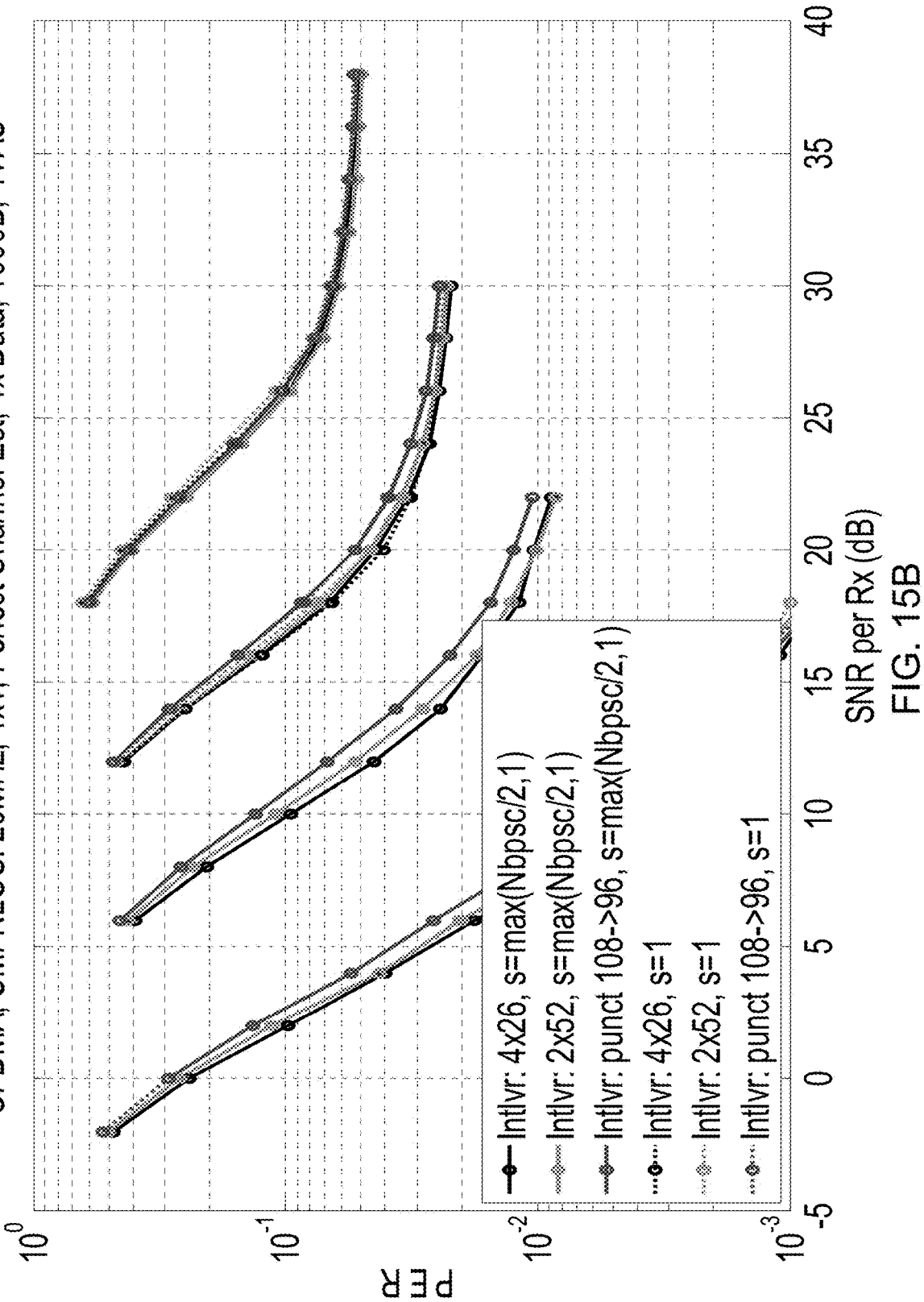

FIGS. 15A-15B are graphs showing simulated performance for various interleaving implementations. In various embodiments, a segment parser separates coded bits for each TAU or a group of TAUs. BCC interleaving and constellation mapping can be performed independently in each TAU or a group of TAUs. In FIGS. 15A-15B, a 4-TAU allocation in 20 MHz BW is shown according to three interleaving implementations: "4×26" having a segment parser across 4 TAUs and BCC interleaving within each TAU, and "2×52" having a segment parser across 2 groups of 2 TAUs and BCC interleaving within each group (2 TAUs). 108 tones are punctured to obtain 96 tones. BCC interleaving can be performed in 1 TAU, 2 TAUs, or being punctured from a larger size interleaver (for example 108 to 96 tones). In some embodiments, a N_COL of 8 can be used for BCC interleaver size of 24, N_COL of 16 can be used for BCC interleaver size of 48, and N_COL of 18 can be used for BCC interleaver size of 108.

In some embodiments, allowed allocation units can include one 26-tone unit, two 26 tone units, four 26-tone units, one 242 tone unit, two 242 tone units, three 242 tone units, four 242 tone units. Thus, in some embodiments, for 1×26 allocations with 26 tones=24 data+2 pilots, the interleaving can follow the existing 24 tone interleaver in 802.11ah. For 2×26 allocations, since 2×26=52 tones=48 data+4 pilots, the existing 802.11a 48 tone interleaver can be used with Ncol=16, Nrot can be one of [1:24], and LDPC tone mapping distance Dtm can be chosen from {2,3,4,6,8,12,16,24}.

For 4×26 allocations, 4×26=104 tones, there are various implementations for interleaving. In one implementation, interleaving can be performed in two steps: (1) frequency segment parsing over 4 blocks, then (2) 24 tone interleaving within each 26-tone block (for example, for embodiments with 26 tones=24 data+2 pilots). In another implementation, interleaving can be performed in two steps (1) with two steps: (1) frequency segment parsing over 2 blocks, then (2) 48 tone interleaving within each 2×26-tone block (for example, for embodiments with 2×26 tones=48 data+4 pilots). Dtm can be chosen from {2,3,4,6,8,12,16,24} for LDPC.

In yet another implementation, for example embodiments with 104 tones=96 data+8 pilots=98 data+6 pilots=100 data+4 pilots, truncated interleaving can be performed with an existing 108 tone interleaver (which can have Ncol=18, Nrot=29 for Nss<=4 and 13 for Nss>4). When reading in columns, the interleaver can skip the grid that has no bits written in, since there are only 96/98/100 data tones.

In yet another implementation, for embodiments with n×242 allocations, interleaving can be performed in two steps: (1) frequency segment parsing, then (2) 234 tone interleaving within each 242-tone block (for example, in embodiments with 242 tones=234 data+8 pilots). Dtm can be chosen from {2,3,6,9,13,18,26,39,78,117} for LDPC.

It noted that, in embodiments using 1× symbol duration for 802.11ax LTF compression, from a channel interpolation point of view, with each 26 tone block, there can be two cases for extrapolation: either 0+1 or 2+3, where m+n means m tones on one edge and n tones on another edge of the 26 tone block need extrapolation from the estimated channels from 1×. In some embodiments, channel extrapolation can be reserved for any OFDMA tone plan with any block size. For example, with block size multiple of 4, there will be 3 tones total from both edges of the resource block need extrapolation, if every $4^{th}$ tone is populated for compression. In one case without extrapolation, a block size of 4*k+1 can be used, in k+1 tones can be populated. However, the next 3 tones would be discarded as a separator between the present block and next block such that next block also has chance to populate all of the 2 edge tones as the present block. For embodiments having a $9^{th}$ 26 tone block allocation, both around DC and at the edge, there could occur a smoothing and extrapolation issue (for example, not all of the 4 edge tones are populated). Thus, placing the left over tones in between tone blocks does not improve channel extrapolation in LTF compression with 1× symbol duration.

Interference Measurement

In some embodiments, such as the aligned tone plans discussed above with respect to FIGS. 8A-8C, leftover tones can be used to maintain the same boundaries in 26-tone and 242-tone allocations. For example, the transmissions 800A-800C each include eight leftover tones in each 20 MHz portion. Such leftover tones used for alignment can be referred to generally herein as "alignment tones." In various embodiments, the leftover tones can be used as any combination of: data tones, additional DC tones, guard tones, common or control channels, etc. In some embodiments, the alignment tones can be additionally or alternatively used for interference measurement. For example, a transmitter can transmit no data on the alignment tones, and a receiver can measure interference and noise received on the alignment tones in order to measure or estimate interference levels. Interference levels can be measured or estimated, for example, for 26-tone blocks near or adjacent to each alignment tone. In various embodiments, interference estimation can be used for any combination of interference nulling, noise whitening, for obtaining better demodulation performance, etc.

Although the alignment tones can be distributed amongst tone blocks (for which interference measurement is to be performed) of any size in numerous ways within the scope of this disclosure, one non-limiting example includes including a single alignment tone in between each 26-tone block. For example, referring to FIG. 8A, each contiguous 26-tone block (excluding the tone block straddling the DC tones) can be logically replaced with a 27-tone block including 26 data tones and one alignment tone. In some embodiments including more tone blocks than alignment tones, one or more 26-tone blocks may not be associated with an alignment tone. In other embodiments, more than one alignment tone can be associated with some tone blocks.

In various embodiments, the alignment tones can be moved periodically or randomly. For example, the location of alignment tones can be changed cyclically, hopping X tones (for example, in increments of 1 tone, 2 tones, 3 tones, etc.) every Y symbols (for example, each symbol, every 2 symbols, every 3 symbols, etc.). Thus, although the alignment tones are described herein as staring in certain example locations, in various embodiments they can occupy any location as they move within the aligned tone plan, based on various initial tone locations.

FIG. 16A shows an example 20 MHz transmission 1600A, using 26-tone allocations 1605a-1605i that are aligned with 242-tone allocations via initial alignment tones 1610a-1610h used for interference measurement, according to an embodiment. Although the illustrated transmission 1600A is a 20 MHz transmission based on the transmission 800A of FIG. 8, the disclosure relating to alignment tones 1610a-1610h can be applied to any other transmission discussed herein, for example the 40 MHz transmission 800B and/or the 80 MHz transmission 800C of FIG. 8. Accordingly, different numbers of alignment tones 1610a-1610h can be used, and alignment tones 1610a-1610h can have different initial distributions.

In the illustrated embodiment, the transmission 1600A is organized the same as the 20 MHz transmission 500A of FIG. 5A, with the addition of eight alignment tones 1610a-1610h initially distributed between 26-tone blocks. The transmission 1600A has 6 left edge tones 1602, 3 DC tones 1603, and 5 right edge tones 1604 to match the 242-tone transmission 850A.

In the illustrated initial distribution of alignment tones 1610a-1610h, the four leftmost 26-tone blocks 1605a-1605d can each be formed as 27-tone blocks including 26 usable tones and one alignment tone 1610a-1610d. The four rightmost 26-tone blocks 1605f-1605i can each be formed as 27-tone blocks including 26 usable tones and one alignment tone 1610e-1610h. Accordingly, the alignment tone 1610a can be used to measure or estimate interference on the 26-tone block 1605a or the 26-tone block 1605b, the alignment tone 1610d can be used to measure or estimate interference on the 26-tone block 1605d or the left half of the 26-tone block 1605e, the alignment tone 1610e can be used to measure or estimate interference on the right half of the 26-tone block 1605e or the 26-tone block 1605f, and so on.

In one embodiment, alignment tones can hop within each 27-tone block 1605a-1605i, for example by cyclically incrementing position each symbol. An example of cyclical shifting within 27-tone blocks is shown in FIG. 16B. In another embodiment, alignment tones can hop within the entirety of usable tones, for example by cyclically incrementing position each symbol. An example of cyclical shifting within an entirety of 242 usable tones is shown in FIG. 16C.

FIG. 16B shows an example 20 MHz transmission 1600B, using 26-tone allocations 1605a-1605i that are aligned with 242-tone allocations via cyclically shifted alignment tones 1610a-1610h used for interference measurement, according to an embodiment. Although the illustrated transmission 1600B is a 20 MHz transmission based on the transmission 800A of FIG. 8, the disclosure relating to alignment tones 1610a-1610h can be applied to any other transmission discussed herein, for example the 40 MHz transmission 800B and/or the 80 MHz transmission 800C of FIG. 8. Accordingly, different numbers of alignment tones 1610a-1610h can be used, and alignment tones 1610a-1610h can have different shifted distributions.

In the illustrated embodiment, the transmission 1600B is organized the same as the 20 MHz transmission 1600A, with the eight alignment tones 1610a-1610h cyclically shifted within each initial 27-tone block 1605a-1605d and 1605f-1605i. Thus, the transmission 1600B can be transmitted, for example, one symbol after the transmission 1600A. Because there are only eight alignment tones 1610a-1610h in the illustrated embodiment, the 26-tone block 1605e does not include an alignment tone.

In the transmission 1600A, the alignment tones 1610a-161d were initially distributed at the end of each 27-tone block 1605a-1605d, respectively. Accordingly, in the transmission 1600B, the alignment tones 1610a-1610d have moved to the beginning of each 27-tone block 1605a-1605d, respectively. Similarly, in the transmission 1600A, the alignment tones 1610e-161h were initially distributed at the beginning of each 27-tone block 1605f-1605i, respectively. Accordingly, in the transmission 1600B, the alignment tones 1610e-1610h have moved to the second tone of each 27-tone block 1605f-1605i, respectively. According to the illustrated embodiment, in subsequent symbols, the alignment tones 1610a-1610h can shift one tone to the right. The hopping can continue for subsequent symbols.

As discussed above, the 26-tone block 1605e does not include an alignment tone. Accordingly, there may be times when an alignment tone is not near to the block 1605e, reducing the accuracy of interference estimation. For example, as shown in FIG. 16B, the alignment tone 1610d has shifted away from the left half of the tone block 1605e. Thus, any interference estimation for the 26-tone block 1605e, based on the alignment tone 1610d, may be of reduced accuracy.

FIG. 16C shows an example 20 MHz transmission 1600C, using 26-tone allocations 1605a-1605i that are aligned with 242-tone allocations via cyclically shifted alignment tones 1610a-1610h used for interference measurement, according to another embodiment. Although the illustrated transmission 1600C is a 20 MHz transmission based on the transmission 800A of FIG. 8, the disclosure relating to alignment tones 1610a-1610h can be applied to any other transmission discussed herein, for example the 40 MHz transmission 800B and/or the 80 MHz transmission 800C of FIG. 8. Accordingly, different numbers of alignment tones 1610a-1610h can be used, and alignment tones 1610a-1610h can have different shifted distributions.

In the illustrated embodiment, the transmission 1600B is organized the same as the 20 MHz transmission 1600A, with the eight alignment tones 1610a-1610h cyclically shifted within the entirety of the usable tones (here, 242 tones) in the transmission 1600C. Thus, the transmission 1600C can be transmitted, for example, one symbol after the transmission 1600A. Because there are only eight alignment tones 1610a-1610h in the illustrated embodiment, the 26-tone block 1605a does not include an alignment tone.

In the transmission 1600A, the alignment tones 1610a-161d were initially distributed at the end of each 27-tone block 1605a-1605d, respectively. Accordingly, in the transmission 1600C, the alignment tones 1610a-1610d have moved to the beginning of each subsequent 27-tone block 1605b-1605e, respectively. Similarly, in the transmission 1600A, the alignment tones 1610e-161h were initially distributed at the beginning of each 27-tone block 1605f-1605i, respectively. Accordingly, in the transmission 1600C, the alignment tones 1610e-1610h have moved to the second tone of each 27-tone block 1605f-1605i, respectively. According to the illustrated embodiment, in subsequent symbols, the alignment tones 1610a-1610h can shift one tone to the right. The hopping can continue for subsequent symbols. Accordingly, each 26-tone block can have an equal chance to receive interference measurement service.

As discussed above, the 26-tone block 1605a no longer includes an alignment tone. As alignment tones shift, there will be transmissions in which one of the 26-tone block 1605a-1605i does not include an alignment tone, reducing the accuracy of interference estimation for that particular 26-tone block. Accordingly, potential for reduced interference estimation or measurement accuracy can be spread between 26-tone blocks 1605a-1605i.

Allocations with Respect to Block Boundaries

Figure 17:
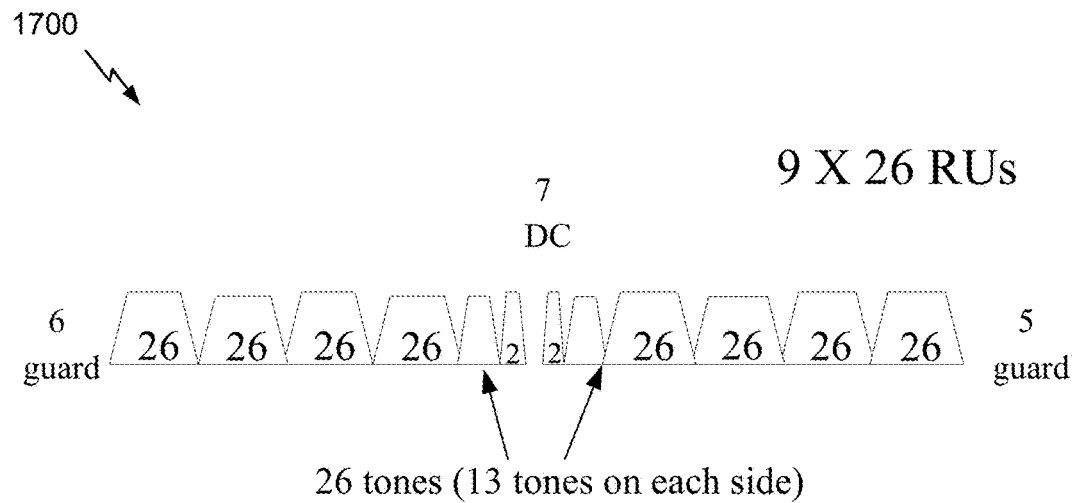
FIG. 17 shows an example 20 MHz transmission, which is organized the same as the 20 MHz transmission of FIG. 5A, with the addition of two allocated tones (from eight total additional tones) on each side of the DC tones.

FIG. 17 shows an example 20 MHz transmission 1700, which is organized the same as the 20 MHz transmission 500A of FIG. 5A, with the addition of two allocated tones (from eight total additional tones) on each side of the DC tones. Accordingly, the transmission 800A has 6 left edge tones, 7 DC tones, and 5 right edge tones, and a total of 234 usable tones. Thus, the transmission 1700 can be aligned with a 242-tone block.

Figure 18:
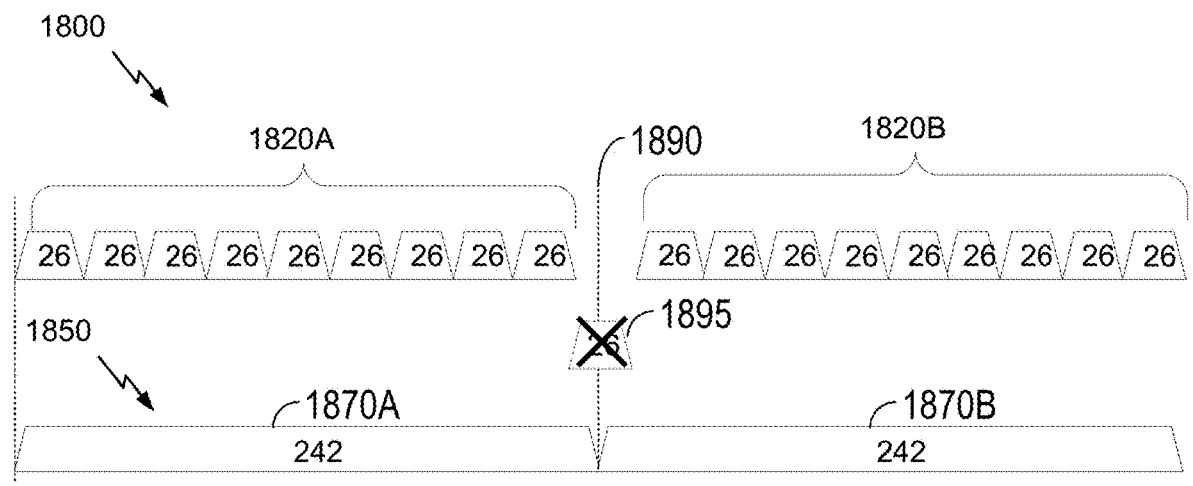
FIG. 18 shows a 40 MHz transmission, which is organized the same as the 40 MHz transmission of FIG. 6E, with each 20 MHz portion and being aligned with 242-tone blocks of a transmission, respectively.

FIG. 18 shows a 40 MHz transmission 1800, which is organized the same as the 40 MHz transmission 600E of FIG. 6E, with each 20 MHz portion 1820A and 1820B being aligned with 242-tone blocks 1870A and 1870B of a transmission 1850, respectively. Accordingly, no 26-tone block crosses the boundary 1890 between 242-tone blocks 1870A and 1870B. Although FIG. 18 shows a 40 MHz transmission, a person having ordinary skill in the art will appreciate that the techniques discussed herein can apply to transmissions of other bandwidths such as, for example, 80 MHz.

In general, transmissions where 26-tone blocks do not cross a boundary between 242-tone blocks can have fewer allocation complications as compared to transmissions where 26-tone blocks cross a boundary between 242-tone blocks. For example, in some cases usage of a 26-tone block crossing a boundary between 242-tone blocks can prevent usage of those 242-tone blocks. Similarly, in some cases usage of either of those 242-tone blocks can prevent usage of a 26-tone block crossing the boundary between those 242-tone blocks. Thus, a central 26-tone block 1895, which straddles the boundary 1890 between 242-tone blocks 1870A and 1870B, can be omitted.

Figure 19:
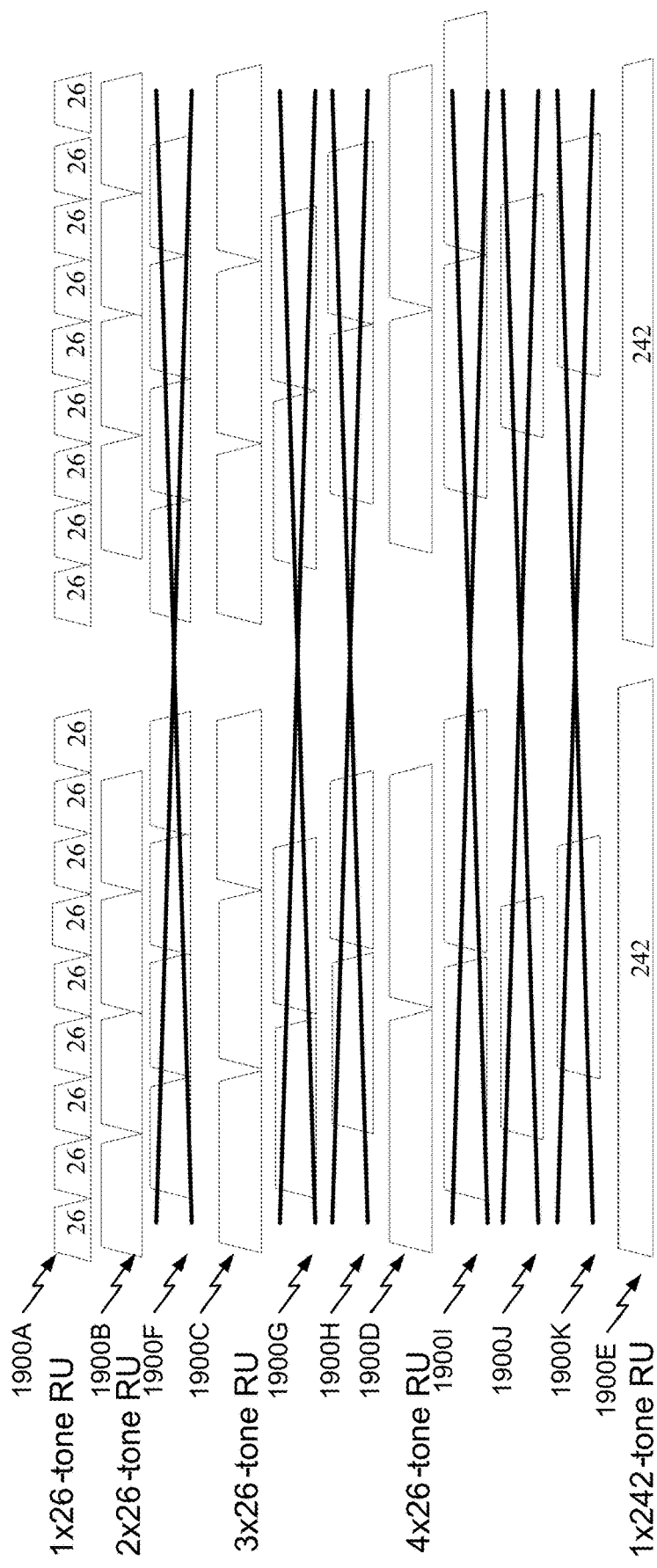
FIG. 19 shows various 40 MHz transmissions, which have fixed allocation positions.

FIG. 19 shows various 40 MHz transmissions 1900A-1900E, which have fixed allocation positions. Although FIG. 19 shows 40 MHz transmissions, a person having ordinary skill in the art will appreciate that the techniques discussed herein can apply to transmissions of other bandwidths such as, for example, 80 MHz.

In some embodiments, the AP 104 can make one or more of the following allocations: 1×26 (for example, one 26-tone block can be allocated to a single STA), 2×26 (for example, two 26-tone blocks can be allocated to a single STA), 3×26 (for example, three 26-tone blocks can be allocated to a single STA), 4×26 (for example, four 26-tone blocks can be allocated to a single STA), 1×242 (for example, one 242-tone block can be allocated to a single STA), and 2×242 (for example, two 242-tone blocks can be allocated to a single STA), and so forth. In some embodiments, certain allocations can be disallowed. For example, in some embodiments, 3×26 and/or 4×26 allocations can be disallowed. In some embodiments, only contiguous allocations are made. Accordingly, no STA is allocated non-contiguous 26-tone or 242-tone blocks.

As shown, the AP 104 can allocate tone blocks to STAs based on fixed allocation positions. For example, the allocations 1900A can include allowed allocation positions for 1×26 allocations. On the other hand, other allocations can be disallowed. In the illustrated embodiment, fixed allocation positions 1900A are aligned on the left and right sides. A person having ordinary skill in the art will appreciate that other fixed allocation positions are possible such as, for example aligned on the left side only, aligned on the right side only, aligned to the middle of the transmission 1900A, or other fixed positions.

As another example, the allocations 1900B can include allowed allocation positions for 2×26 allocations. On the other hand, the allocations 1900F, which are shifted relative to the allocations 1900B, can be disallowed. In the illustrated embodiment, fixed allocation positions 1900B are aligned on the left and right sides, leaving options for smaller allocations (for example, 1×26 allocations) in the middle of the transmission 1900B. A person having ordinary skill in the art will appreciate that other fixed allocation positions are possible such as, for example aligned on the left side only, aligned on the right side only, aligned to the middle of the transmission 1900B, or other fixed positions.

As another example, the allocations 1900C can include allowed allocation positions for 3×26 allocations. On the other hand, the allocations 1900G-1900H, which are shifted relative to the allocations 1900C, can be disallowed. In the illustrated embodiment, fixed allocation positions 1900C are aligned on the left and right sides, leaving options for smaller allocations (for example, 1×26 allocations) in the middle of the transmission 1900C. A person having ordinary skill in the art will appreciate that other fixed allocation positions are possible such as, for example aligned on the left side only, aligned on the right side only, aligned to the middle of the transmission 1900C, or other fixed positions.

As another example, the allocations 1900D can include allowed allocation positions for 4×26 allocations. On the other hand, the allocations 1900I-1900K, which are shifted relative to the allocations 1900D, can be disallowed. In the illustrated embodiment, fixed allocation positions 1900D are aligned on the left and right sides, leaving options for smaller allocations (for example, 1×26 allocations) in the middle of the transmission 1900D. A person having ordinary skill in the art will appreciate that other fixed allocation positions are possible such as, for example aligned on the left side only, aligned on the right side only, aligned to the middle of the transmission 1900D, or other fixed positions.

In various embodiments, allocations can be communicated from the AP 104 to the STAs 106, for example via an HE-SIGB field. In some embodiments, the allocations can be communicated by indexing into a map of allocations (for example, a map index of 0b000 can indicate nine separate allocations of one 26-tone block per STA, a map index of 0b001 can indicate four separate allocations of two 26-tone block per STA, a map index of 0b010 can indicate two separate allocations of four 26-tone block per STA, a map index of 0b011 can indicate five separate allocations of one 26-tone block per STA and two separate allocations of two 26-tone blocks per STA, a map index of 0b100 can indicate two separate allocations of two 26-tone blocks per STA and one separate allocation of four 26-tone blocks per STA, and so forth). In other embodiments, allocations can be communicated according to a flexible or freeform signaling scheme, subject to one or more rules. By way of example, such rules can include one or more of: disallowing one or more allocation combinations, defining a maximum number of allocations in each PPDU, defining a minimum allocation size per PPDU bandwidth (for example, a minimum allocation of two 26-tone units per STA for 40 MHz transmissions, a minimum allocation of four 26-tone units per STA for 80 MHz transmissions, and so on).

Figure 20A:
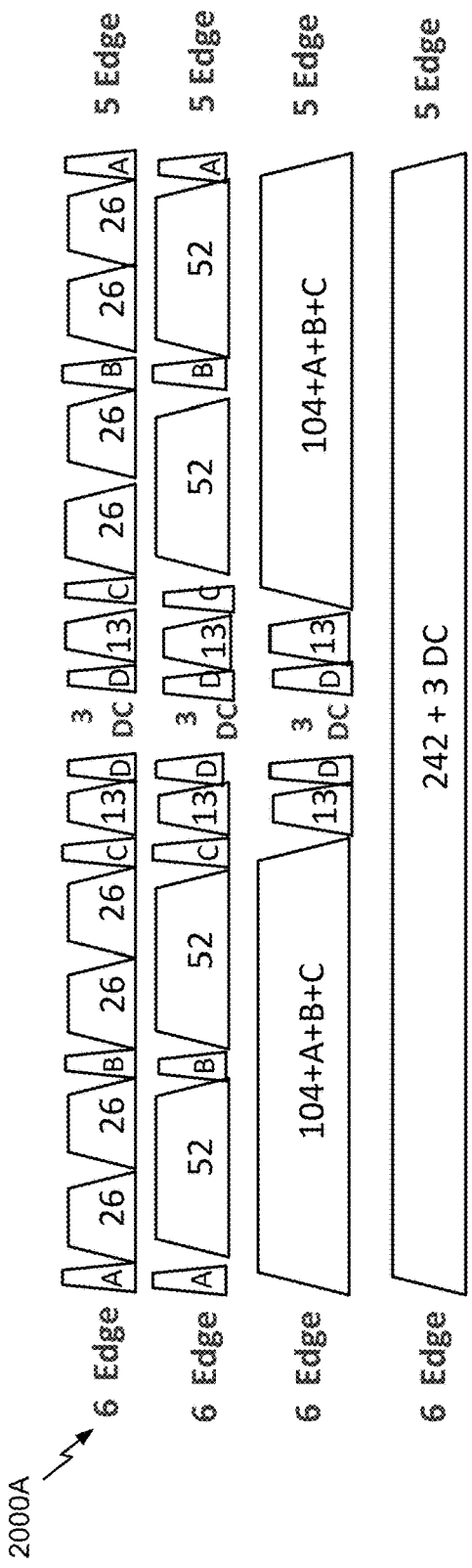
FIGS. 20A-20C show example 20 MHz, 40 MHz, and 80 MHz transmissions using 26-, 52-, 106-, 107-, 108-, and/or 242-tone allocations, according to various embodiments.
Figure 20B:
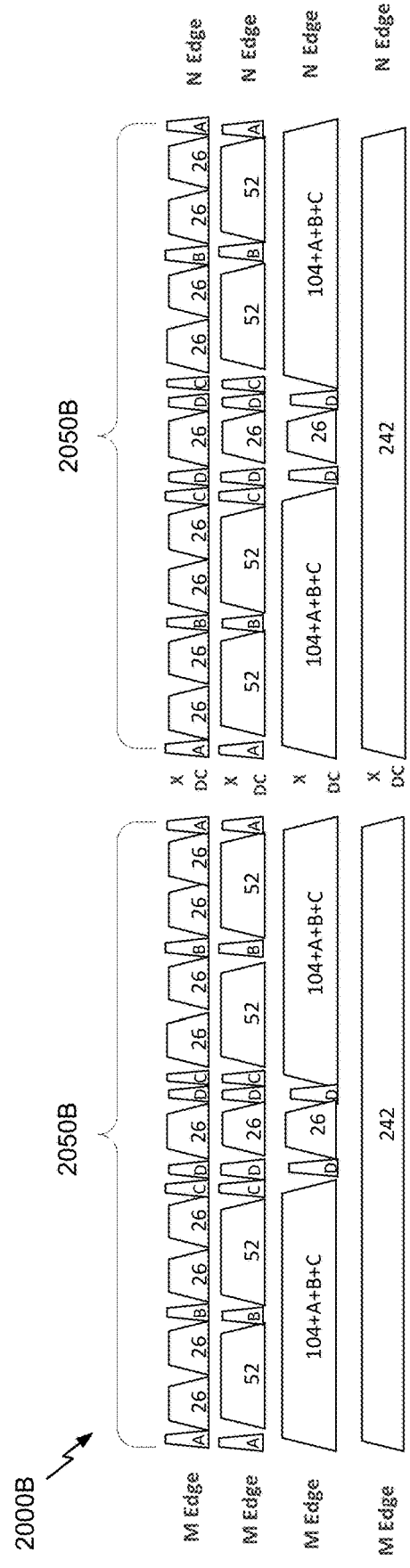
Figure 20C:
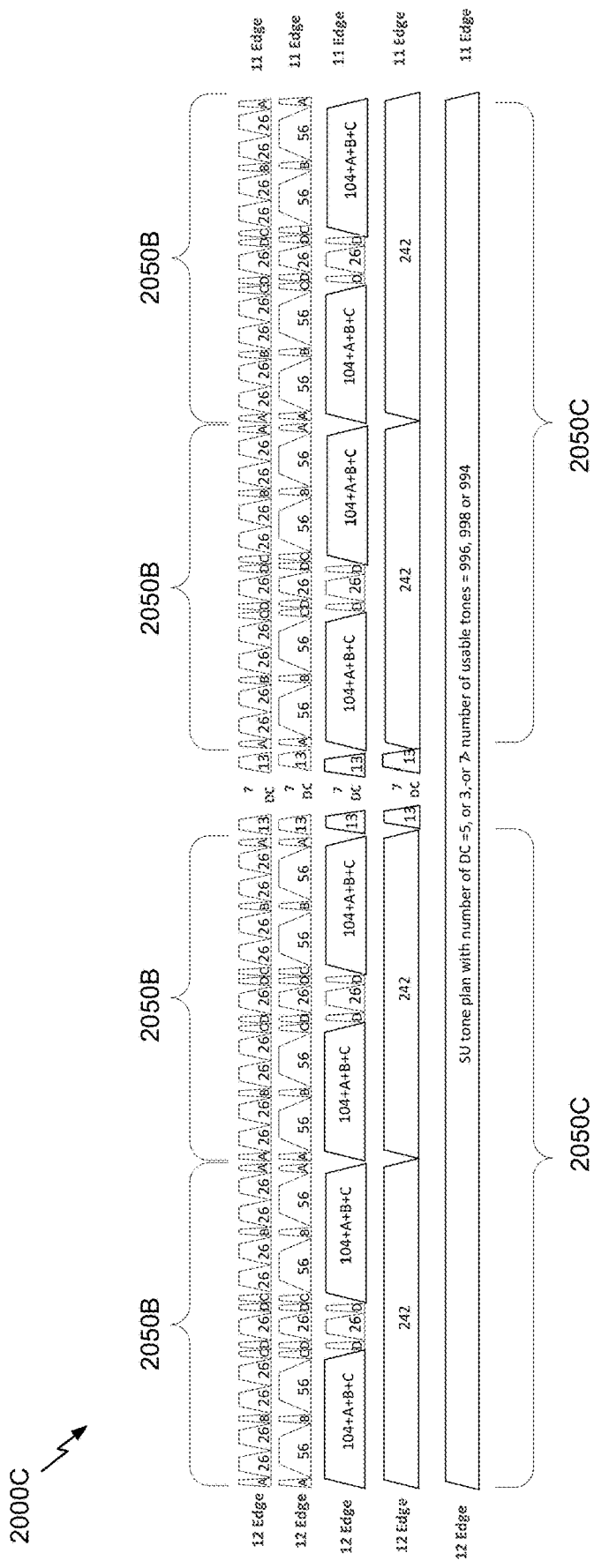

FIGS. 20A-20C show example 20 MHz, 40 MHz, and 80 MHz transmissions using 26-, 52-, 106-, 107-, 108-, and/or 242-tone allocations, according to various embodiments. In particular, FIG. 20A shows example 20 MHz transmissions 2000A, which are organized in the same manner as the 20 MHz transmission 500A-C of FIGS. 5A-C, with the addition of additional and/or leftover tones labeled A-D. The transmissions 2000A have 6 left edge tones, 3 DC tones, and 5 right edge tones, and a total of 242 usable tones. Although FIG. 20A shows four example transmissions 2000A using various combinations of 26-, 52-, 106-, 107-, 108-, and 242-tone blocks, allocations within any given transmission can include multiple tone blocks of different sizes, having different arrangements, in various embodiments.

The first of the illustrated transmissions 2000A includes nine 26-tone blocks (with one 26-tone block being divided into two 13-tone portions), 6 left edge tones, 5 right edge tones, 2*A outer leftover tones, 2*B middle leftover tones, 2*C inner leftover tones, 3 DC tones, and 2*D additional DC tones. In various embodiments, D can be 0, 1, or 2, for a total of 3, 5, or 7 total DC tones. As discussed herein, leftover tones can variously be used as edge tones, DC tones, control tones, additional guard tones (for example, in the case of non-contiguous channel bonding), and the like.

The second of the illustrated transmissions 2000A includes four 52-tone blocks, one 26-tone block being divided into two 13-tone portions, 6 left edge tones, 5 right edge tones, 2*A outer leftover tones, 2*B middle leftover tones, 2*C inner leftover tones, 3 DC tones, and 2*D additional DC tones. In various embodiments, D can be 0, 1, or 2, for a total of 3, 5, or 7 total DC tones. As discussed herein, leftover tones can variously be used as edge tones, DC tones, control tones, additional guard tones (for example, in the case of non-contiguous channel bonding), and the like.

The third of the illustrated transmissions 2000A includes two blocks having 104+A+B+C tones, one 26-tone block being divided into two 13-tone portions, 6 left edge tones, 5 right edge tones, 3 DC tones, and 2*D additional DC tones. In various embodiments, D can be 0, 1, or 2, for a total of 3, 5, or 7 total DC tones. In various embodiments, A+B+C+D can be equal to 4, giving the tone blocks having 104+A+B+C tones a total of 106, 107, or 108 tones. In embodiments including a 106-tone block, the 106-tone block can include 102 data tones and 4 pilot tones. In embodiments including a 107-tone block, the 107-tone block can include 102 data tones and 5 pilot tones. As discussed herein, leftover tones can variously be used as edge tones, DC tones, control tones, additional guard tones (for example, in the case of non-contiguous channel bonding), and the like.

The fourth of the illustrated transmissions 2000A includes a single 242-tone block having 3 DC tones, 6 left edge tones, 5 right edge tones.

FIG. 20B shows example 40 MHz transmissions 2000B, which are organized in the same manner as the 40 MHz transmission 600A-D of FIGS. 6A-D, with the addition of additional and/or leftover tones labeled A-D. The transmissions 2000B have M left edge tones, X DC tones, and N right edge tones, and a total of 484 usable tones. In various embodiments, A+B+C+D can be equal to 4. In various embodiments, D can be 0, 1, or 2. In various embodiments, X can be 3, 5, or 7. In embodiments where X is 5, M can be equal to 12 and N can be equal to 11. In embodiments where X is 7, M can be equal to 11 and N can be equal to 10.

Although FIG. 20B shows four example transmissions 2000B using various combinations of 26-, 52-, 106-, 107-, 108-, and 242-tone blocks, allocations within any given transmission can include multiple tone blocks of different sizes, having different arrangements, in various embodiments. In the illustrated embodiment, each 40 MHz transmission 2000B is a duplicate of two 20 MHz transmissions 2050B, which in various embodiments can be the 20 MHz transmissions 2000A of FIG. 20A or any other 20 MHz transmission discussed herein.

The first of the illustrated transmissions 2000B includes two 20 MHz portions 2050B each including nine 26-tone blocks, 2*A outer leftover tones, 2*B middle leftover tones, 2*C inner leftover tones, and 2*D additional inner leftover tones. As discussed herein, leftover tones can variously be used as edge tones, DC tones, control tones, additional guard tones (for example, in the case of non-contiguous channel bonding), and the like.

The second of the illustrated transmissions 2000B includes two 20 MHz portions 2050B each including four 52-tone blocks, one 26-tone block, 2*A outer leftover tones, 2*B middle leftover tones, 2*C inner leftover tones, and 2*D additional inner leftover tones. As discussed herein, leftover tones can variously be used as edge tones, DC tones, control tones, additional guard tones (for example, in the case of non-contiguous channel bonding), and the like.

The third of the illustrated transmissions 2000B includes two 20 MHz portions 2050B each including two blocks having 104+A+B+C tones, one 26-tone block, and D leftover tones on each side of the 26-tone block. In various embodiments, A+B+C+D can be equal to 4, giving the tone blocks having 104+A+B+C tones a total of 106, 107, or 108 tones. In embodiments including a 106-tone block, the 106-tone block can include 102 data tones and 4 pilot tones. In embodiments including a 107-tone block, the 107-tone block can include 102 data tones and 5 pilot tones. As discussed herein, leftover tones can variously be used as edge tones, DC tones, control tones, additional guard tones (for example, in the case of non-contiguous channel bonding), and the like.

The fourth of the illustrated transmissions 2000B includes two 20 MHz portions 2050B. Each 20 MHz portion 2050B includes a single 242-tone block.

FIG. 20C shows example 80 MHz transmissions 2000C, which are organized in the same manner as the 80 MHz transmission 700A-E of FIGS. 7A-E, with the addition of additional and/or leftover tones labeled A-D. The transmissions 2000C have 12 left edge tones, 7 DC tones, and 11 right edge tones, and a total of 994 usable tones for OFDMA, and a total of 994, 996, or 998 usable tones for whole BW allocation with reduced number of DC tones being 7, or 5, or 3. In various embodiments, A+B+C+D can be equal to 4. In various embodiments, D can be 0, 1, or 2.

Although FIG. 20C shows five example transmissions 2000C using various combinations of 26-, 52-, 106-, 107-, 108-, and 242-tone blocks, allocations within any given transmission can include multiple tone blocks of different sizes, having different arrangements, in various embodiments. In the illustrated embodiment, each 80 MHz transmission 2000C is a duplicate of four 20 MHz transmissions 2050B, which in various embodiments can be the 20 MHz transmissions 2000A of FIG. 20A or any other 20 MHz transmission discussed herein. Additionally or alternatively, each 80 MHz transmission 2000C is a duplicate of two 40 MHz transmissions 2050C, which in various embodiments can be the 40 MHz transmissions 2000B of FIG. 20B or any other 40 MHz transmission discussed herein. In the illustrated embodiment, each 80 MHz transmission 2000C further includes an additional 26-tone block divided into two separate 13-tone portions on either side of the 7 DC tones.

The first of the illustrated transmissions 2000C includes four 20 MHz portions 2050B each including nine 26-tone blocks, 2*A outer leftover tones, 2*B middle leftover tones, 2*C inner leftover tones, and 2*D additional inner leftover tones. The first of the illustrated transmissions 2000C further includes an additional 26-tone block divided into two separate 13-tone portions on either side of the 7 DC tones. As discussed herein, leftover tones can variously be used as edge tones, DC tones, control tones, additional guard tones (for example, in the case of non-contiguous channel bonding), and the like.

The second of the illustrated transmissions 2000C includes four 20 MHz portions 2050B each including four 52-tone blocks, one 26-tone block, 2*A outer leftover tones, 2*B middle leftover tones, 2*C inner leftover tones, and 2*D additional inner leftover tones. The second of the illustrated transmissions 2000C further includes an additional 26-tone block divided into two separate 13-tone portions on either side of the 7 DC tones. As discussed herein, leftover tones can variously be used as edge tones, DC tones, control tones, additional guard tones (for example, in the case of non-contiguous channel bonding), and the like.

The third of the illustrated transmissions 2000C includes four 20 MHz portions 2050B each including two blocks having 104+A+B+C tones, one 26-tone block, and D leftover tones on each side of the 26-tone block. In various embodiments, A+B+C+D can be equal to 4, giving the tone blocks having 104+A+B+C tones a total of 106, 107, or 108 tones. In embodiments including a 106-tone block, the 106-tone block can include 102 data tones and 4 pilot tones. In embodiments including a 107-tone block, the 107-tone block can include 102 data tones and 5 pilot tones. The third of the illustrated transmissions 2000C further includes an additional 26-tone block divided into two separate 13-tone portions on either side of the 7 DC tones. As discussed herein, leftover tones can variously be used as edge tones, DC tones, control tones, additional guard tones (for example, in the case of non-contiguous channel bonding), and the like.

The fourth of the illustrated transmissions 2000C includes four 20 MHz portions 2050B. Each 20 MHz portion 2050B includes a single 242-tone block. The fourth of the illustrated transmissions 2000C further includes an additional 26-tone block divided into two separate 13-tone portions on either side of the 7 DC tones.

The fifth of the illustrated transmissions 2000C includes a single-user tone plan having 3, 5, or 7 DC tones in various embodiments. Accordingly, the SU tone plan can include 996, 998, or 994 usable tones, respectively.

Figure 21:
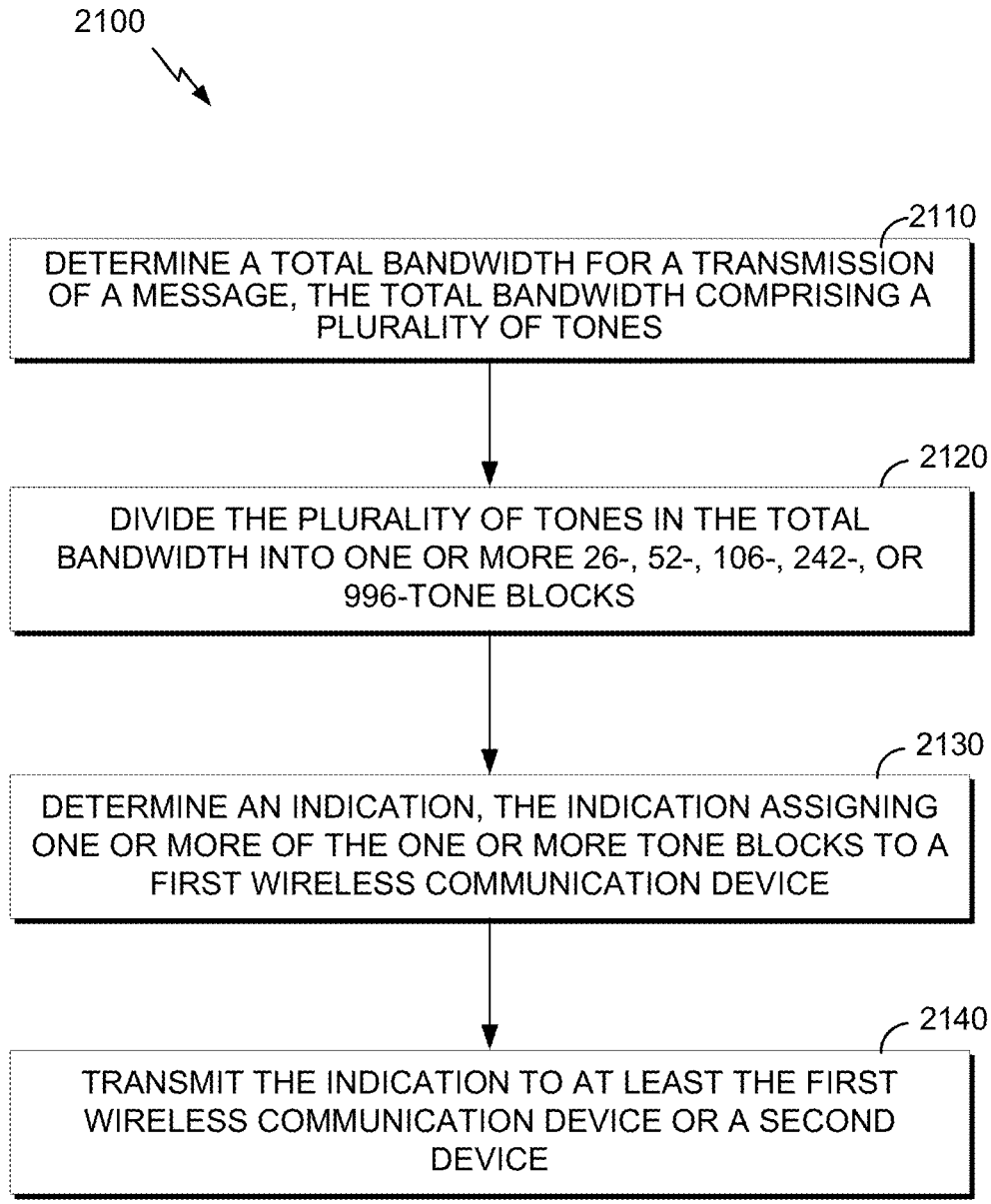
FIG. 21 shows a flowchart for another example method of communicating over a wireless communication network using a tone allocation unit.

FIG. 21 shows a flowchart 2100 for an example method of communicating over a wireless communication network using a tone allocation unit. The method may be used to divide a bandwidth between a number of different devices, in order to allow those devices to transmit or receive an uplink or a downlink OFDMA transmission. The method can be implemented in whole or in part by the devices described herein, such as the wireless device 202 shown in FIG. 2 or the AP 104 shown in FIG. 1. Although the illustrated method is described herein with reference to the wireless communication system 100 discussed above with respect to FIG. 1, the transmissions 2000A-2000C discussed above with respect to FIGS. 20A-20C, and the transmissions 2200A-2200D discussed above with respect to FIGS. 22A-22D, a person having ordinary skill in the art will appreciate that the illustrated method can be implemented by another device or transmission described herein, or any other suitable device or transmission. Although the illustrated method is described herein with reference to a particular order, in various embodiments, blocks herein can be performed in a different order, or omitted, and additional blocks can be added.

At block 2110, the AP 104 determines a total bandwidth for a transmission of a message, the total bandwidth comprising a plurality of tones. For example, this bandwidth may be one of 20 MHz, 40 MHz, 80 MHz, or 160 MHz. In some aspects, the plurality of tones includes a number of useable tones which may be used as data or pilot tones, and wherein the message further includes guard tones and direct current tones. For example, the plurality of tones may be used to refer only to the useable tones, and may not refer to the guard tones or DC tones which may be found in any message. Accordingly, those tones may not be divided into groups using the TAU size. In some aspects, the means for determining may include a processor.

At block 2120, the AP 104 divides the plurality of tones in the total bandwidth into one or more 26-, 52-, 106-, 107-, 108-, 242-, and/or 996-tone blocks (for example, each tone block can be a tone allocation unit). In some embodiments, means for dividing can include a processor.

In various embodiments, the message can include a combination of one or more of: A tones followed by two 26-tone blocks, followed by B tones, followed by two 26-tone blocks, followed by C tones, followed by 13 tones of a split 26-tone block, followed by D tones, followed by 3 direct current (DC) tones, followed by D tones, followed by 13 tones of the split 26-tone block, followed by C tones, followed by two 26-tone blocks, followed by B tones, followed by two 26-tone blocks, followed by A tones; A tones followed by two 26-tone blocks, followed by B tones, followed by two 26-tone blocks, followed by C tones, followed by D tones, followed by one 26-tone block, followed by D tones, followed by C tones, followed by two 26-tone blocks, followed by B tones, followed by two 26-tone blocks, followed by A tones; A tones followed by a 52-tone block, followed by B tones, followed by a 52-tone block, followed by C tones, followed by 13 tones of a split 26-tone block, followed by D tones, followed by 3 DC tones, followed by D tones, followed by 13 tones of the split 26-tone block, followed by C tones, followed by a 52-tone block, followed by B tones, followed by a 52-tone block, followed by A tones; A tones followed by a 52-tone block, followed by B tones, followed by a 52-tone block, followed by C tones, followed by D tones, followed by a 26-tone block, followed by D tones, followed by C tones, followed by a 52-tone block, followed by B tones, followed by a 52-tone blocks, followed by A tones; a 106-tone block, followed by 13 tones of a split 26-tone block, followed by D tones, followed by 3 DC tones, followed by D tones, followed by 13 tones of the split 26-tone block, followed by a 106-tone block; a 106-tone block, followed by D tones, followed by a 26-tone block, followed by D tones, followed by a 106-tone block; a 107-tone block, followed by 13 tones of a split 26-tone block, followed by D tones, followed by 3 DC tones, followed by D tones, followed by 13 tones of the split 26-tone block, followed by a 107-tone block; a 107-tone block, followed by D tones, followed by a 26-tone block, followed by D tones, followed by a 107-tone block; a 108-tone block, followed by 13 tones of a split 26-tone block, followed by D tones, followed by 3 DC tones, followed by D tones, followed by 13 tones of the split 26-tone block, followed by a 108-tone block; a 108-tone block, followed by D tones, followed by a 26-tone block, followed by D tones, followed by a 108-tone block; a 242-tone block; a 996-tone block; and 13 tones of a split 26-tone block, followed by 7 DC tones, followed by 13 tones of the split 26-tone block, wherein: D is 0, 1, or 2, A+B+C+D is 4, the message includes a total of X DC tones, X being 3, 5, or 7, the message includes 6 left edge tones and 5 right edge tones for 20 MHz transmissions, the message includes 12 left edge tones and 11 right edge tones for 40 MHz transmissions when X is 5, the message includes 11 left edge tones and 10 right edge tones for 40 MHz transmissions when X is 7, and the message includes 12 left edge tones and 11 right edge tones for 80 MHz and 160 MHz transmissions. For example, the message can include any of those shown and described herein with respect to FIGS. 20A-20C and/or FIGS. 22A-22D.

In various embodiments, the method can further include puncturing one or more pilot tones, of the one or more tone blocks, for use in interference measurement. In various embodiments, the message can include at least one 106-tone group, including 102 data tones and 4 pilot tones, and 7 total direct current (DC) tones. In various embodiments, the message can include at least one 106-tone group, including 102 data tones and 4 pilot tones. In various embodiments, the message can include at least one 107-tone group, including 102 data tones and 5 pilot tones, and 5 total direct current (DC) tones. In various embodiments, D=1, X=5, and the message can include at least one 107-tone group, comprising 102 data tones and 5 pilot tones. In various embodiments, D=2, X=5, and the message can include at least one 106-tone group, comprising 102 data tones and 4 pilot tones.

In various embodiments, the message can include a 160 MHz transmission comprising two 80 MHz transmissions. In various embodiments, the message can include two contiguous 80 MHz transmissions and 23 direct current tones. In various embodiments, the message can include two non-contiguous 80 MHz transmissions and only sub-band direct current tones.

At block 2130, the AP 104 determines an indication, the indication assigning one or more of the one or more tone blocks to a first wireless communication device. In some aspects, the means for determining may include a processor.

At block 2140, the AP 104 transmits the indication to at least the first wireless communication device or a second device. In some aspects, this indication may be a trigger message which may trigger an UL OFDMA transmission. For example, this message may be transmitted to a number of wireless devices, informing those devices of their allocated tones, and of other information, such as a timing of the UL OFDMA transmission. Accordingly, those devices may be configured to transmit the UL OFDMA transmission based, at least in part, on information found in the indication. In some aspects, this indication may be a packet header of a downlink message. For example, a DL OFDMA message may include a packet header, and the indication may be included as part of that packet header. In some aspects, the means for transmitting may include a transmitter.

In various embodiments, the message can include, for transmission over a 20 MHz bandwidth, at least one of: 6 left edge tones, followed by 1 unallocated tone, followed by two 26-tone blocks, followed by 1 unallocated tone, followed by two 26-tone blocks, followed by 13 tones of a split 26-tone block, followed by 7 direct current (DC) tones, followed by 13 tones of the split 26-tone block, followed by two 26-tone blocks, followed by 1 unallocated tone, followed by two 26-tone blocks, followed by 1 unallocated tone, followed by 5 right edge tones; 6 left edge tones, followed by 1 unallocated tone, followed by one 52-tone block, followed by 1 unallocated tone, followed by one 52-tone block, followed by 13 tones of a split 26-tone block, followed by 7 DC tones, followed by 13 tones of the split 26-tone block, followed by one 52-tone block, followed by 1 unallocated tone, followed by one 52-tone block, followed by 1 unallocated tone, followed by 5 right edge tones; 6 left edge tones, followed by a 106-tone block, followed by 13 tones of a split 26-tone block, followed by 7 DC tones, followed by 13 tones of the split 26-tone block, followed by a 106-tone block, followed by 5 right edge tones; and 6 left edge tones, followed by a 121 tones of a split 242-tone block, followed by 3 DC tones, followed by a 121 tones of the split 242-tone block, followed by 5 right edge tones.

In various embodiments, the message can include, for transmission over a 40 MHz bandwidth, at least one of: 12 left edge tones, followed by 1 unallocated tone, followed by two 26-tone blocks, followed by 2 unallocated tones, followed by two 26-tone blocks, followed by 1 unallocated tone, followed by one 26-tone block, followed by 1 unallocated tone, followed by two 26-tone blocks, followed by 2 unallocated tones, followed by two 26-tone blocks, followed by 1 unallocated tone, followed by 5 direct current (DC) tones, followed by 1 unallocated tone, followed by two 26-tone blocks, followed by 2 unallocated tones, followed by two 26-tone blocks, followed by 1 unallocated tone, followed by one 26-tone block, followed by 1 unallocated tone, followed by two 26-tone blocks, followed by 2 unallocated tones, followed by two 26-tone blocks, followed by 1 unallocated tone, followed by 11 right edge tones; 12 left edge tones, followed by 1 unallocated tone, followed by one 52-tone block, followed by 2 unallocated tones, followed by one 52-tone block, followed by 1 unallocated tone, followed by one 26-tone block, followed by 1 unallocated tone, followed by one 52-tone block, followed by 2 unallocated tones, followed by one 52-tone block, followed by 1 unallocated tone, followed by 5 DC tones, followed by 1 unallocated tone, followed by one 52-tone block, followed by 2 unallocated tones, followed by one 52-tone block, followed by 1 unallocated tone, followed by one 26-tone block, followed by 1 unallocated tone, followed by one 52-tone block, followed by 2 unallocated tones, followed by one 52-tone block, followed by 1 unallocated tone, followed by 11 right edge tones; 12 left edge tones, followed by 1 unallocated tone, followed by a 106-tone block, followed by 1 unallocated tone, followed by one 26-tone block, followed by 1 unallocated tone, followed by a 106-tone block, followed by 1 unallocated tone, followed by 5 DC tones, followed by 1 unallocated tone, followed by a 106-tone block, followed by 1 unallocated tone, followed by one 26-tone block, followed by 1 unallocated tone, followed by a 106-tone block, followed by 1 unallocated tone, followed by 11 right edge tones; 12 left edge tones, followed by a 242-tone block, followed by 5 DC tones, followed by a 242-tone block, followed by 11 right edge tones.

In various embodiments, the message can include, for transmission over a 80 MHz bandwidth, at least one of: 12 left edge tones, followed by 1 unallocated tone, followed by two 26-tone blocks, followed by 2 unallocated tones, followed by two 26-tone blocks, followed by 1 unallocated tone, followed by one 26-tone block, followed by 1 unallocated tone, followed by two 26-tone blocks, followed by 2 unallocated tones, followed by two 26-tone blocks, followed by 2 unallocated tones, followed by two 26-tone blocks, followed by 2 unallocated tones, followed by two 26-tone blocks, followed by 1 unallocated tone, followed by one 26-tone block, followed by 1 unallocated tone, followed by two 26-tone blocks, followed by 2 unallocated tones, followed by two 26-tone blocks, followed by 1 unallocated tone, followed by two 26-tone blocks, followed by 2 unallocated tones, followed by two 26-tone blocks, followed by 2 unallocated tones, followed by two 26-tone blocks, followed by 1 unallocated tone, followed by one 26-tone block, followed by 1 unallocated tone, followed by 13 tones of a split 26-tone block, followed by 7 direct current (DC) tones, followed by 13 tones of the split 26-tone block, followed by 1 unallocated tone, followed by two 26-tone blocks, followed by 2 unallocated tones, followed by two 26-tone blocks, followed by 1 unallocated tone, followed by one 26-tone block, followed by 1 unallocated tone, followed by two 26-tone blocks, followed by 2 unallocated tones, followed by two 26-tone blocks, followed by 2 unallocated tones, followed by two 26-tone blocks, followed by 2 unallocated tones, followed by two 26-tone blocks, followed by 1 unallocated tone, followed by 11 right edge tones; 12 left edge tones, followed by 1 unallocated tone, followed by one 52-tone block, followed by 2 unallocated tones, followed by one 52-tone block, followed by 1 unallocated tone, followed by one 26-tone block, followed by 1 unallocated tone, followed by one 52-tone block, followed by 2 unallocated tones, followed by one 52-tone block, followed by 2 unallocated tones, followed by one 52-tone block, followed by 2 unallocated tones, followed by one 52-tone block, followed by 1 unallocated tone, followed by one 26-tone block, followed by 1 unallocated tone, followed by one 52-tone block, followed by 2 unallocated tones, followed by one 52-tone block, followed by 1 unallocated tone, followed by 13 tones of a split 26-tone block, followed by 7 DC tones, followed by 13 tones of the split 26-tone block, followed by 1 unallocated tone, followed by one 52-tone block, followed by 2 unallocated tones, followed by one 52-tone block, followed by 1 unallocated tone, followed by one 26-tone block, followed by 1 unallocated tone, followed by one 52-tone block, followed by 2 unallocated tones, followed by one 52-tone block, followed by 2 unallocated tones, followed by one 52-tone block, followed by 2 unallocated tones, followed by one 52-tone block, followed by 1 unallocated tone, followed by one 26-tone block, followed by 1 unallocated tone, followed by one 52-tone block, followed by 2 unallocated tones, followed by one 52-tone block, followed by 1 unallocated tone, followed by 11 right edge tones; 12 left edge tones, followed by 1 unallocated tone, followed by a 106-tone block, followed by 1 unallocated tone, followed by one 26-tone block, followed by 1 unallocated tone, followed by a 106-tone block, followed by 2 unallocated tones, followed by a 106-tone block, followed by 1 unallocated tone, followed by one 26-tone block, followed by 1 unallocated tone, followed by a 106-tone block, followed by 1 unallocated tone, followed by 13 tones of a split 26-tone block, followed by 7 DC tones, followed by 13 tones of the split 26-tone block, followed by 1 unallocated tone, followed by a 106-tone block, followed by 1 unallocated tone, followed by one 26-tone block, followed by 1 unallocated tone, followed by a 106-tone block, followed by 2 unallocated tones, followed by a 106-tone block, followed by 1 unallocated tone, followed by one 26-tone block, followed by 1 unallocated tone, followed by a 106-tone block, followed by 1 unallocated tone, followed by 11 right edge tones; 12 left edge tones, followed by two 242-tone blocks, followed by 13 tones of a split 26-tone block, followed by 7 DC tones, followed by 13 tones of the split 26-tone block, followed by two 242-tone blocks, followed by 11 right edge tones; and 12 left edge tones, followed by 498 tones of a split 996-tone block, followed by 5 DC tones, followed by 498 tones of the split 996-tone block, followed by 11 right edge tones.

In various embodiments, the message can include, for transmission over a 160 MHz bandwidth, at least one of: 12 left edge tones, followed by a 996-tone block, followed by 23 direct current (DC) tones, followed by a 996-tone block, followed by 11 edge tones, wherein each 996-tone block is assigned to a single station; 12 left edge tones, followed by a 996-tone block, followed by 23 DC tones, followed by a 996-tone block, followed by 11 edge tones, wherein each 996-tone block is assigned to a different station; 12 left edge tones, followed by a 996-tone block, followed by an 80 MHz sub-band transmission including a plurality of sub-band DC tones and one or more 26-, 52-, 106-, or 242-tone blocks, followed by 11 edge tones; 12 left edge tones, followed by an 80 MHz sub-band transmission including a plurality of sub-band DC tones and one or more 26-, 52-, 106-, or 242-tone blocks, followed by a 996-tone block, followed by 11 edge tones; and 12 left edge tones, followed by another 80 MHz sub-band transmission including a plurality of sub-band DC tones and one or more 26-, 52-, 106-, or 242-tone blocks, followed by 11 edge tones. The 996-tone block can be a 996-tone allocation unit plus 5 null tones in the middle as sub-band DC tones.

In various embodiments, the method can further include puncturing one or more pilot tones, of the one or more tone blocks, for use in interference measurement. In various embodiments, the message can include at least one 106-tone block, including 102 data tones and 4 pilot tones, and 7 total direct current (DC) tones. In various embodiments, the message can include a 160 MHz transmission including two 80 MHz transmissions.

In various embodiments, the message can include two contiguous 80 MHz transmissions and 23 direct current tones. In various embodiments, the message can include two non-contiguous 80 MHz transmissions and only sub-band direct current tones. In various embodiments, each 26-tone block includes 2 pilot tones and 24 data tones.

In various embodiments, dividing the plurality of tones in the total bandwidth into the one or more tone blocks can include at least one of: dividing 234 tones into 9 tone groups, dividing 468 tones into 18 tone groups, dividing 494 tones into 19 tone groups, dividing 936 tones into 36 tone groups, dividing 988 tones into 38 tone groups, and dividing 1006 tones into 31 tone groups. In various embodiments, each 242-tone block includes 8 pilot tones and 234 data tones. In various embodiments, dividing the plurality of tones in the total bandwidth into the one or more tone blocks can include at least one of: dividing 242 tones into 1 tone group, dividing 484 tones into 2 tone groups, and dividing 968 tones into 4 tone groups.

In various embodiments, the method can further include assigning one or more unallocated tones, in addition to at least one tone group for 20 MHz and 40 MHz transmissions, to a common or control channel. In various embodiments, the method can further include allocating at least one tone group to the common or control channel for 20 MHz and 40 MHz transmissions. In various embodiments, the method can further include allocating one or more tones for interference measurement in an initial distribution.

In various embodiments, the initial distribution can include the tones for interference measurement located in gaps between 26-tone blocks. In various embodiments, the method can further include changing a location of the tones for interference measurement, for transmission in subsequent symbols, by cyclically incrementing the location of the tones within 27-tone blocks, each 27-tone block including a 26-tone block and a single tone for interference measurement. In various embodiments, the method can further include changing a location of the tones for interference measurement, for transmission in subsequent symbols, by cyclically incrementing the location of the tones within an entirety of usable tones.

In various embodiments, the method can further include refraining from transmitting on the tones for interference measurement, wherein a receiver measures interference and noise received on the tones for interference measurement. In various embodiments, the method can further include transmitting information on the 26-tone blocks and refraining from transmitting on the tones for interference measurement. In various embodiments, no 26-tone block crosses a 242-tone boundary. In various embodiments, the indication is communicated in a signal field according to one or more rules.

In various embodiments, the method can be performed by an access point, and wherein a processor of the access point is configured to transmit the indication through the transmitter and an antenna of the access point to a mobile station served by the access point. For example, the method can be performed by the AP 104, and the AP 104 can provide the indication to the STA 106A, assigning the one or more tone blocks to at least the STA 106A. Accordingly, in some embodiments, the wireless communication device can be the STA 106A. In other embodiments, the wireless communication device can be the AP 104 itself.

In various embodiments, the method can be performed by a mobile station, and a processor of the mobile station can be configured to transmit the indication through a transmitter and an antenna of the mobile station to an access point serving the mobile station. For example, the method can be performed by the STA 106A, and the STA 106A can unilaterally assign or allocate one or more tone blocks to itself. The STA 106A can transmit the indication to the AP 104, indicating the tone blocks it has assigned or allocated to itself for wireless communication. In some embodiments, the indication can be in a signal (SIG) field. Thus, in such embodiments, assigning tone blocks can refer to self-assignment, which can also be called reservation of tone blocks, a request/suggestion for assignment of specific tone blocks (e.g., which may then be assigned by an AP for the requesting STA based on the STA's request/suggestion), or otherwise indicating use or desired use of those tone blocks.

In various embodiments, the method can be performed by a first mobile station, and a processor of the first mobile station can be configured to transmit the indication through a transmitter and an antenna of the first mobile station to a second mobile station in peer-to-peer communication with the first mobile station. For example, the method can be performed by the STA 106A, and the STA 106A can unilaterally assign or allocate one or more tone blocks to itself. The STA 106A can transmit the indication to another STA 106B (which can be in peer-to-peer communication with the STA 106A), indicating the tone blocks it has assigned or allocated to itself for wireless communication. Thus, in such embodiments, assigning tone blocks can refer to self-assignment, which can also be called reservation of tone blocks, a request/suggestion for assignment of specific tone blocks, or otherwise indicating use or desired use of those tone blocks. In some embodiments, the indication can be in a signal (SIG) field. In other embodiments, the STA 106A can assign tone blocks to another STA 106B.

In one embodiment, the tone plans shown in FIGS. 20A-20C can be implemented with A=1, B=1, C=1, D=1, M=12, N=11, X=5, and 104+A+B+C tone groups replaced with 102 data tones, plus 5 pilot tones. One such example tone plan is shown and described below for 20 MHz, 40 MHz, 80 MHz, and 160 MHz transmissions with respect to FIGS. 22A-22D. In an alternative embodiment, the tone plans shown in FIGS. 20A-20C can be implemented with A=1, B=1, C=1, D=2, M=12, N=11, X=5, and 104+A+B+C tone groups replaced with 102 data tones, plus 4 pilot tones.

Figure 22A:
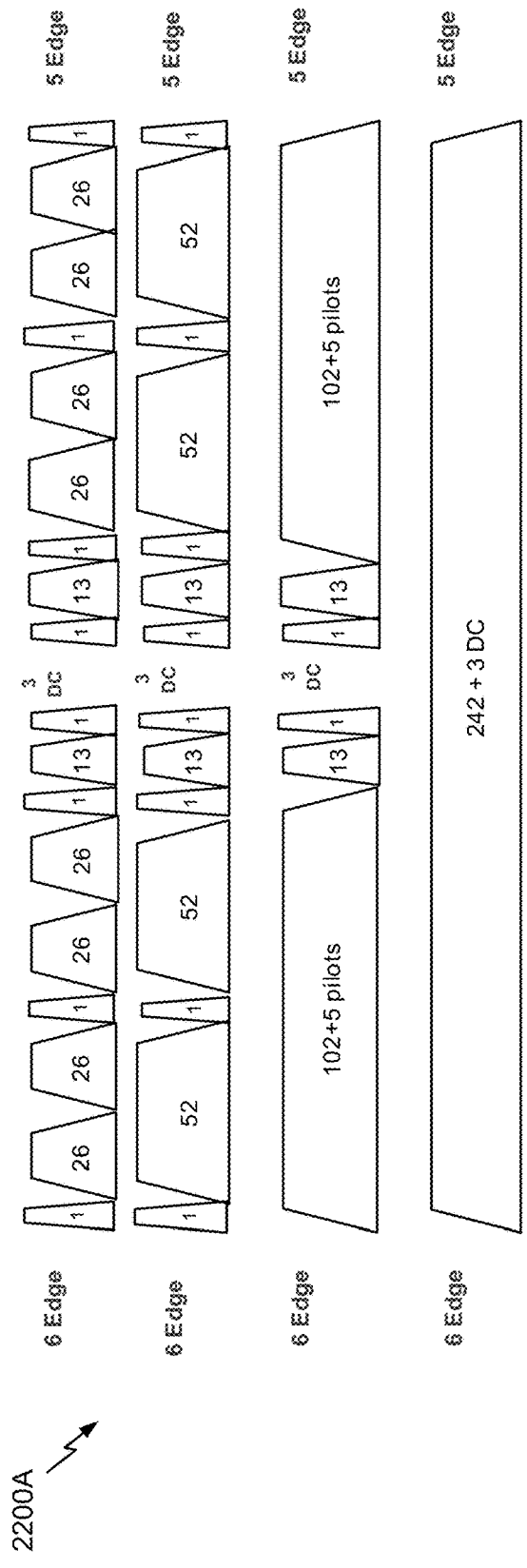
FIGS. 22A-22D show example 20 MHz, 40 MHz, 80 MHz, and 160 MHz transmissions using 26-, 52-, 106-, 107-, 242-, and/or 996-tone allocations, according to various embodiments.

FIGS. 22A-22D show example 20 MHz, 40 MHz, 80 MHz, and 160 MHz transmissions using 26-, 52-, 106-, 107-, 242-, and/or 996-tone allocations, according to various embodiments. In particular, FIG. 22A shows example 20 MHz transmissions 2200A, which are organized in the same manner as the 20 MHz transmission 2000A of FIG. 20A, where A=1, B=1, C=1, and D=1, and 104+A+B+C tone groups are replaced with 102 data tones, plus 5 pilot tones. The transmissions 2200A have 6 left edge tones, 3 DC tones, and 5 right edge tones, and a total of 242 usable tones. Although FIG. 22A shows four example transmissions 2200A using various combinations of 26-, 52-, 106-, 107-, and 242-tone blocks, allocations within any given transmission can include multiple tone blocks of different sizes, having different arrangements, in various embodiments.

The first of the illustrated transmissions 2200A includes nine 26-tone blocks (with one 26-tone block being divided into two 13-tone portions), 6 left edge tones, 5 right edge tones, 2*A outer leftover tones, 2*B middle leftover tones, 2*C inner leftover tones, 3 DC tones, and 2*D additional DC tones. In the illustrated embodiment, A=1, B=1, C=1, and D=1. As discussed herein, leftover tones can variously be used as edge tones, DC tones, control tones, additional guard tones (for example, in the case of non-contiguous channel bonding), and the like.

The second of the illustrated transmissions 2200A includes four 52-tone blocks, one 26-tone block being divided into two 13-tone portions, 6 left edge tones, 5 right edge tones, 2*A outer leftover tones, 2*B middle leftover tones, 2*C inner leftover tones, 3 DC tones, and 2*D additional DC tones. In the illustrated embodiment, A=1, B=1, C=1, and D=1. As discussed herein, leftover tones can variously be used as edge tones, DC tones, control tones, additional guard tones (for example, in the case of non-contiguous channel bonding), and the like.

The third of the illustrated transmissions 2200A includes two blocks having 107 tones (102 usable, plus 5 pilot), one 26-tone block being divided into two 13-tone portions, 6 left edge tones, 5 right edge tones, 3 DC tones, and 2*D additional DC tones. In the illustrated embodiment, D=1. In another embodiment, D=2 and the 107-tone blocks can be replaced with 106-tone blocks including 102 usable tones, plus 4 pilot tones. As discussed herein, leftover tones can variously be used as edge tones, DC tones, control tones, additional guard tones (for example, in the case of non-contiguous channel bonding), and the like.

The fourth of the illustrated transmissions 2200A includes a single 242-tone block having 3 DC tones, 6 left edge tones, 5 right edge tones.

Figure 22B:
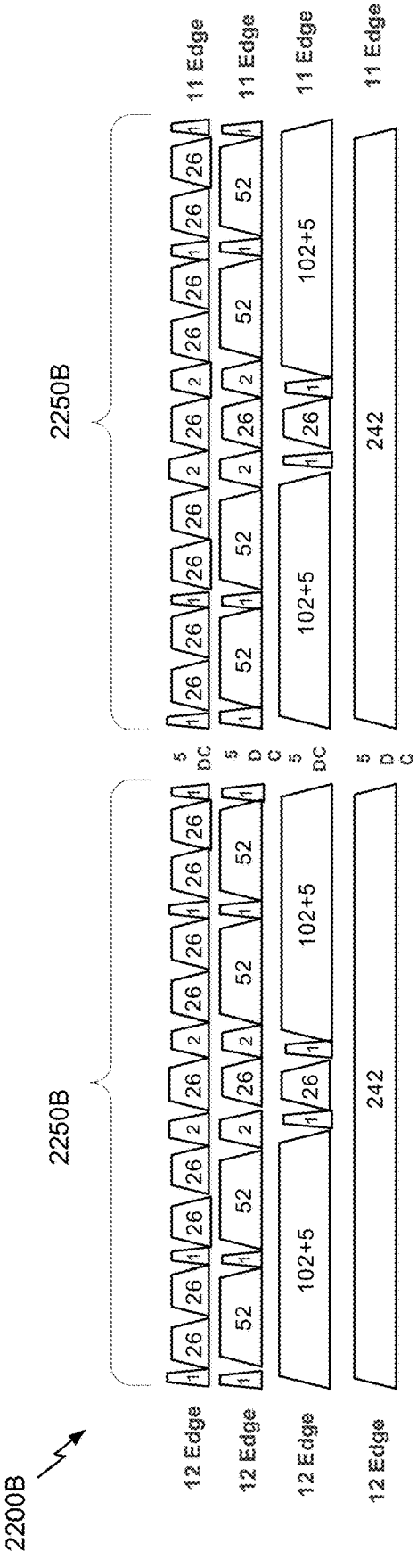

FIG. 22B shows example 40 MHz transmissions 2200B, which are organized in the same manner as the 40 MHz transmission 2000B of FIG. 20B, where A=1, B=1, C=1, and D=1, M=12, N=11, X=5, and 104+A+B+C tone groups are replaced with 102 data tones, plus 5 pilot tones. The transmissions 2200B have 12 left edge tones, 5 DC tones, and 11 right edge tones, and a total of 484 usable tones.

Although FIG. 22B shows four example transmissions 2200B using various combinations of 26-, 52-, 106-, 107-, and 242-tone blocks, allocations within any given transmission can include multiple tone blocks of different sizes, having different arrangements, in various embodiments. In the illustrated embodiment, each 40 MHz transmission 2200B is a duplicate of two 20 MHz transmissions 2250B, which in various embodiments can be the 20 MHz transmissions 2200A of FIG. 22A or any other 20 MHz transmission discussed herein.

The first of the illustrated transmissions 2200B includes two 20 MHz portions 2250B each including nine 26-tone blocks, 2*A outer leftover tones, 2*B middle leftover tones, 2*C inner leftover tones, and 2*D additional inner leftover tones. In the illustrated embodiment, A=1, B=1, C=1, and D=1. As discussed herein, leftover tones can variously be used as edge tones, DC tones, control tones, additional guard tones (for example, in the case of non-contiguous channel bonding), and the like.

The second of the illustrated transmissions 2200B includes two 20 MHz portions 2250B each including four 52-tone blocks, one 26-tone block, 2*A outer leftover tones, 2*B middle leftover tones, 2*C inner leftover tones, and 2*D additional inner leftover tones. In the illustrated embodiment, A=1, B=1, C=1, and D=1. As discussed herein, leftover tones can variously be used as edge tones, DC tones, control tones, additional guard tones (for example, in the case of non-contiguous channel bonding), and the like.

The third of the illustrated transmissions 2200B includes two 20 MHz portions 2250B each including two blocks having 107 tones (102 usable, plus 5 pilot), one 26-tone block, and D leftover tones on each side of the 26-tone block. In the illustrated embodiment, D=1. In another embodiment, D=2 and the 107-tone blocks can be replaced with 106-tone blocks including 102 usable tones, plus 4 pilot tones. As discussed herein, leftover tones can variously be used as edge tones, DC tones, control tones, additional guard tones (for example, in the case of non-contiguous channel bonding), and the like.

The fourth of the illustrated transmissions 2200B includes two 20 MHz portions 2250B. Each 20 MHz portion 2250B includes a single 242-tone block.

Figure 22C:
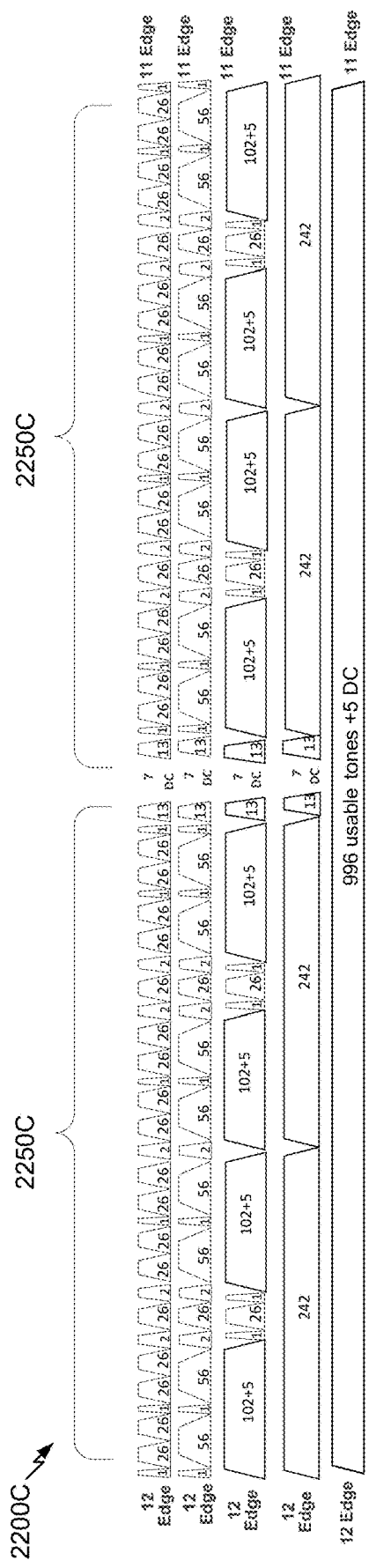

FIG. 22C shows example 80 MHz transmissions 2200C, which are organized in the same manner as the 80 MHz transmission 2000C of FIG. 20C, where A=1, B=1, C=1, and D=1, and 104+A+B+C tone groups are replaced with 102 data tones, plus 5 pilot tones. The transmissions 2200C have 12 left edge tones, 7 DC tones, and 11 right edge tones, and a total of 994 usable tones for OFDMA, and a total of 994, 996, or 998 usable tones for whole BW allocation with reduced number of DC tones being 7, or 5, or 3.

Although FIG. 22C shows five example transmissions 2200C using various combinations of 26-, 52-, 106-, 107-, 242-, and 996-tone blocks, allocations within any given transmission can include multiple tone blocks of different sizes, having different arrangements, in various embodiments. In the illustrated embodiment, each 80 MHz transmission 2200C is a duplicate of four 20 MHz transmissions 2250B, which in various embodiments can be the 20 MHz transmissions 2200A of FIG. 22A or any other 20 MHz transmission discussed herein. Additionally or alternatively, each 80 MHz transmission 2200C is a duplicate of two 40 MHz transmissions 2250C, which in various embodiments can be the 40 MHz transmissions 2200B of FIG. 22B or any other 40 MHz transmission discussed herein. In the illustrated embodiment, each 80 MHz transmission 2200C further includes an additional 26-tone block divided into two separate 13-tone portions on either side of the 7 DC tones.

The first of the illustrated transmissions 2200C includes four 20 MHz portions 2250B each including nine 26-tone blocks, 2*A outer leftover tones, 2*B middle leftover tones, 2*C inner leftover tones, and 2*D additional inner leftover tones. In the illustrated embodiment, A=1, B=1, C=1, and D=1. The first of the illustrated transmissions 2200C further includes an additional 26-tone block divided into two separate 13-tone portions on either side of the 7 DC tones. As discussed herein, leftover tones can variously be used as edge tones, DC tones, control tones, additional guard tones (for example, in the case of non-contiguous channel bonding), and the like.

The second of the illustrated transmissions 2200C includes four 20 MHz portions 2250B each including four 52-tone blocks, one 26-tone block, 2*A outer leftover tones, 2*B middle leftover tones, 2*C inner leftover tones, and 2*D additional inner leftover tones. In the illustrated embodiment, A=1, B=1, C=1, and D=1. The second of the illustrated transmissions 2200C further includes an additional 26-tone block divided into two separate 13-tone portions on either side of the 7 DC tones. As discussed herein, leftover tones can variously be used as edge tones, DC tones, control tones, additional guard tones (for example, in the case of non-contiguous channel bonding), and the like.

The third of the illustrated transmissions 2200C includes four 20 MHz portions 2250B each including two blocks having 107 tones (102 usable, plus 5 pilot), one 26-tone block, and D leftover tones on each side of the 26-tone block. In the illustrated embodiment, D=1. In another embodiment, D=2 and the 107-tone blocks can be replaced with 106-tone blocks including 102 usable tones, plus 4 pilot tones. The third of the illustrated transmissions 2200C further includes an additional 26-tone block divided into two separate 13-tone portions on either side of the 7 DC tones. As discussed herein, leftover tones can variously be used as edge tones, DC tones, control tones, additional guard tones (for example, in the case of non-contiguous channel bonding), and the like.

The fourth of the illustrated transmissions 2200C includes four 20 MHz portions 2250B. Each 20 MHz portion 2250B includes a single 242-tone block. The fourth of the illustrated transmissions 2200C further includes an additional 26-tone block divided into two separate 13-tone portions on either side of the 7 DC tones.

The fifth of the illustrated transmissions 2200C includes a single-user tone plan having 5 DC tones in various embodiments. Accordingly, the SU tone plan can include 996 usable tones.

Figure 22D:
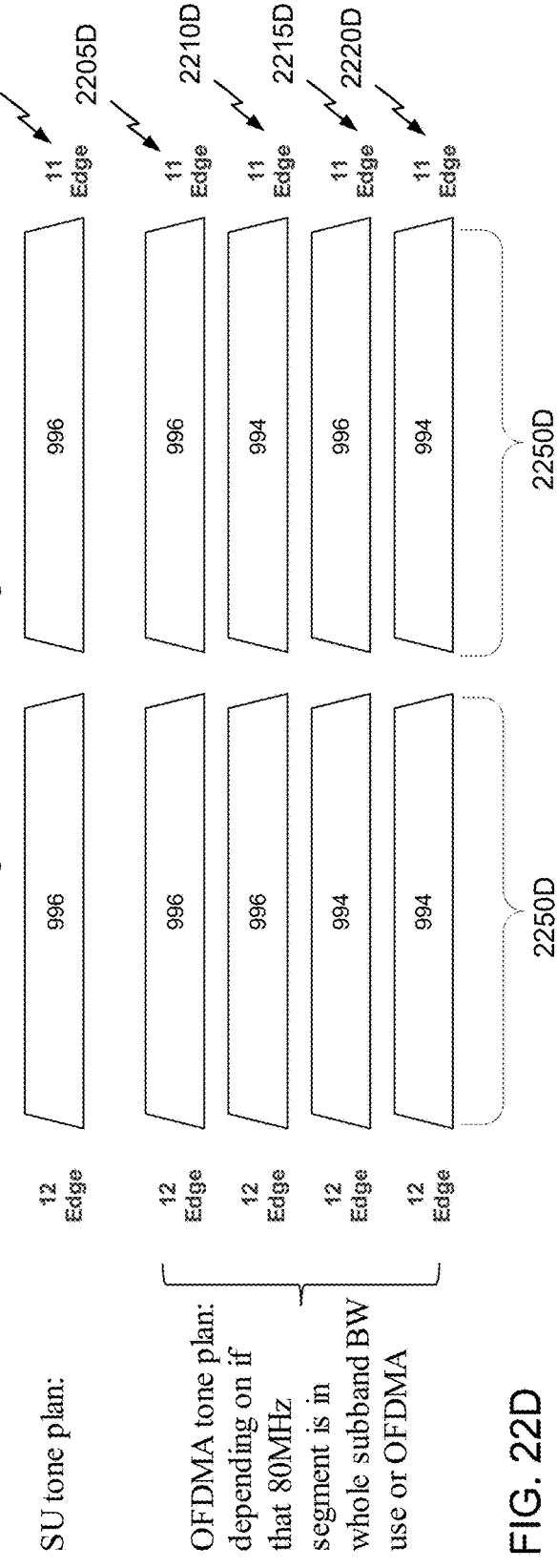

FIG. 22D shows example 160 MHz transmissions 2200D-2220D, which are organized in the same manner as the 80 MHz transmission 2200D of FIG. 22D, duplicated. The transmissions 2200D have 12 left edge tones, and 11 right edge tones, and a total of 1992 usable tones for single-user, MU-MIMO, or whole BW allocation, and a total of 1988, 1990, or 1992 for OFDMA, depending on whether each 80 MHz segment 2250D is in a whole sub-band BW allocation or OFDMA.

Although FIG. 22D shows five example transmissions 2200D-2220D using various combinations tone blocks, allocations within any given transmission can include multiple tone blocks of different sizes, having different arrangements, in various embodiments. In the illustrated embodiment, each 160 MHz transmission 2200D-2220D is a duplicate of two 80 MHz transmissions 2250D, which in various embodiments can be the 80 MHz transmissions 2200C of FIG. 22C or any other 80 MHz transmission discussed herein.

The first of the illustrated transmissions 2200D includes two 80 MHz portions 2250D each including a 996-tone block (996 usable tones, plus 5 sub-band DC tones). In contiguous embodiments, the transmission 2200D can include 23 DC tones. For non-contiguous embodiments, DC tones can be omitted. In various embodiments, the illustrated transmission 2200D can include a single-user or multi-user MIMO transmission.

The second of the illustrated transmissions 2205D includes two 80 MHz portions 2250D each including a 996-tone block (996 usable tones, plus 5 sub-band DC tones). In contiguous embodiments, the transmission 2205D can include 23 DC tones. For non-contiguous embodiments, DC tones can be omitted. In various embodiments, the illustrated transmission 2205D can include an OFDMA transmission.

The third of the illustrated transmissions 2210D includes two 80 MHz portions 2250D, the first including a 996-tone block (996 usable tones, plus 5 sub-band DC tones), and the second including any combination of tone blocks shared by multiple OFDMA users (total 994 usable tones, plus 7 sub-band DC tones). In contiguous embodiments, the transmission 2205D can include 23 DC tones. For non-contiguous embodiments, DC tones can be omitted. In various embodiments, the illustrated transmission 2210D can include an OFDMA transmission.

The fourth of the illustrated transmissions 2215D includes two 80 MHz portions 2250D, the first including any combination of tone blocks shared by multiple OFDMA users (total 994 usable tones, plus 7 sub-band DC tones), and the second including a 996-tone block (996 usable tones, plus 5 sub-band DC tones). In contiguous embodiments, the transmission 2205D can include 23 DC tones. For non-contiguous embodiments, DC tones can be omitted. In various embodiments, the illustrated transmission 2215D can include an OFDMA transmission.

The fifth of the illustrated transmissions 2220D includes two 80 MHz portions 2250D each including any combination of tone blocks shared by multiple OFDMA users (total 994 usable tones, plus 7 sub-band DC tones). In contiguous embodiments, the transmission 2205D can include 23 DC tones. For non-contiguous embodiments, DC tones can be omitted. In various embodiments, the illustrated transmission 2220D can include an OFDMA transmission.

Balanced Tone Plan Embodiment

In various embodiments, one or more leftover tones can be arranged for edge protection (for example, from a pulse-shaping filter, adjacent blocker, etc.). In various embodiments, one or more leftover tones can be arranged as separators between different allocation units (resource units or "RUs," for example, to reduce leakage from adjacent blocks). In some embodiments, one or more leftover tones can be arranged according to a balanced mix of edge protection and block separation. One such example tone plan is shown and described below for 20 MHz, 40 MHz, and 80 MHz transmissions with respect to FIGS. 23A-23C.

Figure 23C:
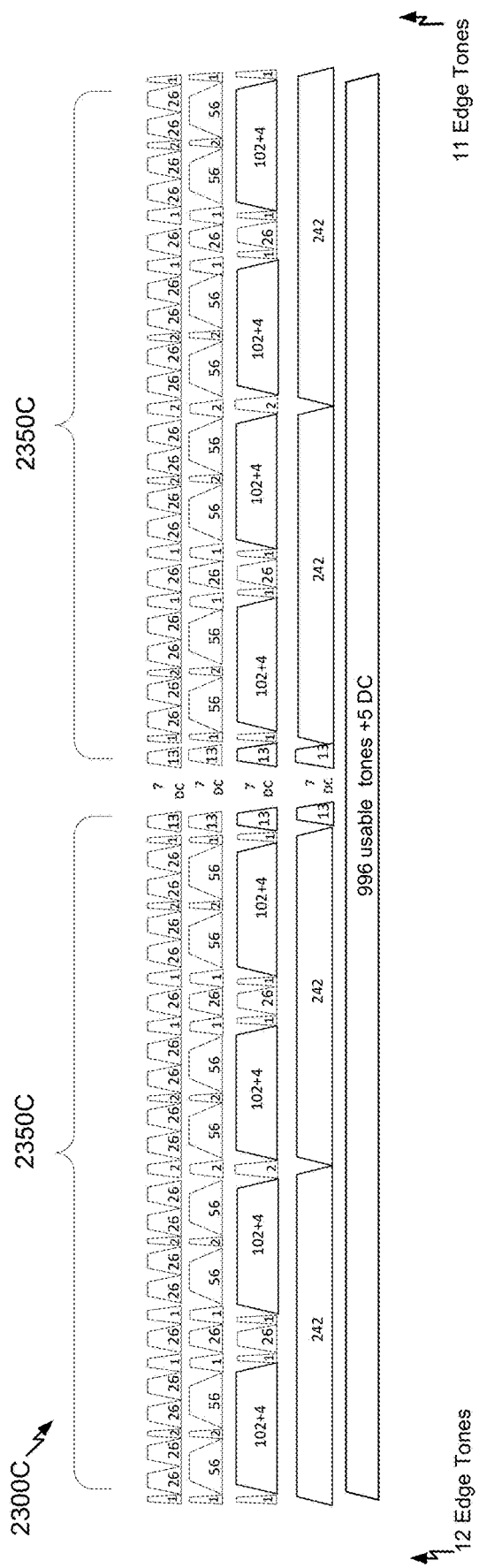

FIGS. 23A-23C show example 20 MHz, 40 MHz, and 80 MHz transmissions using 26-, 52-, 106-, 107-, 242-, and/or 996-tone allocations, according to various embodiments. In particular, FIG. 23A shows example 20 MHz transmissions 2200A, which are organized in a similar manner as the 20 MHz transmission 2000A of FIG. 20A, where A=1, B=1, C=0, and D=2, and 104+A+B+C tone groups are replaced with 102 data tones, plus 4 pilot tones. The transmissions 2300A have 6 left edge tones, 7 DC tones, and 5 right edge tones, and a total of 238 or 242 usable tones. Although FIG. 23A shows four example transmissions 2300A using various combinations of 26-, 52-, 106-, 107-, and 242-tone blocks, allocations within any given transmission can include multiple tone blocks of different sizes, having different arrangements, in various embodiments.

The first of the illustrated transmissions 2300A includes nine 26-tone blocks (with one 26-tone block being divided into two 13-tone portions), 6 left edge tones, 5 right edge tones, 2*A outer leftover tones, 2*B middle leftover tones, 2*C inner leftover tones, 3 DC tones, and 2*D additional DC tones. In the illustrated embodiment, A=1, B=1, C=0, and D=2. As discussed herein, leftover tones can variously be used as edge tones, DC tones, control tones, additional guard tones (for example, in the case of non-contiguous channel bonding), and the like.

The second of the illustrated transmissions 2300A includes four 52-tone blocks, one 26-tone block being divided into two 13-tone portions, 6 left edge tones, 5 right edge tones, 2*A outer leftover tones, 2*B middle leftover tones, 2*C inner leftover tones, 3 DC tones, and 2*D additional DC tones. In the illustrated embodiment, A=1, B=1, C=0, and D=2. As discussed herein, leftover tones can variously be used as edge tones, DC tones, control tones, additional guard tones (for example, in the case of non-contiguous channel bonding), and the like.

The third of the illustrated transmissions 2300A includes two blocks having 106 tones (102 usable, plus 4 pilot), one 26-tone block being divided into two 13-tone portions, 6 left edge tones, 5 right edge tones, 3 DC tones, and 2*D additional DC tones. In the illustrated embodiment, D=2. In another embodiment, the 106-tone blocks can be replaced with 107-tone blocks including 102 usable tones, plus 5 pilot tones, and the leftover tones adjusted accordingly. As discussed herein, leftover tones can variously be used as edge tones, DC tones, control tones, additional guard tones (for example, in the case of non-contiguous channel bonding), and the like.

The fourth of the illustrated transmissions 2300A includes a single 242-tone block having 3 DC tones, 6 left edge tones, 5 right edge tones.

FIG. 23B shows example 40 MHz transmissions 2300B, which are organized in a similar manner as the 40 MHz transmission 2000B of FIG. 20B, where A=1, B=2, C=0, and D=1, M=12, N=11, X=5, and 104+A+B+C tone groups are replaced with 102 data tones, plus 4 pilot tones. The transmissions 2300B have 12 left edge tones, 5 DC tones, and 11 right edge tones, and a total of 484 usable tones.

Although FIG. 23B shows four example transmissions 2300B using various combinations of 26-, 52-, 106-, 107-, and 242-tone blocks, allocations within any given transmission can include multiple tone blocks of different sizes, having different arrangements, in various embodiments. In the illustrated embodiment, each 40 MHz transmission 2300B is a duplicate of two 20 MHz transmissions 2350B, which in various embodiments can be the 20 MHz transmissions 2300A of FIG. 23A or any other 20 MHz transmission discussed herein.

The first of the illustrated transmissions 2300B includes two 20 MHz portions 2350B each including nine 26-tone blocks, 2*A outer leftover tones, 2*B middle leftover tones, 2*C inner leftover tones, and 2*D additional inner leftover tones. In the illustrated embodiment, A=1, B=2, C=0, and D=1. As discussed herein, leftover tones can variously be used as edge tones, DC tones, control tones, additional guard tones (for example, in the case of non-contiguous channel bonding), and the like.

The second of the illustrated transmissions 2300B includes two 20 MHz portions 2350B each including four 52-tone blocks, one 26-tone block, 2*A outer leftover tones, 2*B middle leftover tones, 2*C inner leftover tones, and 2*D additional inner leftover tones. In the illustrated embodiment, A=1, B=2, C=0, and D=1. As discussed herein, leftover tones can variously be used as edge tones, DC tones, control tones, additional guard tones (for example, in the case of non-contiguous channel bonding), and the like.

The third of the illustrated transmissions 2300B includes two 20 MHz portions 2350B each including two blocks having 106 tones (102 usable, plus 4 pilot), one 26-tone block, 1 additional left edge tone, 1 additional right edge tone, and D leftover tones on each side of the 26-tone block. In the illustrated embodiment D=1. As discussed herein, leftover tones can variously be used as edge tones, DC tones, control tones, additional guard tones (for example, in the case of non-contiguous channel bonding), and the like.

The fourth of the illustrated transmissions 2300B includes two 20 MHz portions 2350B. Each 20 MHz portion 2350B includes a single 242-tone block.

FIG. 23C shows example 80 MHz transmissions 2300C, which are organized in a similar manner as the 80 MHz transmission 2000C of FIG. 20C, where A=1, B=2, C=0, and D=1, and 104+A+B+C tone groups are replaced with 102 data tones, plus 4 pilot tones. The transmissions 2300C have 12 left edge tones, 7 DC tones, and 11 right edge tones, and a total of 994 usable tones for OFDMA, and a total of 996 usable tones for whole BW allocation with reduced number of DC tones being 5.

Although FIG. 23C shows five example transmissions 2300C using various combinations of 26-, 52-, 106-, 107-, 242-, and 996-tone blocks, allocations within any given transmission can include multiple tone blocks of different sizes, having different arrangements, in various embodiments. In the illustrated embodiment, each 80 MHz transmission 2300C is a duplicate of four 20 MHz transmissions 2350B, which in various embodiments can be the 20 MHz transmissions 2300A of FIG. 23A or any other 20 MHz transmission discussed herein. Additionally or alternatively, each 80 MHz transmission 2300C is a duplicate of two 40 MHz transmissions 2350C, which in various embodiments can be the 40 MHz transmissions 2300B of FIG. 23B or any other 40 MHz transmission discussed herein. In the illustrated embodiment, each 80 MHz transmission 2300C further includes an additional 26-tone block divided into two separate 13-tone portions on either side of the 7 DC tones.

The first of the illustrated transmissions 2300C includes four 20 MHz portions 2350B each including nine 26-tone blocks, 2*A outer leftover tones, 2*B middle leftover tones, 2*C inner leftover tones, and 2*D additional inner leftover tones. In the illustrated embodiment, A=1, B=2, C=0, and D=1. The first of the illustrated transmissions 2300C further includes an additional 26-tone block divided into two separate 13-tone portions on either side of the 7 DC tones. As discussed herein, leftover tones can variously be used as edge tones, DC tones, control tones, additional guard tones (for example, in the case of non-contiguous channel bonding), and the like.

The second of the illustrated transmissions 2300C includes four 20 MHz portions 2350B each including four 52-tone blocks, one 26-tone block, 2*A outer leftover tones, 2*B middle leftover tones, 2*C inner leftover tones, and 2*D additional inner leftover tones. In the illustrated embodiment, A=1, B=2, C=0, and D=1. The second of the illustrated transmissions 2300C further includes an additional 26-tone block divided into two separate 13-tone portions on either side of the 7 DC tones. As discussed herein, leftover tones can variously be used as edge tones, DC tones, control tones, additional guard tones (for example, in the case of non-contiguous channel bonding), and the like.

The third of the illustrated transmissions 2300C includes four 20 MHz portions 2350B each including two blocks having 106 tones (102 usable, plus 4 pilot), one 26-tone block, and D leftover tones on each side of the 106-tone blocks. In the illustrated embodiment, D=1. Thus, in the portions where two 106-tone blocks are adjacent, there are a total of 2 leftover tones between the 106-tone blocks (one for each block). The third of the illustrated transmissions 2300C further includes an additional 26-tone block divided into two separate 13-tone portions on either side of the 7 DC tones. As discussed herein, leftover tones can variously be used as edge tones, DC tones, control tones, additional guard tones (for example, in the case of non-contiguous channel bonding), and the like.

The fourth of the illustrated transmissions 2300C includes four 20 MHz portions 2350B. Each 20 MHz portion 2350B includes a single 242-tone block. The fourth of the illustrated transmissions 2300C further includes an additional 26-tone block divided into two separate 13-tone portions on either side of the 7 DC tones.

The fifth of the illustrated transmissions 2300C includes a single-user tone plan having 5 DC tones in various embodiments. Accordingly, the SU tone plan can include 996 usable tones.

Edge Protection Prioritized Tone Plan Embodiment

As discussed above, in various embodiments, one or more leftover tones can be arranged for edge protection (for example, from a pulse-shaping filter, adjacent blocker, etc.) and as separators between different RUs (for example, to reduce leakage from adjacent blocks). In some embodiments, one or more leftover tones can be arranged in a manner that prioritizes edge protection over, for example, block separation. In some embodiments, fixed locations with proper block sizes can serve as a control channel. One such example tone plan is shown and described below for 20 MHz, 40 MHz, and 80 MHz transmissions with respect to FIGS. 24A-24C.

Figure 24A:
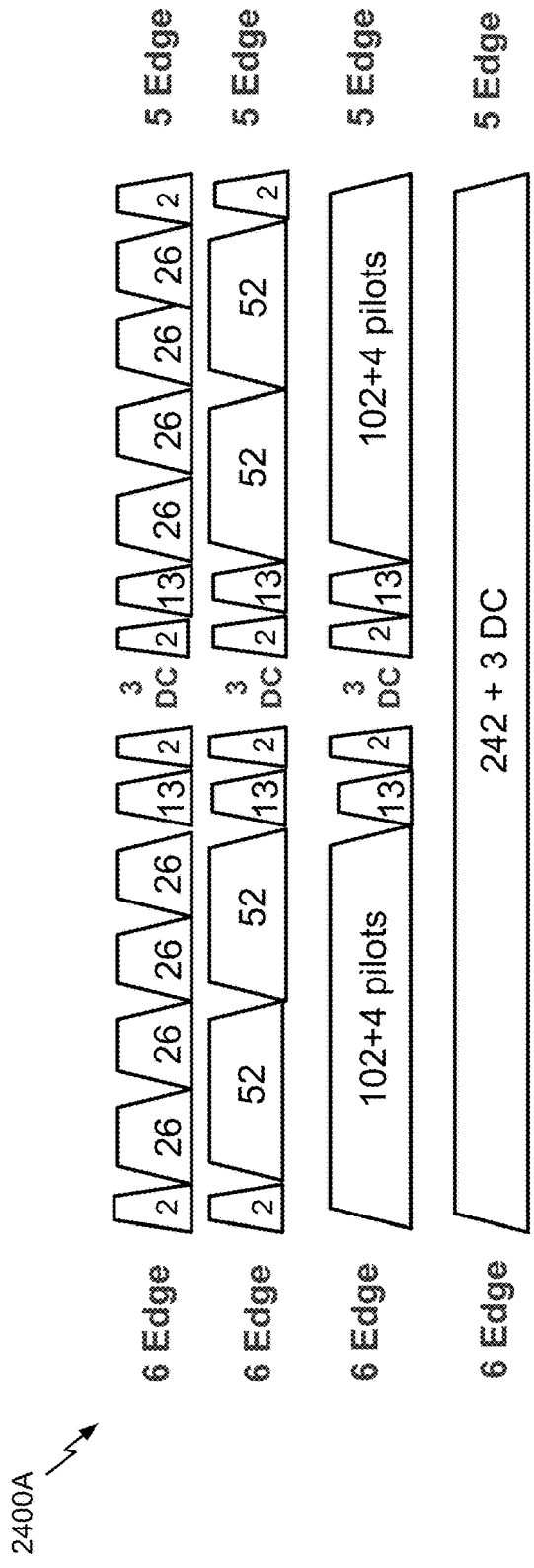
FIGS. 24A-24C show example 20 MHz, 40 MHz, 80 MHz, and 160 MHz transmissions using 26-, 52-, 106-, 107-, 242-, and/or 996-tone allocations, according to various embodiments.
Figure 24B:
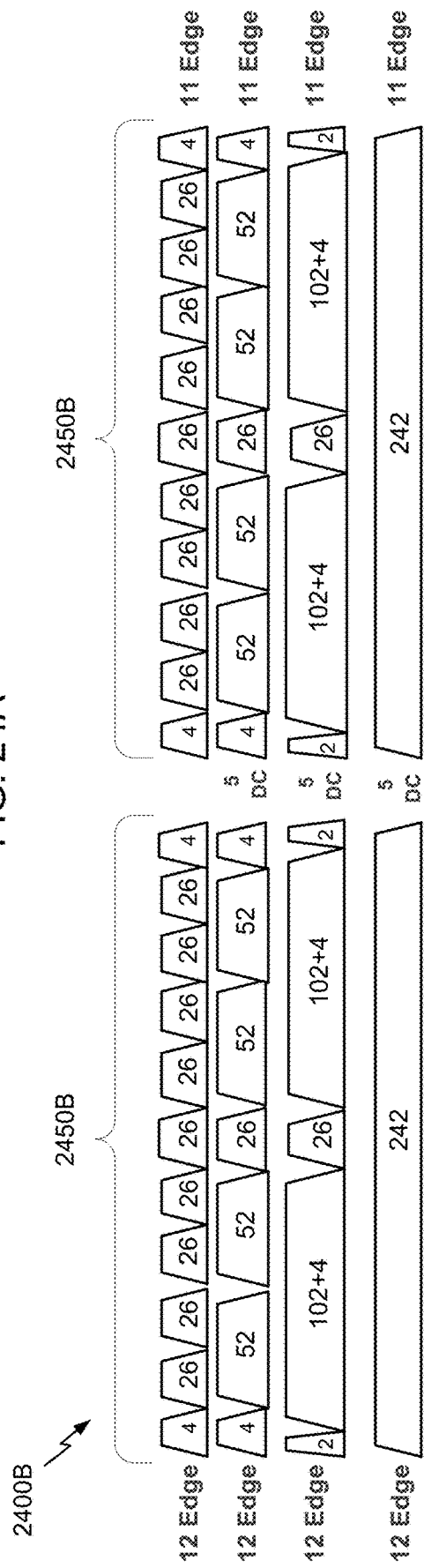
Figure 24C:
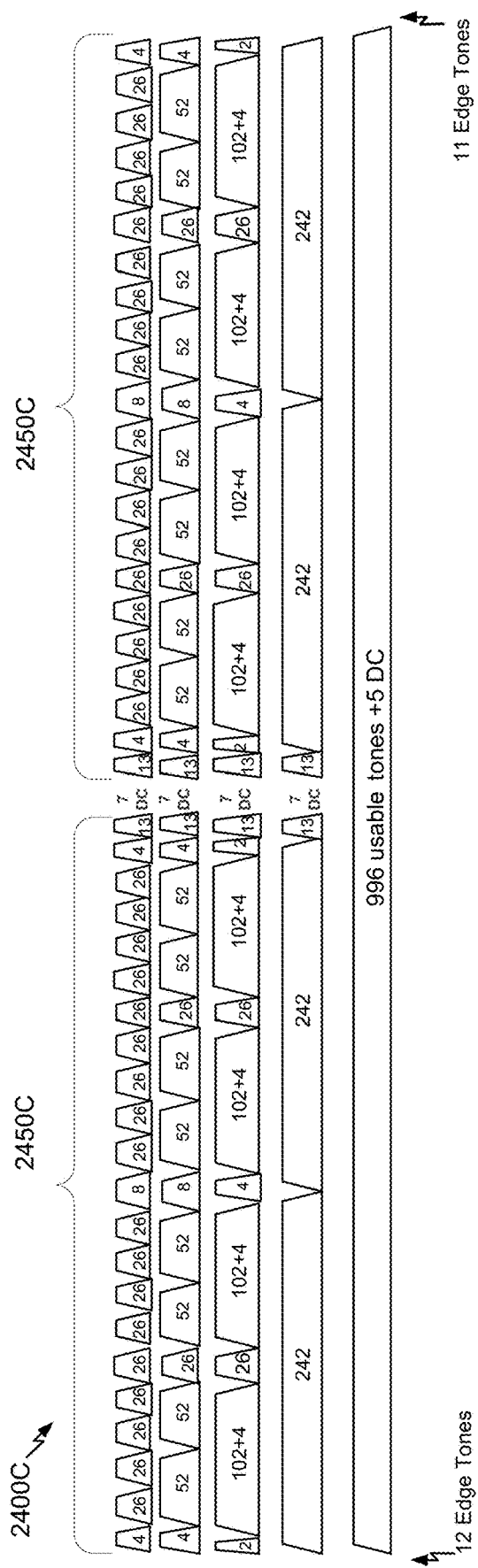

FIGS. 24A-24C show example 20 MHz, 40 MHz, and 80 MHz transmissions using 26-, 52-, 106-, 107-, 242-, and/or 996-tone allocations, according to various embodiments. In particular, FIG. 24A shows example 20 MHz transmissions 2200A, which are organized in a similar manner as the 20 MHz transmission 2000A of FIG. 20A, where A=2, B=0, C=0, and D=2, and 104+A+B+C tone groups are replaced with 102 data tones, plus 4 pilot tones. The transmissions 2400A have 6 left edge tones, 3 DC tones, and 5 right edge tones, and a total of 242 usable tones. Although FIG. 24A shows four example transmissions 2400A using various combinations of 26-, 52-, 106-, 107-, and 242-tone blocks, allocations within any given transmission can include multiple tone blocks of different sizes, having different arrangements, in various embodiments.

The first of the illustrated transmissions 2400A includes nine 26-tone blocks (with one 26-tone block being divided into two 13-tone portions), 6 left edge tones, 5 right edge tones, 2*A outer leftover tones, 2*B middle leftover tones, 2*C inner leftover tones, 3 DC tones, and 2*D additional DC tones. In the illustrated embodiment, A=2, B=0, C=0, and D=2. As discussed herein, leftover tones can variously be used as edge tones, DC tones, control tones, additional guard tones (for example, in the case of non-contiguous channel bonding), and the like.

The second of the illustrated transmissions 2400A includes four 52-tone blocks, one 26-tone block being divided into two 13-tone portions, 6 left edge tones, 5 right edge tones, 2*A outer leftover tones, 2*B middle leftover tones, 2*C inner leftover tones, 3 DC tones, and 2*D additional DC tones. In the illustrated embodiment, A=2, B=0, C=0, and D=2. As discussed herein, leftover tones can variously be used as edge tones, DC tones, control tones, additional guard tones (for example, in the case of non-contiguous channel bonding), and the like.

The third of the illustrated transmissions 2400A includes two blocks having 106 tones (102 usable, plus 4 pilot), one 26-tone block being divided into two 13-tone portions, 6 left edge tones, 5 right edge tones, 3 DC tones, and 2*D additional DC tones. In the illustrated embodiment, D=2. In another embodiment, the 106-tone blocks can be replaced with 107-tone blocks including 102 usable tones, plus 5 pilot tones, and the leftover tones adjusted accordingly. As discussed herein, leftover tones can variously be used as edge tones, DC tones, control tones, additional guard tones (for example, in the case of non-contiguous channel bonding), and the like.

The fourth of the illustrated transmissions 2400A includes a single 242-tone block having 3 DC tones, 6 left edge tones, 5 right edge tones.

FIG. 24B shows example 40 MHz transmissions 2400B, which are organized in a similar manner as the 40 MHz transmission 2000B of FIG. 20B, where A=4, B=0, C=0, D=0, M=12, N=11, X=5, and 104+A+B+C tone groups are replaced with 102 data tones, plus 4 pilot tones. The transmissions 2400B have 12 left edge tones, 5 DC tones, and 11 right edge tones, and a total of 484 usable tones.

Although FIG. 24B shows four example transmissions 2400B using various combinations of 26-, 52-, 106-, 107-, and 242-tone blocks, allocations within any given transmission can include multiple tone blocks of different sizes, having different arrangements, in various embodiments. In the illustrated embodiment, each 40 MHz transmission 2400B is a duplicate of two 20 MHz transmissions 2450B, which in various embodiments can be the 20 MHz transmissions 2400A of FIG. 24A or any other 20 MHz transmission discussed herein.

The first of the illustrated transmissions 2400B includes two 20 MHz portions 2450B each including nine 26-tone blocks, 2*A outer leftover tones, 2*B middle leftover tones, 2*C inner leftover tones, and 2*D additional inner leftover tones. In the illustrated embodiment, A=4, B=0, C=0, and D=0. As discussed herein, leftover tones can variously be used as edge tones, DC tones, control tones, additional guard tones (for example, in the case of non-contiguous channel bonding), and the like.

The second of the illustrated transmissions 2400B includes two 20 MHz portions 2450B each including four 52-tone blocks, one 26-tone block, 2*A outer leftover tones, 2*B middle leftover tones, 2*C inner leftover tones, and 2*D additional inner leftover tones. In the illustrated embodiment, A=4, B=0, C=0, and D=0. As discussed herein, leftover tones can variously be used as edge tones, DC tones, control tones, additional guard tones (for example, in the case of non-contiguous channel bonding), and the like.

The third of the illustrated transmissions 2400B includes two 20 MHz portions 2450B each including two blocks having 106 tones (102 usable, plus 4 pilot), one 26-tone block, 1 additional left edge tone, 1 additional right edge tone, and D leftover tones on each side of the 26-tone block. In the illustrated embodiment, D=0. As discussed herein, leftover tones can variously be used as edge tones, DC tones, control tones, additional guard tones (for example, in the case of non-contiguous channel bonding), and the like.

The fourth of the illustrated transmissions 2400B includes two 20 MHz portions 2450B. Each 20 MHz portion 2450B includes a single 242-tone block.

FIG. 24C shows example 80 MHz transmissions 2400C, which are organized in a similar manner as the 80 MHz transmission 2000C of FIG. 20C, where A=4, B=0, C=0, and D=0, and 104+A+B+C tone groups are replaced with 102 data tones, plus 4 pilot tones. The transmissions 2400C have 12 left edge tones, 7 DC tones, and 11 right edge tones, and a total of 994 usable tones for OFDMA, and a total of 996 usable tones for whole BW allocation with reduced number of DC tones being 5.

Although FIG. 24C shows five example transmissions 2400C using various combinations of 26-, 52-, 106-, 107-, 242-, and 996-tone blocks, allocations within any given transmission can include multiple tone blocks of different sizes, having different arrangements, in various embodiments. In the illustrated embodiment, each 80 MHz transmission 2400C is a duplicate of four 20 MHz transmissions 2450B, which in various embodiments can be the 20 MHz transmissions 2400A of FIG. 24A or any other 20 MHz transmission discussed herein. Additionally or alternatively, each 80 MHz transmission 2400C is a duplicate of two 40 MHz transmissions 2450C, which in various embodiments can be the 40 MHz transmissions 2400B of FIG. 24B or any other 40 MHz transmission discussed herein. In the illustrated embodiment, each 80 MHz transmission 2400C further includes an additional 26-tone block divided into two separate 13-tone portions on either side of the 7 DC tones.

The first of the illustrated transmissions 2400C includes four 20 MHz portions 2450B each including nine 26-tone blocks, 2*A outer leftover tones, 2*B middle leftover tones, 2*C inner leftover tones, and 2*D additional inner leftover tones. In the illustrated embodiment, A=4, B=0, C=0, and D=0. The first of the illustrated transmissions 2400C further includes an additional 26-tone block divided into two separate 13-tone portions on either side of the 7 DC tones. As discussed herein, leftover tones can variously be used as edge tones, DC tones, control tones, additional guard tones (for example, in the case of non-contiguous channel bonding), and the like.

The second of the illustrated transmissions 2400C includes four 20 MHz portions 2450B each including four 52-tone blocks, one 26-tone block, 2*A outer leftover tones, 2*B middle leftover tones, 2*C inner leftover tones, and 2*D additional inner leftover tones. In the illustrated embodiment, A=4, B=0, C=0, and D=0. The second of the illustrated transmissions 2400C further includes an additional 26-tone block divided into two separate 13-tone portions on either side of the 7 DC tones. As discussed herein, leftover tones can variously be used as edge tones, DC tones, control tones, additional guard tones (for example, in the case of non-contiguous channel bonding), and the like.

The third of the illustrated transmissions 2400C includes four 20 MHz portions 2450B each including two blocks having 106 tones (102 usable, plus 4 pilot), one 26-tone block, and 2 leftover tones on each side of the 20 MHz portions 2450B (i.e., 4 total leftover tones in the middle of each half-bandwidth 2450C, and 2 on each side of each half-bandwidth 2450C). The third of the illustrated transmissions 2400C further includes an additional 26-tone block divided into two separate 13-tone portions on either side of the 7 DC tones. As discussed herein, leftover tones can variously be used as edge tones, DC tones, control tones, additional guard tones (for example, in the case of non-contiguous channel bonding), and the like.

The fourth of the illustrated transmissions 2400C includes four 20 MHz portions 2450B. Each 20 MHz portion 2450B includes a single 242-tone block. The fourth of the illustrated transmissions 2400C further includes an additional 26-tone block divided into two separate 13-tone portions on either side of the 7 DC tones.

The fifth of the illustrated transmissions 2400C includes a single-user tone plan including a 996-tone block having 5 DC tones in various embodiments. Accordingly, the SU tone plan can include 996 usable tones.

Interference Measurement in Large Allocation Blocks

As discussed above, one or more leftover tones can be used for interference measurement in various embodiments. In some embodiments, there may be few or no leftover tones available for interference measurement. For example, the third, fourth, and fifth rows of transmissions 2000A-2000C (FIGS. 20A-20C) include relatively allocation blocks of, for example, 102+4, 102+5, 242, and 996 tones. Thus, in various additional or alternative embodiments other tones can be used for interference measurement.

In one embodiment, one or more pilot tones can be punctured. For example, a transmitting device can transmit nothing on the punctured pilot tones, and a receiver can measure interference on those tones. In other embodiments, other tones can be punctured for interference measurement. In various embodiments, the number of tones punctured for interference measurement per block can be variable. In some embodiments, the number of tones punctured for interference measurement per block can be based on the number of tones in each respective block, or based on the number of leftover tones in each respective block, or both. For example, blocks with no (or relatively fewer) leftover tones and relatively many total tones can have a higher number of punctured tones as compared to blocks with relatively many leftover tones and relatively fewer total tones.

Implementing Technology

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations.

As used herein, a phrase referring to "at least one of" a list of items refers to any combination of those items, including single members. As a first example, "at least one of a and b" (also "a or b") is intended to cover a, b, and a-b, as well as any combination with multiples of the same element (e.g., a-a, a-a-a, a-a-b, a-b-b, b-b, b-b-b, or any other ordering of a and b). As a second example, "at least one of: a, b, and c" (also "a, b, or c") is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. An apparatus, comprising:
one or more processors;
a memory storing instructions that, when executed by the one or more processors, cause the apparatus to perform operations comprising:
dividing a plurality of tones of a total bandwidth into a plurality of 26-tone, 52-tone, 106-tone, 242-tone, or 996-tone blocks;
allocating at least one of the plurality of tone blocks to a first wireless communication device;
puncturing a first number of pilot tones of a first tone block of the plurality of tone blocks for use in measuring interference on the first number of punctured pilot tones, the first number based on a total number of tones in the first tone block and a number of leftover tones in the first tone block; and
puncturing a second number of pilot tones of a second tone block of the plurality of tone blocks for use in measuring interference on the second number of punctured pilot tones, the second number being based on a total number of tones in the second tone block and a number of leftover tones in the second tone block, wherein the total number of tones in the first tone block is greater than the total number of tones in the second tone block, the number of leftover tones in the first tone block is less than the number of leftover tones in the second tone block, and the first number of punctured pilot tones of the first block is higher than the second number of punctured pilot tones of the second block; and
a transmitter configured to transmit a packet indicating the allocation to at least the first wireless communication device or a second wireless communication device.

2. The apparatus of claim 1, wherein the total bandwidth is a 20 MHz bandwidth that comprises at least one of:
6 left edge tones, followed by 1 unallocated tone, followed by two 26-tone blocks, followed by 1 unallocated tone, followed by two 26-tone blocks, followed by 13 tones of a split 26-tone block, followed by 7 direct current (DC) tones, followed by 13 tones of the split 26-tone block, followed by two 26-tone blocks, followed by 1 unallocated tone, followed by two 26-tone blocks, followed by 1 unallocated tone, followed by 5 right edge tones;
6 left edge tones, followed by 1 unallocated tone, followed by one 52-tone block, followed by 1 unallocated tone, followed by one 52-tone block, followed by 13 tones of a split 26-tone block, followed by 7 DC tones, followed by 13 tones of the split 26-tone block, followed by one 52-tone block, followed by 1 unallocated tone, followed by one 52-tone block, followed by 1 unallocated tone, followed by 5 right edge tones;
6 left edge tones, followed by a 106-tone block, followed by 13 tones of a split 26-tone block, followed by 7 DC tones, followed by 13 tones of the split 26-tone block, followed by a 106-tone block, followed by 5 right edge tones; and
6 left edge tones, followed by a 121 tones of a split 242-tone block, followed by 3 DC tones, followed by a 121 tones of the split 242-tone block, followed by 5 right edge tones.

3. The apparatus of claim 2, wherein the packet comprises a 160 MHz transmission comprising two 80 MHz transmissions.

4. The apparatus of claim 3, wherein the packet comprises two contiguous 80 MHz transmissions and 23 direct current tones.

5. The apparatus of claim 3, wherein the packet comprises two noncontiguous 80 MHz transmissions and only sub-band direct current tones.

6. The apparatus of claim 1, wherein the total bandwidth is a 40 MHz bandwidth that comprises at least one of:
12 left edge tones, followed by 1 unallocated tone, followed by two 26-tone blocks, followed by 2 unallocated tones, followed by two 26-tone blocks, followed by 1 unallocated tone, followed by one 26-tone block, followed by 1 unallocated tone, followed by two 26-tone blocks, followed by 2 unallocated tones, followed by two 26-tone blocks, followed by 1 unallocated tone, followed by 5 direct current (DC) tones, followed by 1 unallocated tone, followed by two 26-tone blocks, followed by 2 unallocated tones, followed by two 26-tone blocks, followed by 1 unallocated tone, followed by one 26-tone block, followed by 1 unallocated tone, followed by two 26-tone blocks, followed by 2 unallocated tones, followed by two 26-tone blocks, followed by 1 unallocated tone, followed by 11 right edge tones;
12 left edge tones, followed by 1 unallocated tone, followed by one 52-tone block, followed by 2 unallocated tones, followed by one 52-tone block, followed by 1 unallocated tone, followed by one 26-tone block, followed by 1 unallocated tone, followed by one 52-tone block, followed by 2 unallocated tones, followed by one 52-tone block, followed by 1 unallocated tone, followed by 5 DC tones, followed by 1 unallocated tone, followed by one 52-tone block, followed by 2 unallocated tones, followed by one 52-tone block, followed by 1 unallocated tone, followed by one 26-tone block, followed by 1 unallocated tone, followed by one 52-tone block, followed by 2 unallocated tones, followed by one 52-tone block, followed by 1 unallocated tone, followed by 11 right edge tones;
12 left edge tones, followed by 1 unallocated tone, followed by a 106-tone block, followed by 1 unallocated tone, followed by one 26-tone block, followed by 1 unallocated tone, followed by a 106-tone block, followed by 1 unallocated tone, followed by 5 DC tones, followed by 1 unallocated tone, followed by a 106-tone block, followed by 1 unallocated tone, followed by one 26-tone block, followed by 1 unallocated tone, followed by a 106-tone block, followed by 1 unallocated tone, followed by 11 right edge tones; and
12 left edge tones, followed by a 242-tone block, followed by 5 DC tones, followed by a 242-tone block, followed by 11 right edge tones.

7. The apparatus of claim 1, wherein the total bandwidth is a 80 MHz bandwidth that comprises at least one of:
12 left edge tones, followed by 1 unallocated tone, followed by two 26-tone blocks, followed by 2 unallocated tones, followed by two 26-tone blocks, followed by 1 unallocated tone, followed by one 26-tone block, followed by 1 unallocated tone, followed by two 26-tone blocks, followed by 2 unallocated tones, followed by two 26-tone blocks, followed by 2 unallocated tones, followed by two 26-tone blocks, followed by 2 unallocated tones, followed by two 26-tone blocks, followed by 1 unallocated tone, followed by one 26-tone block, followed by 1 unallocated tone, followed by two 26-tone blocks, followed by 2 unallocated tones, followed by two 26-tone blocks, followed by 1 unallocated tone, followed by 13 tones of a split 26-tone block, followed by 7 direct current (DC) tones, followed by 13 tones of the split 26-tone block, followed by 1 unallocated tone, followed by two 26-tone blocks, followed by 2 unallocated tones, followed by two 26-tone blocks, followed by 1 unallocated tone, followed by one 26-tone block, followed by 1 unallocated tone, followed by two 26-tone blocks, followed by 2 unallocated tones, followed by two 26-tone blocks, followed by 2 unallocated tones, followed by two 26-tone blocks, followed by 2 unallocated tones, followed by two 26-tone blocks, followed by 1 unallocated tone, followed by one 26-tone block, followed by 1 unallocated tone, followed by two 26-tone blocks, followed by 2 unallocated tones, followed by two 26-tone blocks, followed by 1 unallocated tone, followed by 11 right edge tones;
12 left edge tones, followed by 1 unallocated tone, followed by one 52-tone block, followed by 2 unallocated tones, followed by one 52-tone block, followed by 1 unallocated tone, followed by one 26-tone block, followed by 1 unallocated tone, followed by one 52-tone block, followed by 2 unallocated tones, followed by one 52-tone block, followed by 2 unallocated tones, followed by one 52-tone block, followed by 2 unallocated tones, followed by one 52-tone block, followed by 1 unallocated tone, followed by one 26-tone block, followed by 1 unallocated tone, followed by one 52-tone block, followed by 2 unallocated tones, followed by one 52-tone block, followed 1 unallocated tone, followed by 13 tones of a split 26-tone block, followed by 7 DC tones, followed by 13 tones of the split 26-tone block, followed by 1 unallocated tone, followed by one 52-tone block, followed by 2 unallocated tones, followed by one 52-tone block, followed by 1 unallocated tone, followed by one 26-tone block, followed by 1 unallocated tone, followed by one 52-tone block, followed by 2 unallocated tones, followed by one 52-tone block, followed by 2 unallocated tones, followed by one 52-tone block, followed by 2 unallocated tones, followed by one 52-tone block, followed by 1 unallocated tone, followed by one 26-tone block, followed by 1 unallocated tone, followed by one 52-tone block, followed by 2 unallocated tones, followed by one 52-tone block, followed by 1 unallocated tone, followed by 11 right edge tones;

12 left edge tones, followed by 1 unallocated tone, followed by a 106-tone block, followed by 1 unallocated tone, followed by one 26-tone block, followed by 1 unallocated tone, followed by a 106-tone block, followed by 2 unallocated tones, followed by a 106-tone block, followed by 1 unallocated tone, followed by one 26-tone block, followed by 1 unallocated tone, followed by a 106-tone block, followed by 1 unallocated tone, followed by 13 tones of a split 26-tone block, followed by 7 DC tones, followed by 13 tones of the split 26-tone block, followed by 1 unallocated tone, followed by a 106-tone block, followed by 1 unallocated tone, followed by one 26-tone block, followed by 1 unallocated tone, followed by a 106-tone block, followed by 2 unallocated tones, followed by a 106-tone block, followed by 1 unallocated tone, followed by one 26-tone block, followed by 1 unallocated tone, followed by a 106-tone block, followed by 1 unallocated tone, followed by 11 right edge tones;

12 left edge tones, followed by two 242-tone blocks, followed by 13 tones of a split 26-tone block, followed by 7 DC tones, followed by 13 tones of the split 26-tone block, followed by two 242-tone blocks, followed by 11 right edge tones; and 12 left edge tones, followed by 498 tones of a split 996-tone block, followed by 5 DC tones, followed by 498 tones of the split 996-tone block, followed by 11 right edge tones.

8. The apparatus of claim 1, wherein the total bandwidth is a 160 MHz bandwidth that comprises at least one of:
12 left edge tones, followed by a 996-tone block, followed by 23 direct current (DC) tones, followed by a 996-tone block, followed by 11 edge tones, wherein each 996-tone block is allocated to a single station;
12 left edge tones, followed by a 996-tone block, followed by 23 DC tones, followed by a 996-tone block, followed by 11 edge tones, wherein each 996-tone block is allocated to a different station;
12 left edge tones, followed by a 996-tone block, followed by an 80 MHz sub-band transmission including a plurality of sub-band DC tones and one or more 26-, 52-, 106-, or 242-tone blocks, followed by 11 edge tones;
12 left edge tones, followed by an 80 MHz sub-band transmission including a plurality of sub-band DC tones and one or more 26-, 52-, 106-, or 242-tone blocks, followed by a 996-tone block, followed by 11 edge tones; and
12 left edge tones, followed by another 80 MHz sub-band transmission including a plurality of sub-band DC tones and one or more 26-, 52-, 106-, or 242-tone blocks, followed by 11 edge tones, wherein the 996-tone block comprises a 996-tone allocation unit plus 5 null tones in the middle as sub-band DC tones.

9. The apparatus of claim 1, wherein the packet comprises at least one 106-tone block, comprising 102 data tones and 4 pilot tones, and 7 total direct current (DC) tones.

10. The apparatus of claim 1, wherein each 26-tone block includes 2 pilot tones and 24 data tones.

11. The apparatus of claim 1, the dividing comprising at least one of: dividing 234 tones into 9 tone groups, dividing 468 tones into 18 tone groups, dividing 494 tones into 19 tone groups, dividing 936 tones into 36 tone groups, dividing 988 tones into 38 tone groups, and dividing 1006 tones into 31 tone groups.

12. The apparatus of claim 1, wherein each 242-tone block includes 8 pilot tones and 234 data-tones.

13. The apparatus of claim 12, the dividing comprising at least one of: dividing 242 tones into 1 tone group, dividing 484 tones into 2 tone groups, and dividing 968 tones into 4 tone groups.

14. The apparatus of claim 1, the operations further comprising:
allocating one or more unallocated tones and at least one tone group for 20 MHz and 40 MHz transmissions to a common channel or a control channel.

15. The apparatus of claim 1, the puncturing comprising:
puncturing the first number of pilot tones in an initial distribution.

16. The apparatus of claim 15, wherein the first number of punctured pilot tones are located in gaps between 26-tone blocks.

17. The apparatus of claim 15, the operations further comprising:
changing a location of the first number of punctured pilot tones for transmission in subsequent symbols by cyclically incrementing the location within at least one 27-tone block including a single tone for interference measurement.

18. The apparatus of claim 15, the operations further comprising:
changing a location of the first number of punctured pilot tones for transmission in subsequent symbols by cyclically incrementing the location within an entirety of usable tones.

19. The apparatus of claim 15, the apparatus further comprising a receiver, the operations further comprising:
refraining from transmitting on the first number of punctured pilot tones, wherein the receiver is configured to measure interference and noise on the first number of punctured pilot tones.

20. The apparatus of claim 19, the transmitter further configured to transmit information on the 26-tone blocks.

21. The apparatus of claim 1, wherein none of the 26-tone blocks cross a 242-tone boundary.

22. The apparatus of claim 1, wherein the indication is contained in a signal field of the packet according to one or more rules.

23. The apparatus of claim 1, wherein the apparatus comprises an access point including an antenna, and wherein the transmitting comprises:
transmitting the packet to at least the first wireless communication device or the second wireless communication device via the transmitter and the antenna.

24. The apparatus of claim 1, wherein the wireless communication device comprises a mobile station including an antenna and the second wireless communication device comprises an access point serving the mobile station, and wherein the transmitting comprises:
transmitting the packet to the access point via the transmitter and the antenna.

25. The apparatus of claim 1, wherein the wireless communication device comprises a first mobile station including an antenna, wherein the second wireless communication device comprises a second mobile station in peer-to-peer communication with the first mobile station, and wherein the transmitting comprises:
transmitting the packet to the second mobile station via the transmitter and the antenna.

26. A method for wireless communication, comprising:
dividing a plurality of tones of a total bandwidth into a plurality of 26-tone, 52-tone, 106-tone, 242-tone, or 996-tone blocks;
allocating at least one of the plurality of tone blocks to a first wireless communication device;
puncturing a first number of pilot tones of a first tone block of the plurality of tone blocks for use in measuring interference on the first number of pilot tones, the first number based on a total number of tones in the first tone block and a number of leftover tones in the first tone block; and
puncturing a second number of pilot tones of a second tone block of the plurality of tone blocks for use in measuring interference on the second number of punctured pilot tones, the second number being based on a total number of tones in the second tone block and a number of leftover tones in the second tone block, wherein the total number of tones in the first tone block is greater than the total number of tones in the second tone block, the number of leftover tones in the first tone block is less than the number of leftover tones in the second tone block, and the first number of punctured pilot tones of the first block is higher than the second number of punctured pilot tones of the second block; and
transmitting, to at least the first wireless communication device or a second wireless communication device, a packet indicating the allocation.

27. An apparatus, comprising:
means for dividing a plurality of tones of a total bandwidth into a plurality of 26-tone, 52-tone, 106-tone, 242-tone, or 996-tone blocks;
means for allocating at least one of the plurality of tone blocks to a first wireless communication device;
means for puncturing a first number of pilot tones of a first tone block of the plurality of tone blocks for use in measuring interference on the first number of punctured pilot tones, the first number based on a total number of tones in the first tone block and a number of leftover tones in the first tone block; and
means for puncturing a second number of pilot tones of a second tone block of the plurality of tone blocks for use in measuring interference on the second number of punctured pilot tones, the second number being based on a total number of tones in the second tone block and a number of leftover tones in the second tone block, wherein the total number of tones in the first tone block is greater than the total number of tones in the second tone block, the number of leftover tones in the first tone block is less than the number of leftover tones in the second tone block, and the first number of punctured pilot tones of the first block is higher than the second number of punctured pilot tones of the second block; and
means for transmitting, to at least the first wireless communication device or a second wireless communication device, a packet indicating the allocation.

28. An apparatus, comprising:
a receiver configured to receive a packet indicating an allocation, to the apparatus, of at least one of a plurality of tone blocks of a plurality of tones of a total bandwidth divided into 26-tone, 52-tone, 106-tone, 242-tone, or 996-tone blocks;
one or more processors; and
a memory storing instructions that, when executed by the one or more processors, cause the apparatus to perform operations comprising:
measuring interference on a first number of punctured pilot tones of a first tone block of the plurality of tone blocks based on the indicated allocation, the first number based on a total number of tones in the first tone block and a number of leftover tones in the first tone block; and
measuring interference on a second number of punctured pilot tones of a second tone block of the plurality of tone blocks based on the indicated allocation, the second number based on a total number of tones in the second tone block and a number of leftover tones in the second tone block, wherein the total number of tones in the first tone block is greater than the total number of tones in the second tone block, the number of leftover tones in the first tone block is less than the number of leftover tones in the second tone block, and the first number of punctured pilot tones of the first block is higher than the second number of punctured pilot tones of the second block.

* * * * *